United States Patent
Baumgartner

(10) Patent No.: US 12,242,284 B2
(45) Date of Patent: Mar. 4, 2025

(54) UNMANNED SYSTEM MANEUVER CONTROLLER SYSTEMS AND METHODS

(71) Applicant: KNIGHTWERX INC., Santa Barbara, CA (US)

(72) Inventor: Daniel Baumgartner, Santa Barbara, CA (US)

(73) Assignee: Knightwerx Inc., Santa Barbara, CA (US)

( * ) Notice: Subject to any disclaimer, the term of this patent is extended or adjusted under 35 U.S.C. 154(b) by 0 days.

(21) Appl. No.: 18/344,753

(22) Filed: Jun. 29, 2023

(65) Prior Publication Data

US 2023/0359226 A1  Nov. 9, 2023

Related U.S. Application Data

(63) Continuation of application No. 18/077,468, filed on Dec. 8, 2022, which is a continuation-in-part of
(Continued)

(51) Int. Cl.
*B64C 39/00* (2023.01)
*B64C 27/59* (2006.01)
(Continued)

(52) U.S. Cl.
CPC ............. *G05D 1/106* (2019.05); *B64C 27/59* (2013.01); *B64C 27/605* (2013.01); *B64C 29/02* (2013.01);
(Continued)

(58) Field of Classification Search
CPC .... G05D 1/106; G05D 1/0011; B64C 39/024; B64U 20/80; B64U 20/50; B64U 2101/18; B64U 2201/20
See application file for complete search history.

(56) References Cited

U.S. PATENT DOCUMENTS 9,550,567 B1   1/2017  Erdozain, Jr. et al.
9,914,535 B2   3/2018  Paulos
(Continued)

OTHER PUBLICATIONS

Tech Briefs, Hinge Design Helps Quadrotors Climb, techbriefs.com/content/article/tb/pub/techbriefs/aerospace/39080 May 1, 2021.
(Continued)

*Primary Examiner* — James M McPherson
(74) *Attorney, Agent, or Firm* — Haynes and Boone, LLP

(57) ABSTRACT

An unmanned system maneuver controller (USMC) includes an inertial navigation system (INS) for state estimation of the USMC in three-dimensional (3D) space, a communications device configured to communicate with an unmanned system, and a processor configured to receive, via the communications device, flight, maneuver, or dive data from the unmanned system, and generate flight, maneuver, or dive control instructions based at least on the flight, maneuver, or dive data and data received from the INS. The flight, maneuver, or dive control instructions are configured to pilot the unmanned system based on movement of the USMC in 3D space. A remote may selectively control an operation of the USMC. The USMC may be mounted to a weapon or observation device, such that movement of the weapon or observation device in 3D space controls a movement of the unmanned system. Additional systems and associated methods are also provided.

20 Claims, 77 Drawing Sheets

Related U.S. Application Data application No. 17/538,428, filed on Nov. 30, 2021, now Pat. No. 11,542,002.

(60) Provisional application No. 63/215,305, filed on Jun. 25, 2021.

(51) Int. Cl.

| | | |
|---|---|---|
| *B64C 27/605* | (2006.01) | |
| *B64C 29/02* | (2006.01) | |
| *B64C 39/02* | (2023.01) | |
| *B64U 10/20* | (2023.01) | |
| *B64U 20/80* | (2023.01) | |
| *B64U 20/87* | (2023.01) | |
| *B64U 70/20* | (2023.01) | |
| *G05D 1/00* | (2006.01) | |
| *G05D 1/689* | (2024.01) | |
| *B64U 20/50* | (2023.01) | |
| *B64U 101/15* | (2023.01) | |
| *B64U 101/18* | (2023.01) | |
| *B64U 101/31* | (2023.01) | |

(52) U.S. Cl.
CPC ............ *B64C 39/024* (2013.01); *B64U 10/20* (2023.01); *B64U 20/80* (2023.01); *B64U 20/87* (2023.01); *B64U 70/20* (2023.01); *G05D 1/0011* (2013.01); *G05D 1/689* (2024.01); *B64U 20/50* (2023.01); *B64U 2101/15* (2023.01); *B64U 2101/18* (2023.01); *B64U 2101/31* (2023.01); *B64U 2201/20* (2023.01)

(56) References Cited

U.S. PATENT DOCUMENTS

| | | |
|---|---|---|
| 10,766,635 B2 | 9/2020 | Chen |
| 10,866,065 B2 | 12/2020 | Baumgartner |
| 11,619,470 B2 | 4/2023 | Baumgartner |
| 2015/0266578 A1 | 9/2015 | Elkins et al. |
| 2016/0216072 A1* | 7/2016 | McNeil ............... F41G 5/14 |
| 2017/0075351 A1 | 3/2017 | Liu |
| 2018/0067482 A1* | 3/2018 | Lema ............... G06V 40/20 |
| 2018/0074499 A1 | 3/2018 | Cantrell et al. |
| 2018/0194490 A1 | 7/2018 | Chen |
| 2019/0068953 A1* | 2/2019 | Choi ............... H04N 13/239 |
| 2020/0005656 A1* | 1/2020 | Saunamaeki ........ G05D 1/0027 |
| 2020/0057002 A1 | 2/2020 | Jung |
| 2020/0148345 A1* | 5/2020 | Wittmaak, Jr. ........ B64U 10/20 |
| 2020/0300579 A1 | 9/2020 | Baumgartner |
| 2020/0361629 A1 | 11/2020 | Chen |
| 2021/0254932 A1 | 8/2021 | Baumgartner |
| 2021/0255034 A1* | 8/2021 | Nagaya ............... G01J 1/42 |
| 2023/0362484 A1* | 11/2023 | Ma ............... H04N 23/66 |

OTHER PUBLICATIONS

Paulos, James et al., Cyclic Blade Pitch Control Without a Swashplate for Small Helicoptors, vol. 41, No. 3, Mar. 2018 Journal of Guidance, Control and Dynamics.

Paulos, James et al., Emulating a Fully Actuated Aerial Vehicle Using Two Actuators, May 21, 2018 2018 IEEE International Conference on Robotics and Automation, Brisbane, AU.

Paulos, James et al., An Underactuated Propeller for Attitude Control in Micro Air Vehicles; 2013, IROS.

Shen, Jinwei et al., Performance of Swashplateless Ultralight Helicoptor Rotor with Trailing-Edge Flaps for Primary Flight Control, Feb. 2003, J American Helicoptor Soc.

Paulos, James, et al., Flight Performance of a Swashplateless Micro Air Vehicle, 2015, ICRA.

* cited by examiner

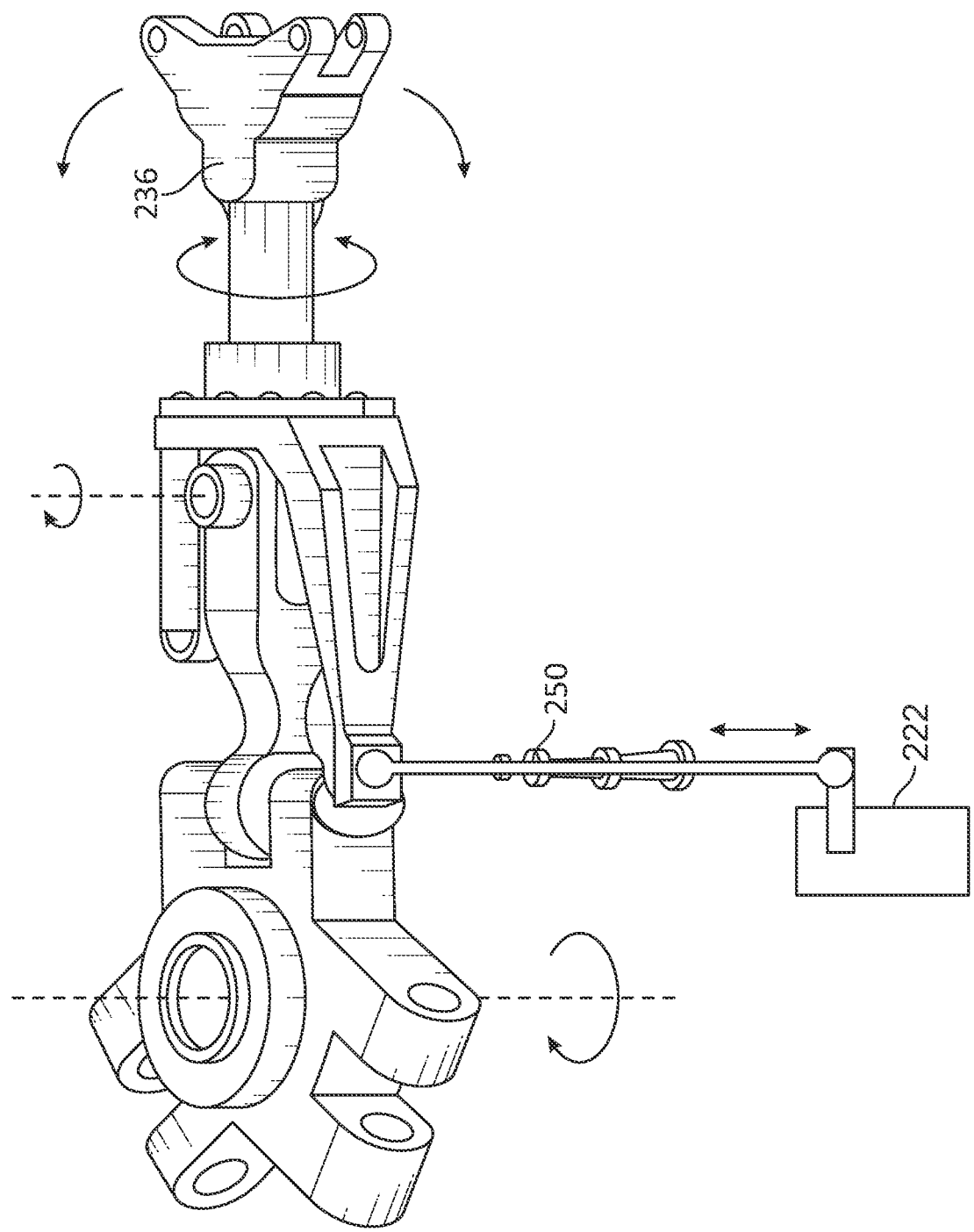

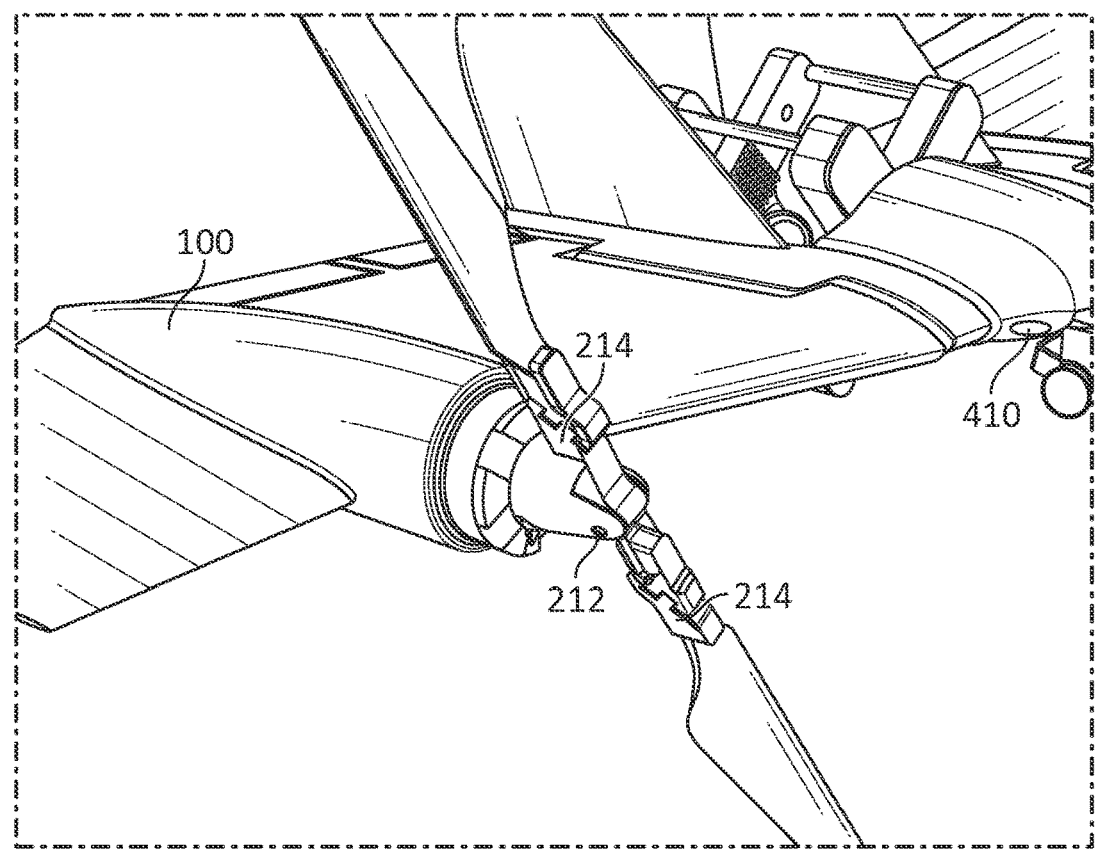
FIG. 4B
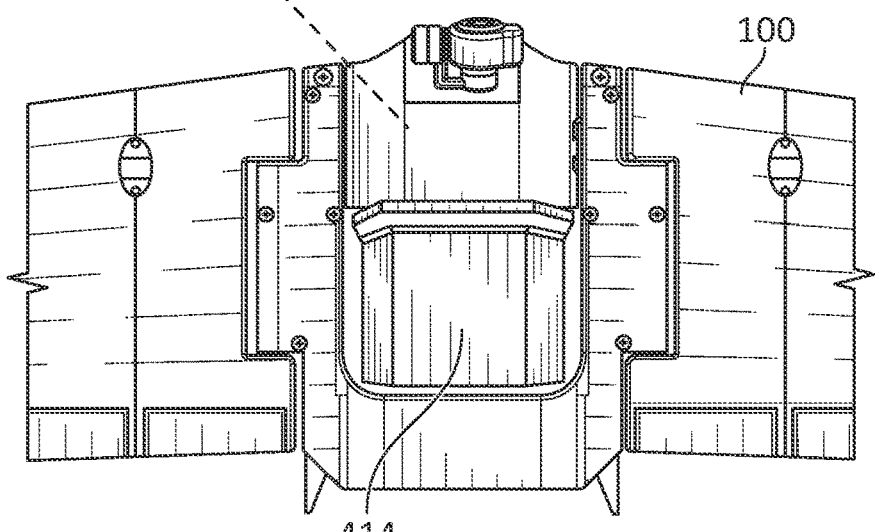
FIG. 4C

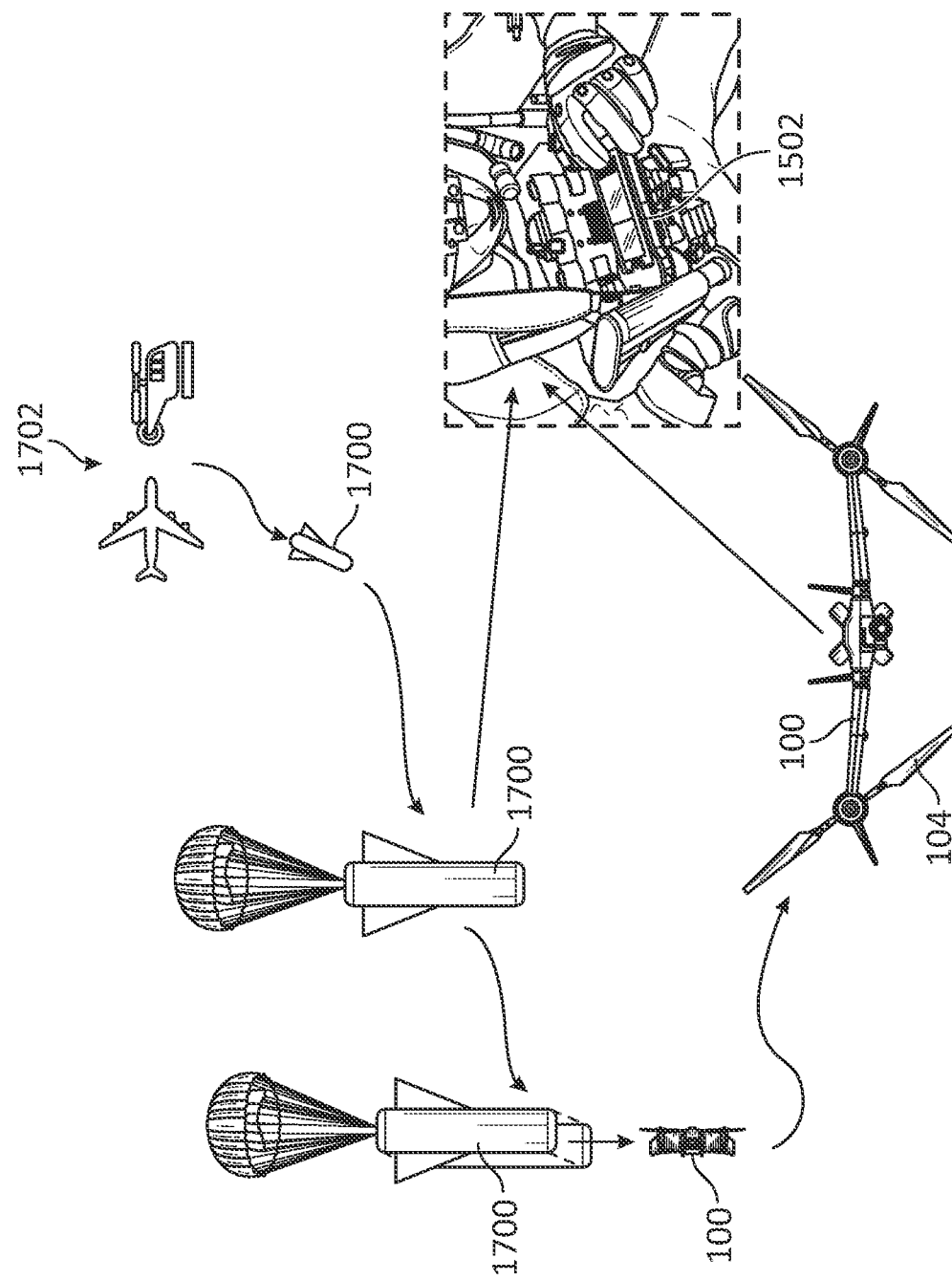

FIG. 39A

- 3900 Start
- 3901 Control module called "COORDINATOR" (master)
- 3902 Synchronization with other control modules in the space (slaves)
- 3904 Data exchange link established and maintained
- 3906 Control module master function can be switched within designated control module network (peers)
- 3908 Setup, link-up and configuration
- 3910 Sync with main computer → Import data / Export data
- 3912 Sync with aircrafts(s) → Import data / Export data
- 3914 Sync with aircraft computer and autopilot software → Import data / Export data
- 3916 Sync with ballistic computer and software → Import data / Export data
- 3918 Sync with 3rd party devices for target, aircraft command & control atmospheric and environmental data → Import data / Export data
- 3920 Coordinator collects atmospheric and environmental data
- 3922 Atmospheric and environmental data can be shared across linked external communications network or data cloud
- 3924 Parameters and data are shared across entire system architecture
- 3926 Data exchange established and maintained
- 3930 Main computer runs system check across entire architecture
- 3932 Coordinator and main computer show system status
- 3934 System readiness? No → A

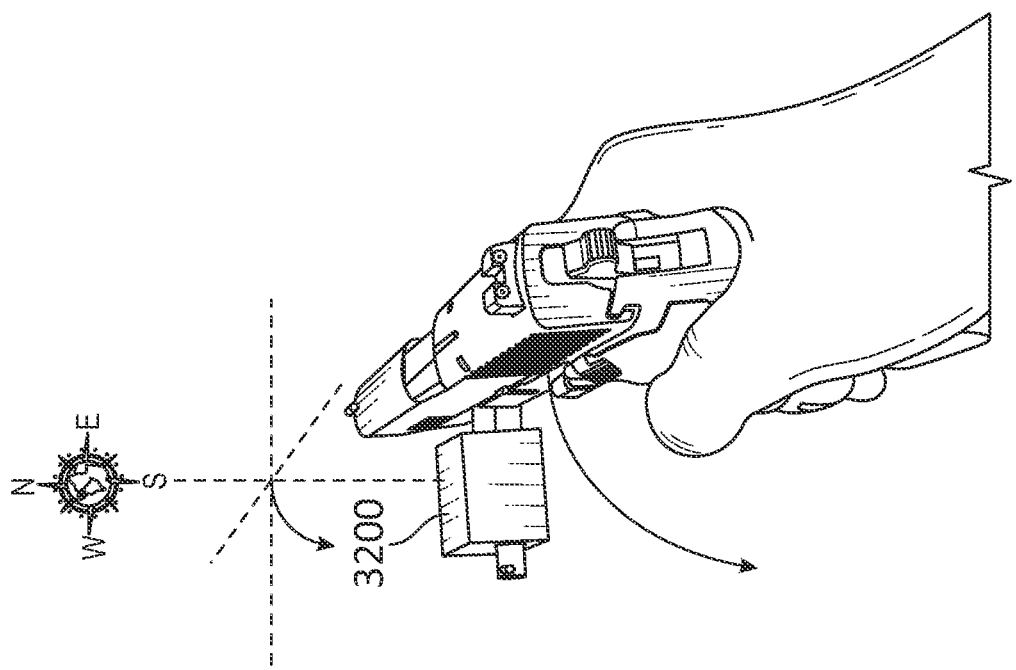
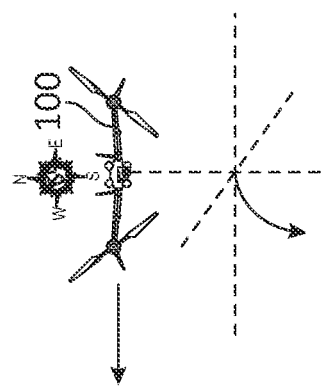
FIG. 51

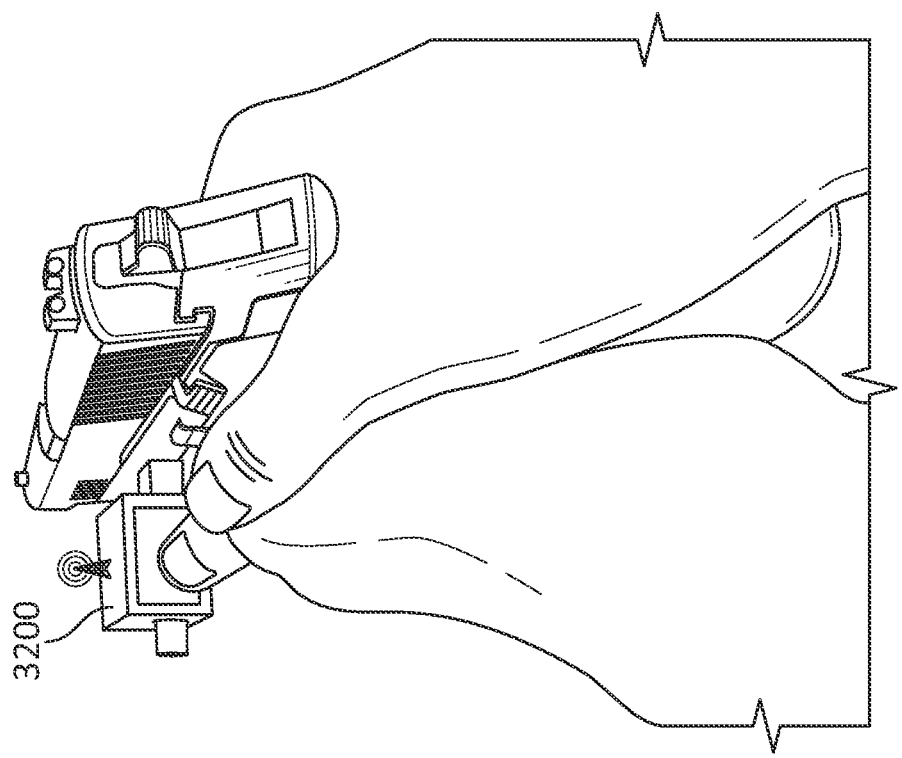
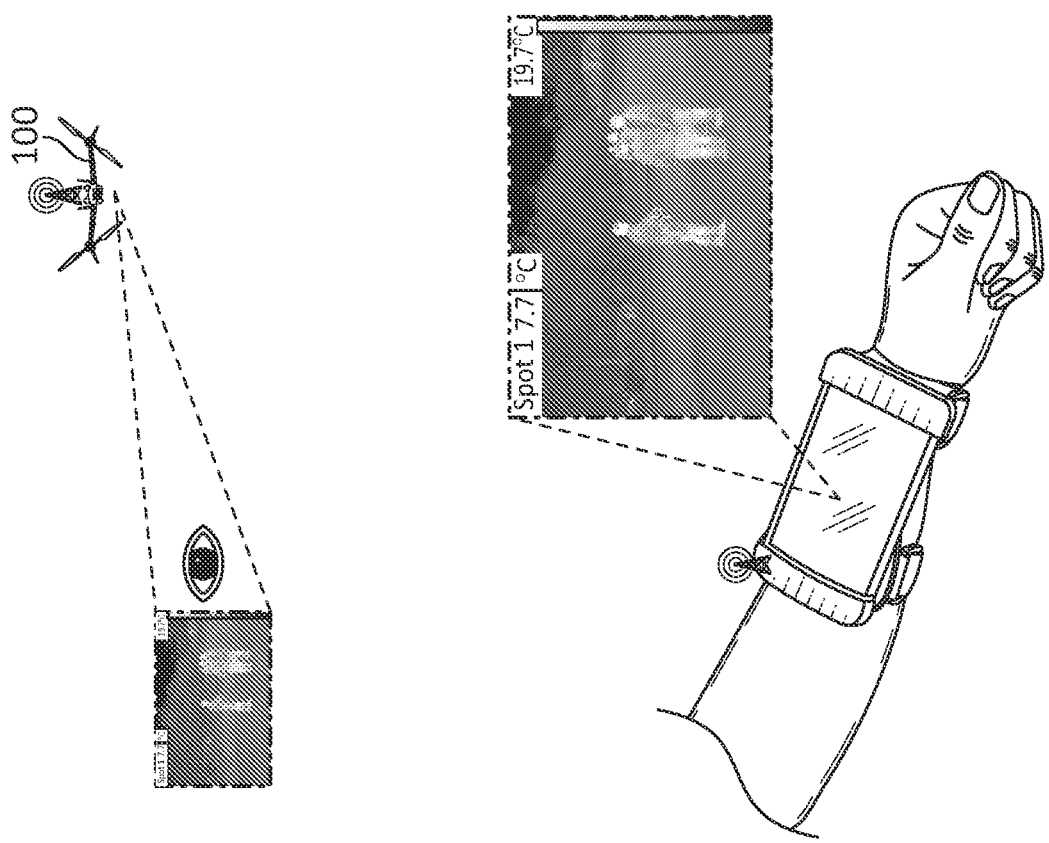
FIG. 52

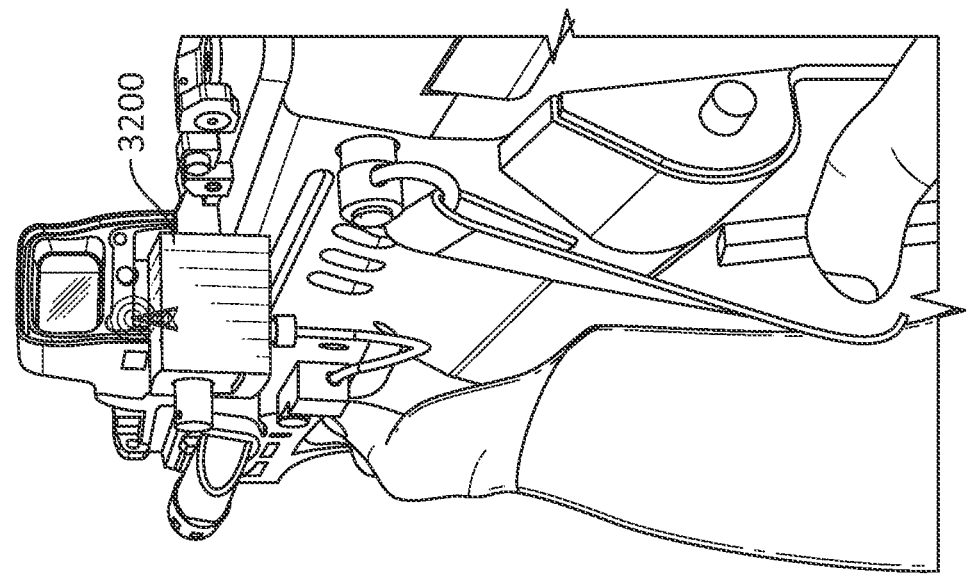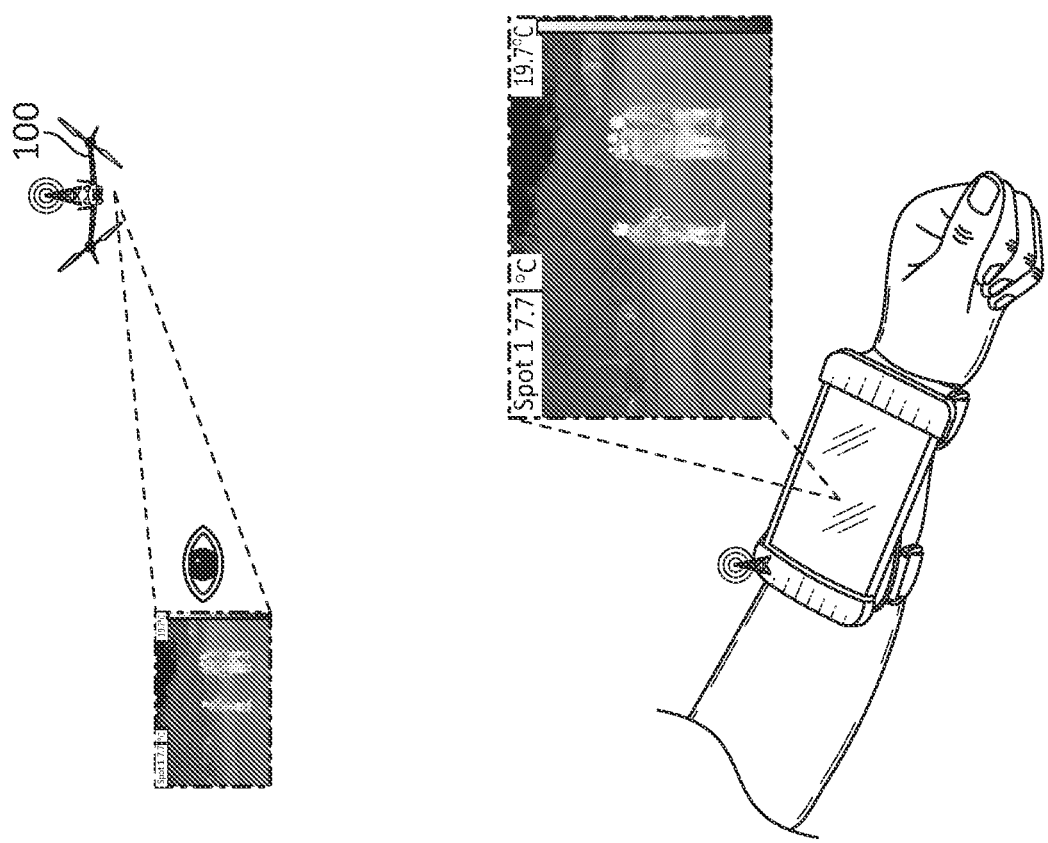
FIG. 53

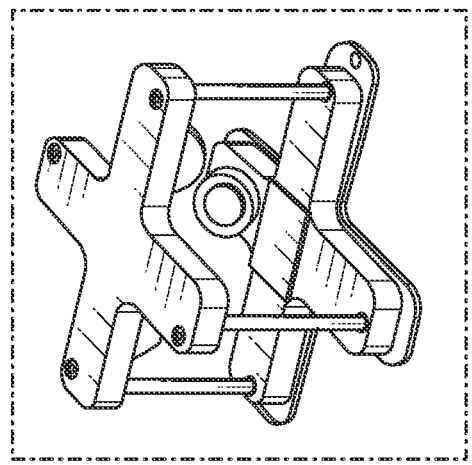
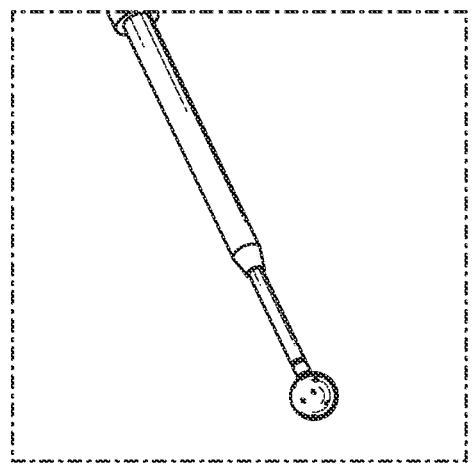
FIG. 56
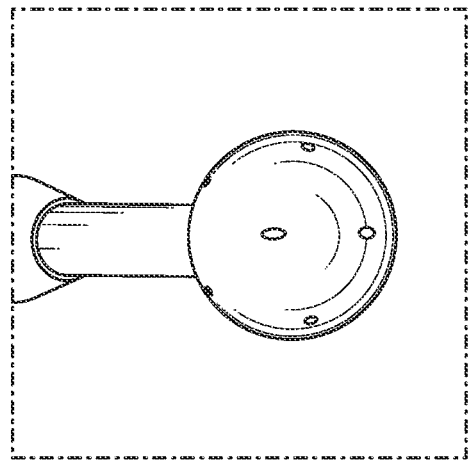

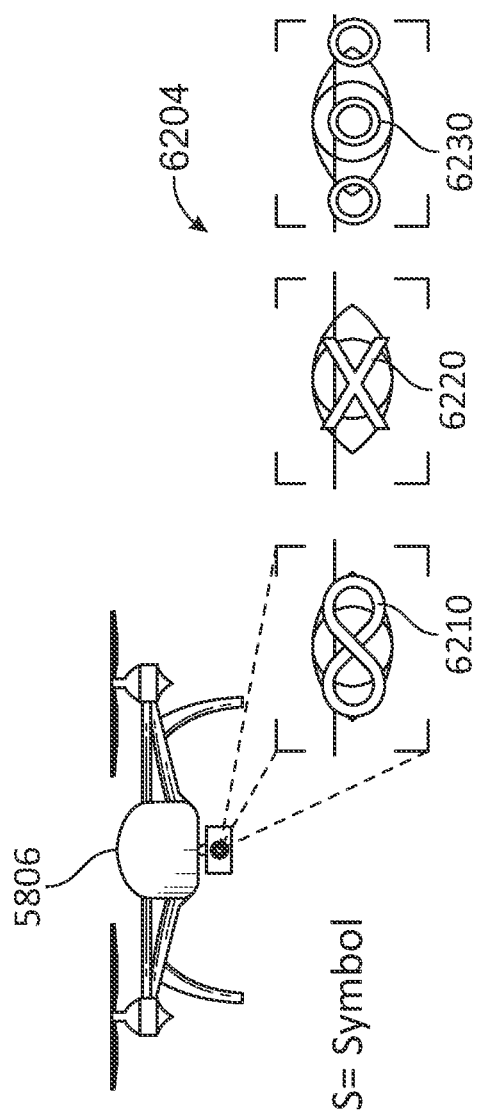
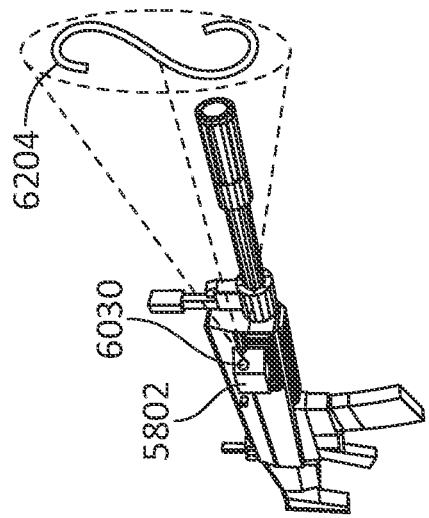
S = Symbol
FIG. 62

UNMANNED SYSTEM MANEUVER CONTROLLER SYSTEMS AND METHODS

CROSS-REFERENCE TO RELATED APPLICATIONS

This application is a continuation of U.S. patent application Ser. No. 18/077,468 filed Dec. 8, 2022, and entitled "UNMANNED SYSTEM MANEUVER CONTROLLER SYSTEMS AND METHODS," which is a continuation-in-part to U.S. patent application Ser. No. 17/538,428 filed Nov. 30, 2021, and entitled "UNMANNED AERIAL VEHICLE AND CONTROL SYSTEMS AND METHODS," which claims priority to and the benefit of U.S. Provisional Application No. 63/215,305, filed on Jun. 25, 2021, and entitled "UNMANNED AERIAL VEHICLE AND CONTROL SYSTEMS AND METHODS," all of which are incorporated herein by reference in their entirety.

TECHNICAL FIELD

The present disclosure relates generally to unmanned systems, such as unmanned aerial vehicles (UAVs), unmanned surface vehicles (USV), and unmanned underwater vehicles (UUV), and more specifically to systems and methods directed to an unmanned system maneuver controller.

BACKGROUND

Environmental forces such as wind speed, wind direction and other atmospherics (e.g., barometric pressure, temperature, humidity) can drastically affect the flight path of an object, energy or frequency beam (e.g., ballistic projectiles, airdrops, aircraft, laser, equipment drops, skydive jumps, etc.) through space. The flight path can be affected by highly complex wind conditions in which inconsistent wind speeds, wind directions and other atmospherics make precision landing and/or placement difficult. Supplemental devices may be used to gauge wind speed and direction but can be highly prone to error as many of the readings are subject to user interpretation. Real time target ISR (Intelligence, Surveillance, and Reconnaissance) data or other situational awareness information such as CBRNE (Chemical, Biological, Radiological, Nuclear, and Explosives) data about specific areas in 3D space are considered mission critical. Airborne sensors such as drone-borne sensors provide a helpful tool to access, gather, transmit, and disseminate such information and data. These sensors are often required to provide real-time data to a user, therefore need to be commanded and placed downrange in a rapid fashion, where flying a sensor-equipped drone via a handheld device may interrupt the user's workflow. Hence, a remote-control-less method to command and control a UAV or other unmanned system is described herein, where the unmanned system is guided by the motion of the weapon or another device to which a controller is mounted.

Positioning multiple sensors downrange may be difficult, if not impractical, in many applications, such as when time is of the essence, discreteness is desired, or during operations. In applications using airborne sensors (e.g., ISR sensors, CBRNE sensors, wind sensors carried by one or more UAVs), or using UAVs as a direct attack method by flying the UAV into the target, it may be desirable to set the position of the sensors and/or the UAV itself, such as based on user position, target location, and/or user input.

It is therefore desirable to provide improved systems and methods that address at least in part the above described problems and/or which more generally offers improvements or an alternative to existing arrangements.

SUMMARY

According to embodiments of the disclosure, an unmanned system maneuver controller (USMC) is provided. The USMC includes an inertial navigation system (INS) for state estimation of the USMC in three-dimensional (3D) space, a communications device configured to communicate with an unmanned system, and a processor. The processor is configured to receive, via the communications device, flight, maneuver, or dive data from the unmanned system. The processor is further configured to generate flight, maneuver, or dive control instructions based at least on the flight, maneuver, or dive data and data received from the INS, the flight, maneuver, or dive control instructions configured to pilot the unmanned system based on movement of the USMC in 3D space. A remote may be operable to selectively control an operation of the USMC. The USMC may be mounted to a weapon or observation device, such that movement of the weapon or observation device in 3D space controls a movement of the unmanned system.

According to embodiments of the disclosure, a method is provided. The method includes receiving, by a processor, flight, maneuver, or dive data from an unmanned system via a communications device of a USMC. The method further includes generating, by the processor, flight, maneuver, or dive control instructions based at least on the flight, maneuver, or dive data and data received from an INS of the USMC, the flight, maneuver, or dive control instructions configured to pilot the unmanned system based on movement of the USMC in 3D space.

Additional features are set forth in part in the description that follows and will become apparent to those skilled in the art upon examination of the specification and drawings or may be learned by the practice of the disclosed subject matter. A further understanding of the nature and advantages of the present disclosure may be realized by reference to the remaining portions of the specification and the drawings, which forms a part of this disclosure.

One of skill in the art will understand that each of the various aspects and features of the disclosure may advantageously be used separately in some instances, or in combination with other aspects and features of the disclosure in other instances. Accordingly, individual aspects can be claimed separately or in combination with other aspects and features. Thus, the present disclosure is merely exemplary in nature and is in no way intended to limit the claimed invention or its applications or uses. It is to be understood that structural and/or logical changes may be made without departing from the spirit and scope of the present disclosure.

The present disclosure is set forth in various levels of detail and no limitation as to the scope of the claimed subject matter is intended by either the inclusion or non-inclusion of elements, components, or the like in this summary. In certain instances, details that are not necessary for an understanding of the disclosure or that render other details difficult to perceive may have been omitted. Moreover, for the purposes of clarity, detailed descriptions of certain features will not be discussed when they would be apparent to those with skill in the art so as not to obscure the description of the present disclosure. The claimed subject matter is not necessarily limited to the arrangements illustrated herein, with the scope of the present disclosure is defined only by the appended claims.

BRIEF DESCRIPTION OF THE DRAWINGS

The description will be more fully understood with reference to the following figures in which components may not be drawn to scale, which are presented as various embodiments of the unmanned aerial vehicle described herein and should not be construed as a complete depiction of the scope of the exercise system.

FIG. 2E illustrates another fully articulated rotor system design, in accordance with an embodiment of the disclosure.

FIG. 4B illustrates a fragmentary view of the UAV, in accordance with an embodiment of the disclosure.

FIG. 4C illustrates a destruction payload of the UAV, in accordance with an embodiment of the disclosure.

FIG. 17 illustrates a high speed/high altitude airdrop shell for the UAV, in accordance with an embodiment of the disclosure.

FIGS. 39A, 39B, and 39C illustrate a flowchart of a control module process, in accordance with an embodiment of the disclosure.

FIGS. 51-54 illustrate various examples of coordinator-enabled UAV positioning in an indoor/CQB mode, in accordance with an embodiment of the disclosure.

FIG. 56 illustrates various wind sensors and atmospheric sensors, in accordance with an embodiment of the disclosure.

FIG. 62 illustrates a vision-based communication functionality or control, in accordance with an embodiment of the disclosure.

Embodiments of the disclosure and their advantages are best understood by referring to the detailed description that follows. It should be appreciated that like reference numerals may be used to identify like elements illustrated in one or more of the figures.

DETAILED DESCRIPTION

Figure 1:
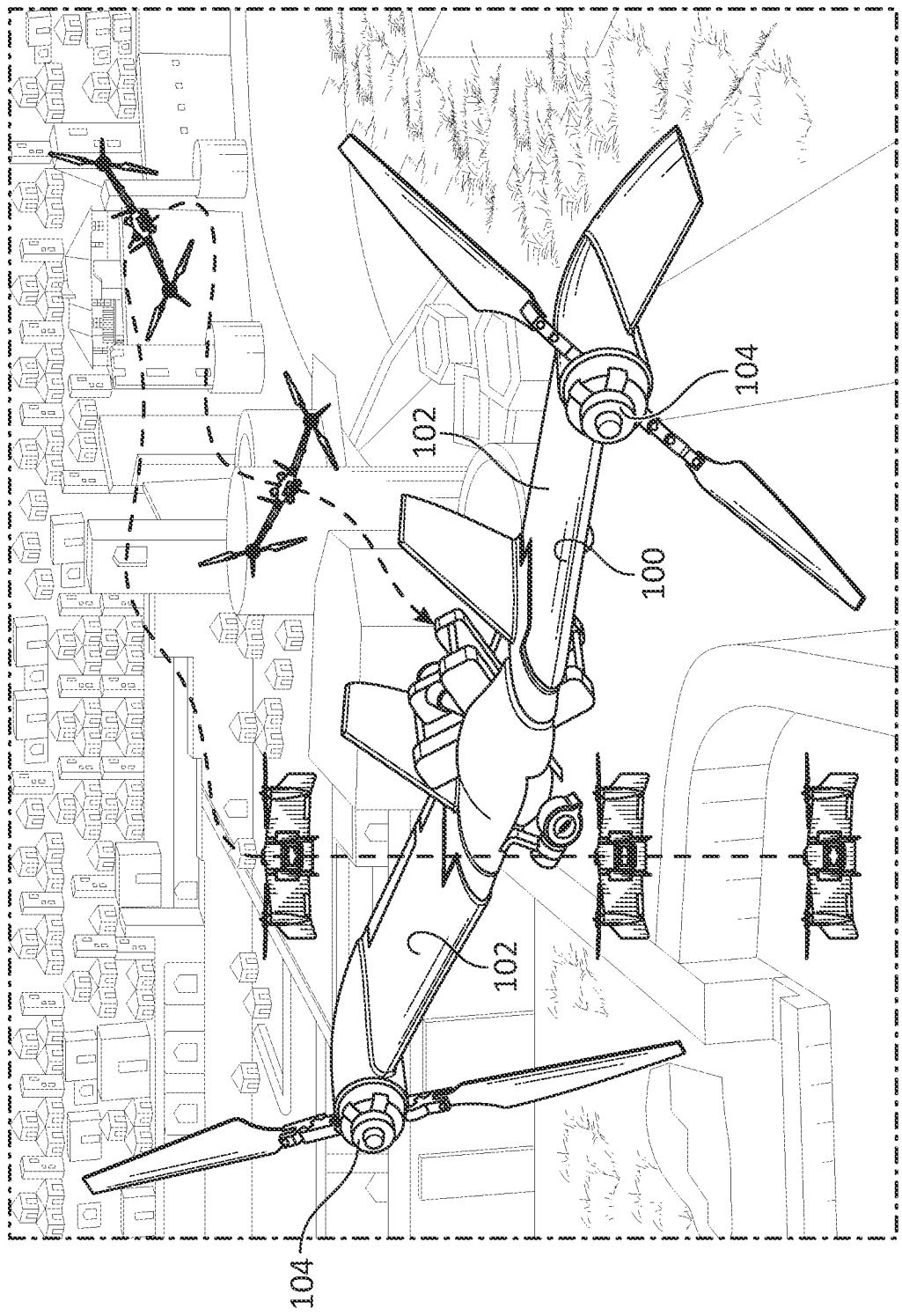
FIG. 1 illustrates an unmanned aerial vehicle (UAV), in accordance with an embodiment of the disclosure.

According to the present disclosure, systems and methods are provided for real-time ISR data and CBRNE data collection, as well as measuring, mapping, tracking, and/or predicting atmospheric data in multi-dimensional air space. According to one or more embodiments, an aircraft is provided. The aircraft may be an AI-enabled, air droppable, foldable winged, and tail-sitter vertical take-off and landing (VTOL) aircraft. The aircraft may utilize blown flap, under-actuated or fully-actuated swashplateless and hinged propulsion technology (e.g., teetering hinge, off-set hinge, lag-pitch hinge) and a rotating payload system for scalable multi-payload deployment capability and sensor fusion applications enhancing target data collection and target engagement precision and atmospherics measuring, mapping and prediction in a multi-dimensional space environment.

The systems and methods described herein have numerous applications, including, for example, the following:

a) Defense applications such as directed energy, missiles, combat airplane and helicopter rockets and ballistic projectiles of any shape or form (e.g., precision sniper shots, marksman, machine gun, mortar, artillery, directed energy beams, sound beams, frequency beams and laser beams);

b) Defense applications such as tactical and strategic battlefield resupply and airdrops from fixed-wing and rotary-wing aircraft, equipment drops on gliders or parachutes, high and low altitude skydive jumps and warfighter insertion, personnel recovery and combat search and rescue operations, drone swarm release and information warfare material (psyops) released from air space;

c) Defense and civilian applications such as collecting and transmitting ISR (Intelligence, Surveillance, and Reconnaissance) data.

d) Defense applications such as using the UAV, equipped with an explosive payload, as a form of lethal attack that can be flown into the target.

e) Defense and civilian applications such as landing manned or unmanned fixed-wing or rotary aircrafts on boats, ships or aircraft carriers;

f) Civilian applications such as golf, recreational shooting and target practicing sports as well as hunting;

g) Defense, Commercial, and First responder applications such as firefighters, fire jumper, CBRN particle and virus/pathogen detection, mapping and tracking; and h) Industrial applications such as wind farms, agriculture and nature preservation.

According to the present disclosure, systems and methods are provided for weapon-mounted or handheld device-mounted unmanned system maneuver control (e.g., UAV flight control). The controller may be motion, compass, visual, gyroscopic, gravity-force (e.g., accelerometer, inclinometer, tilt-sensing) sensor-based (commonly known as IMU—Inertial Measurement Unit) and operable to control autopiloted flight of an unmanned aircraft. For example, the controller may include an inertial navigation system for state estimation of the controller in 3D space and a logic device configured to generate flight, maneuver, or dive control instructions to pilot an unmanned system (e.g., UAV, USV, UUV, etc.) based on movement of the controller in 3D space. The controller described herein may have numerous applications, including, for example, the following:

a) Direction of direct fire designator;
b) Direction of indirect fire designator;
c) Direction of water designator;
d) Direction of energy designator;
e) Direction of laser beam designator; and
f) Direction of frequency wave designator.

According to the present disclosure, systems and methods are provided for wind triangle-based, Visual Inertial Odometry (VIO)-enhanced sensor fusion wind speed and wind direction measurement. Such systems and methods may provide objective and projectile guidance to enhance precision target engagement and hit probability in GPS-enabled and GPS-denied environments. In addition, measurement of wind speed and 3D wind direction may facilitate sniper applications and other direct or indirect munitions, including laser, frequencies, and directed energy.

FIG. 1 illustrates an unmanned aerial vehicle (UAV) 100, such as an advanced reconnaissance and multi-application drone aircraft, in accordance with an embodiment of the disclosure. As shown, UAV 100 may be a vertical take-off and landing (VTOL) aircraft having wings 102 and dual rotors 104 (e.g., in a counter-rotating or same directional dual rotor configuration), although other configurations are contemplated. UAV 100 may transition between a vertical phase (e.g., for taking off, static hovering and landing) and a horizontal flight phase during operation to provide maneuverability and flight characteristics. UAV 100 may transition from vertical flight to horizontal flight using swashplateless propulsion technology and additional actuators (embedded in wings 102, stabilizers, or other part of the aircraft), as described below. Once transitioned to horizontal flight, UAV 100 may use its wings 102 to leverage air lift physics and enable efficient short and long-distance flights.

Figure 2A:
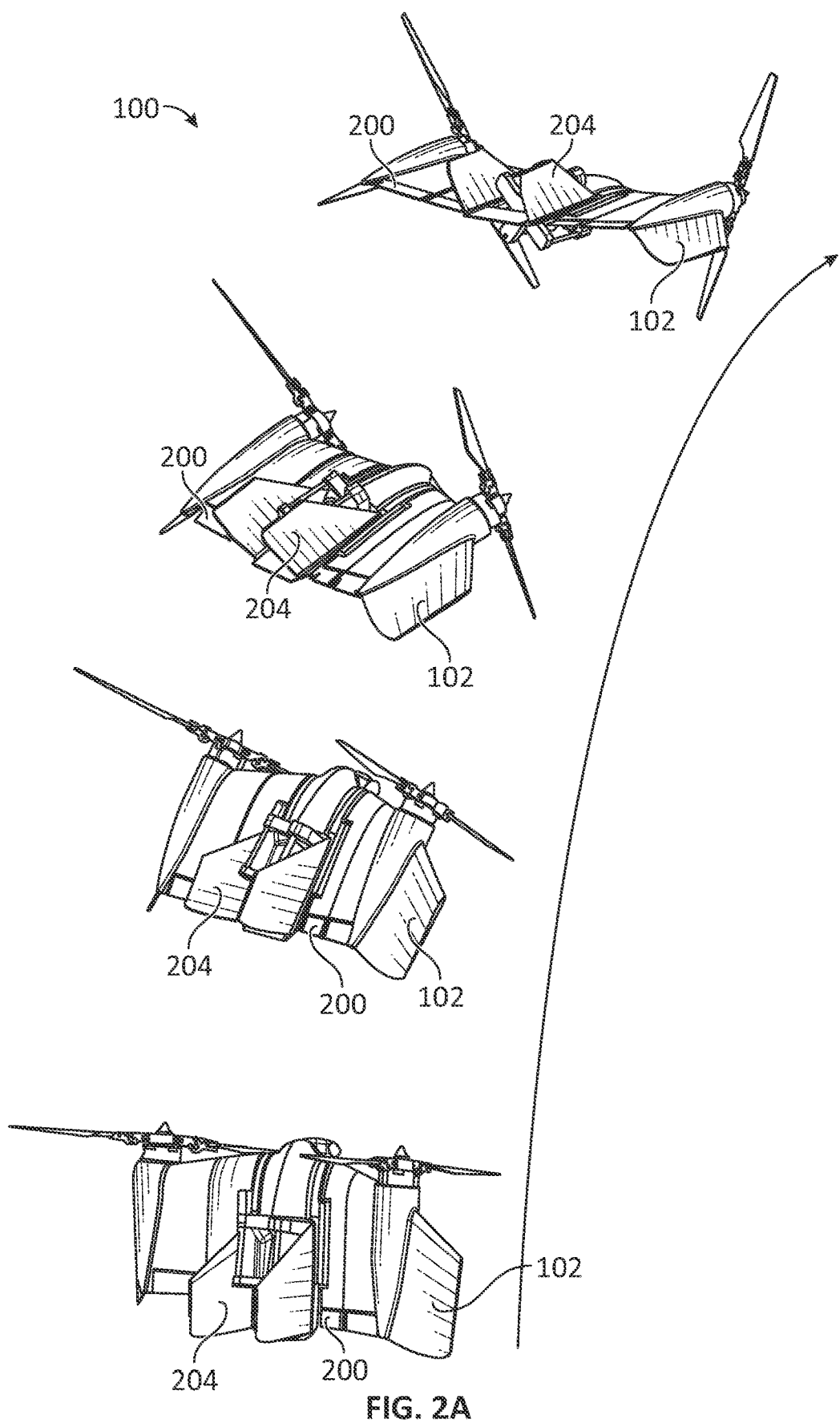
FIG. 2A illustrates a transition of the UAV from vertical take-off to stable horizontal flight, in accordance with an embodiment of the disclosure.

FIG. 2A illustrates a transition of UAV 100 from vertical take-off to stable horizontal flight, in accordance with an embodiment of the disclosure. Referring to FIG. 2A, UAV 100 may have instant or near-instant take-off transition capability—from tail-sitting to horizontal flight. For example, UAV 100 may include actuators 200 (e.g., on wings 102) and stabilizers 204 that enable fast transition from vertical take-off to stable horizontal flight.

Figure 2B:
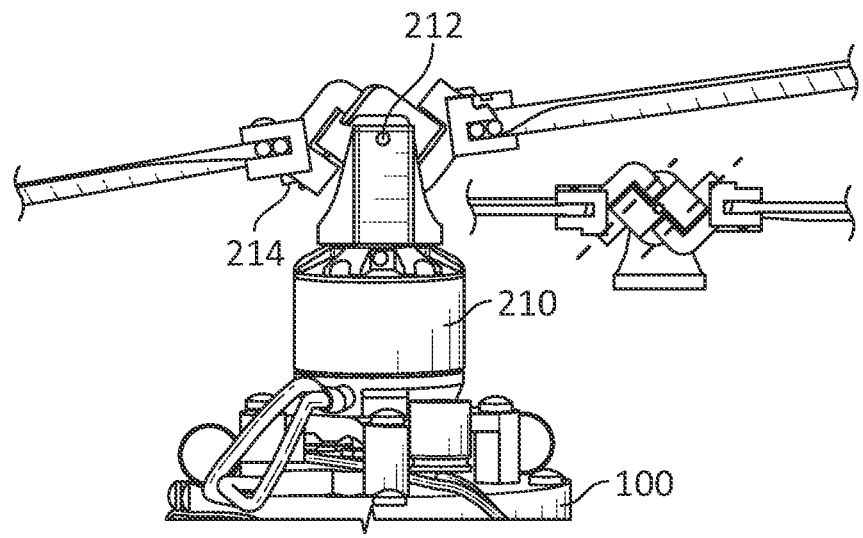
FIG. 2B illustrates a swashplateless, hinged rotor system design, in accordance with an embodiment of the disclosure.

FIG. 2B illustrates a swashplateless, hinged rotor system design, in accordance with an embodiment of the disclosure. Referring to FIG. 2B, UAV 100 may include fully actuated propulsion using swashplateless technology to control all degrees of freedom and emulate full actuation over forces and torques using only two actuators. For example, torque impulses may be varied to control blade position and/or angle of attack. In embodiments, the propulsion system may use a swashplateless rotor head in combination with teetering hinge propulsion technology. The swashplateless rotor head may include a motor 210, a teetering hinge 212, and lag-pitch hinges or offset hinges 214, or any combination thereof. Such embodiments are exemplary only, and the swashplateless rotor head may include other hinge or hinge-like configurations.

Figure 2C:
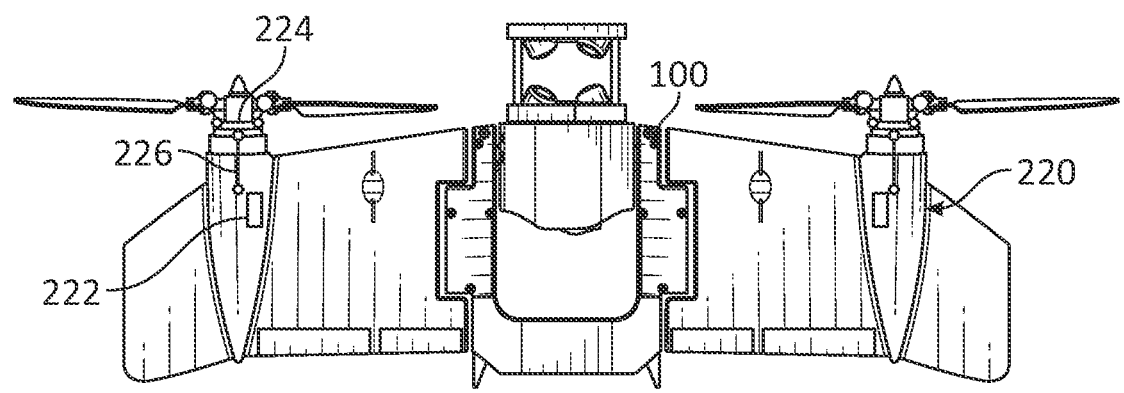
FIG. 2C illustrates a fully articulated or semi-rigid cyclic rotor system design, in accordance with an embodiment of the disclosure.
Figure 2D:
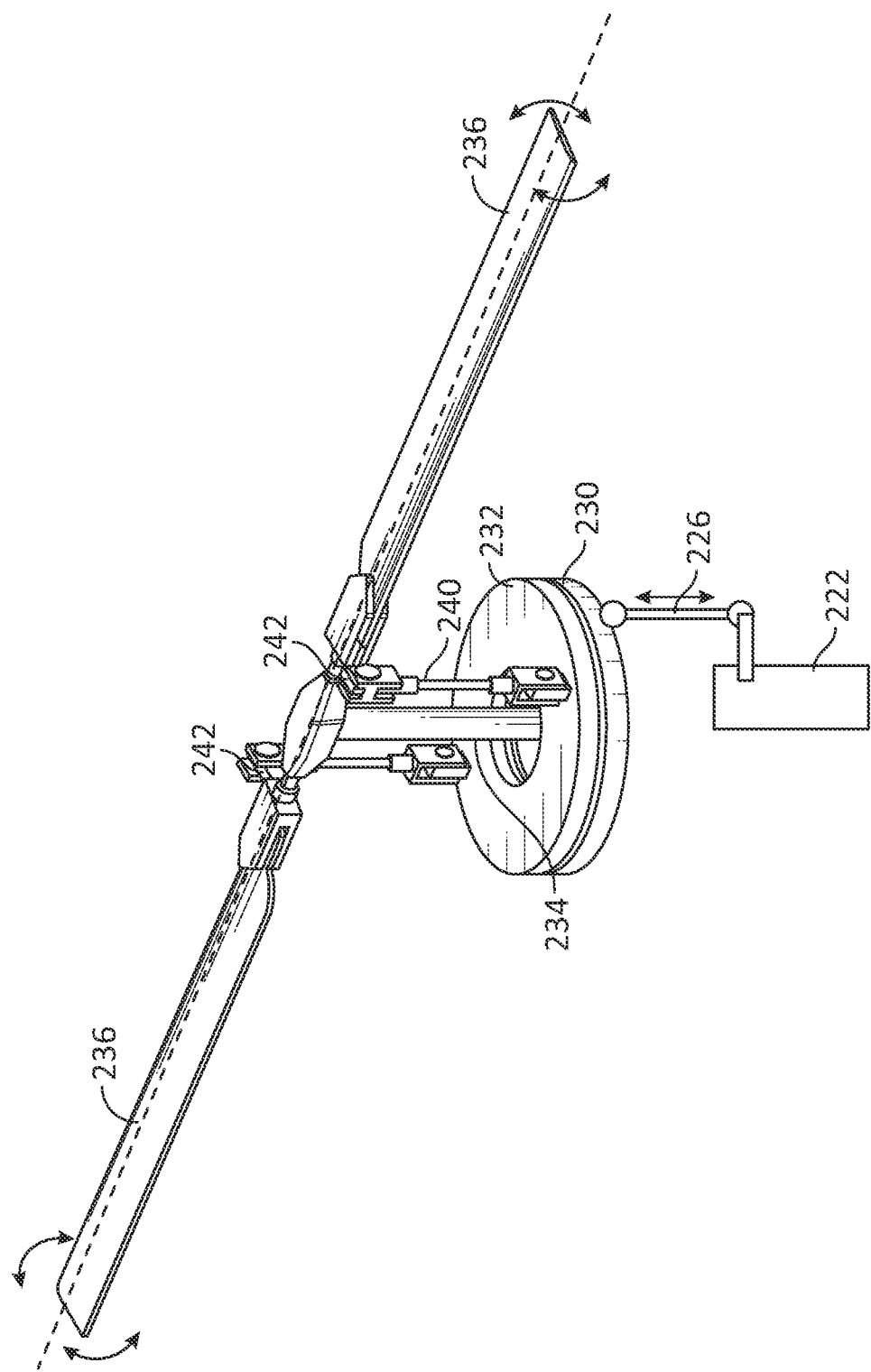
FIG. 2D illustrates a swashplate system, in accordance with an embodiment of the disclosure.

FIG. 2C illustrates a fully articulated or semi-rigid cyclic rotor system design, in accordance with an embodiment of the disclosure. FIG. 2D illustrates a swashplate system, in accordance with an embodiment of the disclosure. Referring to FIGS. 2C and 2D, UAV 100 may include fully actuated propulsion using a swashplate system 220 to control all degrees of freedom. The swashplate system may provide cyclic rotor pitch control for UAV transition and maneuverability. Referring to FIG. 2C, swashplate system 220 may include a servo 222, a swashplate 224, and one or more rods 226 connected the servo 222 to the swashplate 224, such that actuation of servo 222 moves swashplate 224 to control propulsion. Referring to FIG. 2D, swashplate 224 may include a non-rotating plate 230 connected to rod(s) 226 and a rotating plate 232 configured to rotate with motor drive shaft 234 and rotor blades 236. A pitch link 240 may connect each rotor blade 236 to rotating plate 232 to control pitch/angle of attach of rotor blades 236 via movement of swashplate 224. As shown, pitch link 240 may be connected to a respective rotor blade 236 via a pitch horn 240, although other configurations are contemplated.

Such embodiments are illustrative only, and UAV 100 may include other systems operable to control cyclic pitch and/or angle of attach of rotor blades 236. For example, FIG. 2E illustrates another fully articulated rotor system design, in accordance with an embodiment of the disclosure. As shown, servo 222 may be connected directly to a rotor blade 236, such as via a pitch change rod 250. In such embodiments, actuation of servo 222 may control up and down movement and/or position of rotor blade 236.

Figure 3:
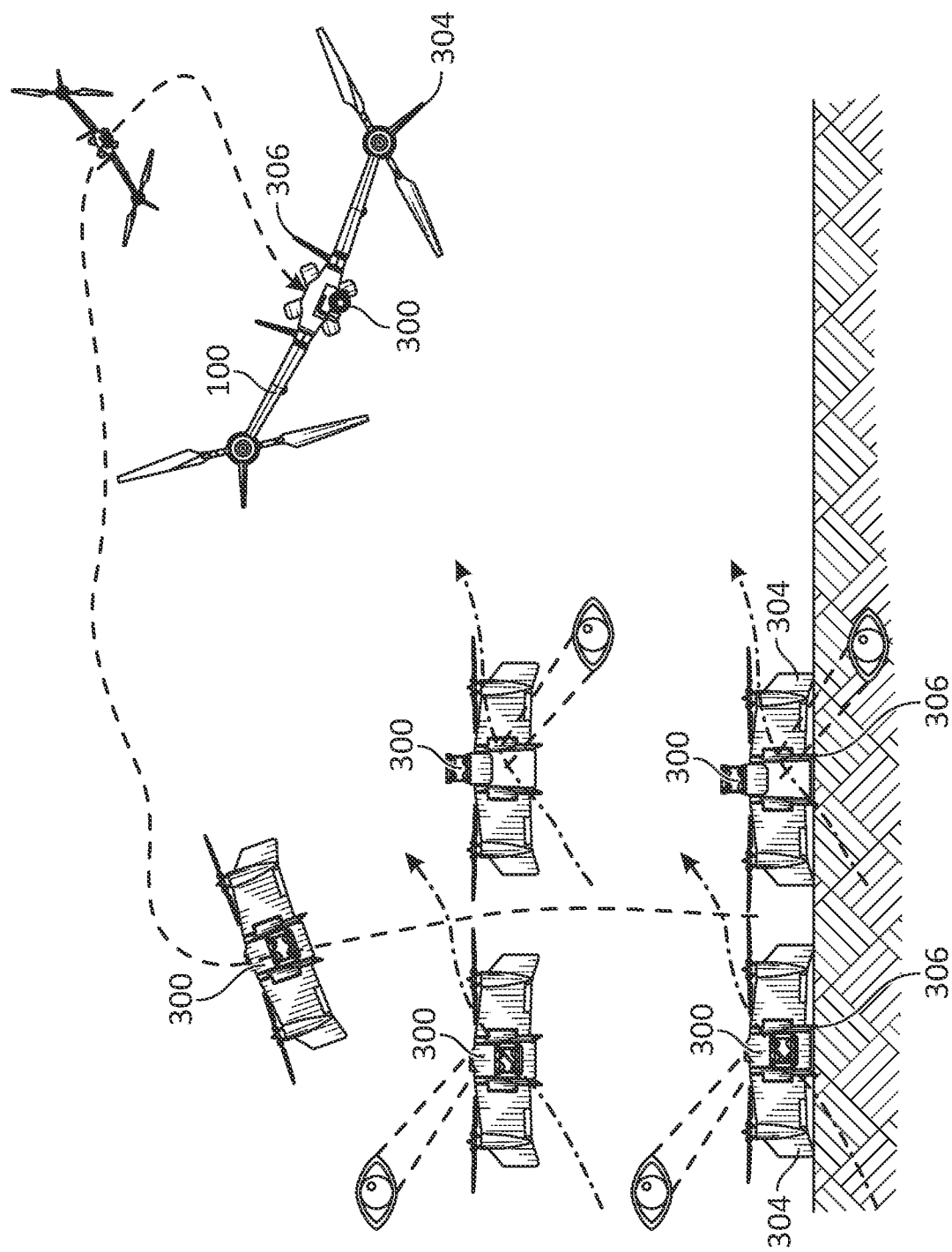
FIG. 3 illustrates atmospheric data and ISR data collection by the UAV during operations, in accordance with an embodiment of the disclosure.

FIG. 3 illustrates atmospheric data collection by UAV 100 during operations, in accordance with an embodiment of the disclosure. As shown, UAV 100 may include a rotating payload 300 that is selectively positionable based on flight and/or atmospheric conditions and/or characteristics. The rotating payload 300 may include one or more ISR (intelligence, surveillance, and reconnaissance), or CBRN (chemical, biological, radiological and nuclear) detection devices, and explosive charge and/or wind and atmospheric sensors. In embodiments, the rotating payload 300 may include a nano-charge, a phosphor ignition system, an electrical short circuit mechanism, an explosive charge, or other destruction application or system. In embodiments, the rotating payload 300 may include a weapons system configured to engage a target. The rotating payload 300 may be fully functional in the landed position. As a result, UAV 100 may be able to engage a target and/or gather data and information when landed or in static hovering position, such as general atmospherics including temperature, barometric pressure, humidity, density altitude, wind speed, and wind direction, among others. During vertical take-off and/or horizontal flight, UAV 100 may continue to gather general atmospheric data via the rotating payload 300 and/or in combination with the wind triangle method FIG. 55 and a plurality of onboard sensors FIG. 57.

With continued reference to FIG. 3, UAV 100 may be a VTOL tail-sitter when ready for take-off. For example, UAV 100 may be placed in an upright vertical position, with its wing tips 304 and tails/fins 306 engaged with the ground or other surface to hold UAV 100 upright. In like manner, during vertical landing, UAV 100 may land with its wing tips 304 and tails/fins 306 engaging the ground.

Figure 4A:
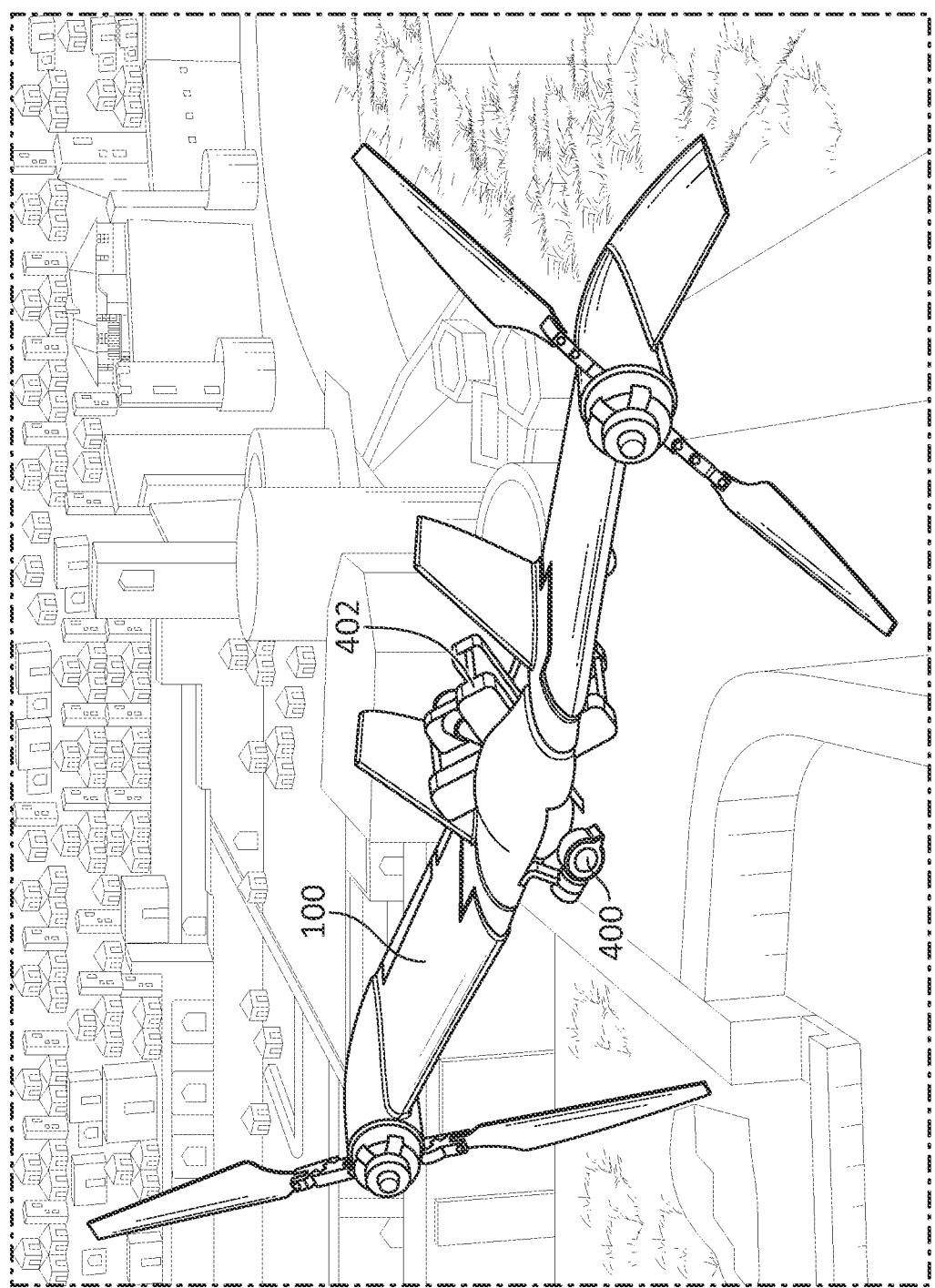
FIG. 4A illustrates sensor payloads of the UAV, in accordance with an embodiment of the disclosure.

FIG. 4A illustrates sensor payloads of UAV 100, in accordance with an embodiment of the disclosure. As shown, UAV 100 may include a first sensor payload 400 and a second sensor payload 402. The first sensor payload 400 may be an ISR payload, such as a 3-axis ISR dual-camera gimbal. The second sensor payload 402 may be an atmospheric payload, such as one or more wind and/or atmospheric, CBRN sensors or additional explosive material.

FIG. 4B illustrates a fragmentary view of UAV 100, in accordance with an embodiment of the disclosure. As shown, UAV 100 may include visual-inertial odometry (VIO) 410, such as to facilitate autonomous navigation of UAV 100 (e.g., in GPS-denied or degraded environments). As described herein, UAV 100 may be scalable as desired. For example, UAV 100 (e.g., the aircraft and/or its propulsion technology) may be upsized or downsized based on payload requirements. UAV 100 may be battery powered or may carry an internal power source other than batteries to extend flight time and/or power capacity (e.g., hybrid, combustion engine, hydrogen fuel cell, etc.). In battery-powered applications, the battery may be rechargeable. For example, UAV 100 may be placed on an inductive charging plate connected to an external power source (e.g., solar cells, power bank, battery, etc.). Such embodiments may benefit prolonged missions (e.g., one or multiple UAVs used for stationary area overwatch; 360-degree camp, compound, biwak or hideout security (ISR); rapid threat detection and target engagement system, etc.). Each rotor may include an under-actuated or fully-actuated swashplateless rotor design, including hinges, such as but not limited to teetering hinges 212, off-set hinges or lag-pitch hinges 214, to control flight characteristics.

Figure 4D:
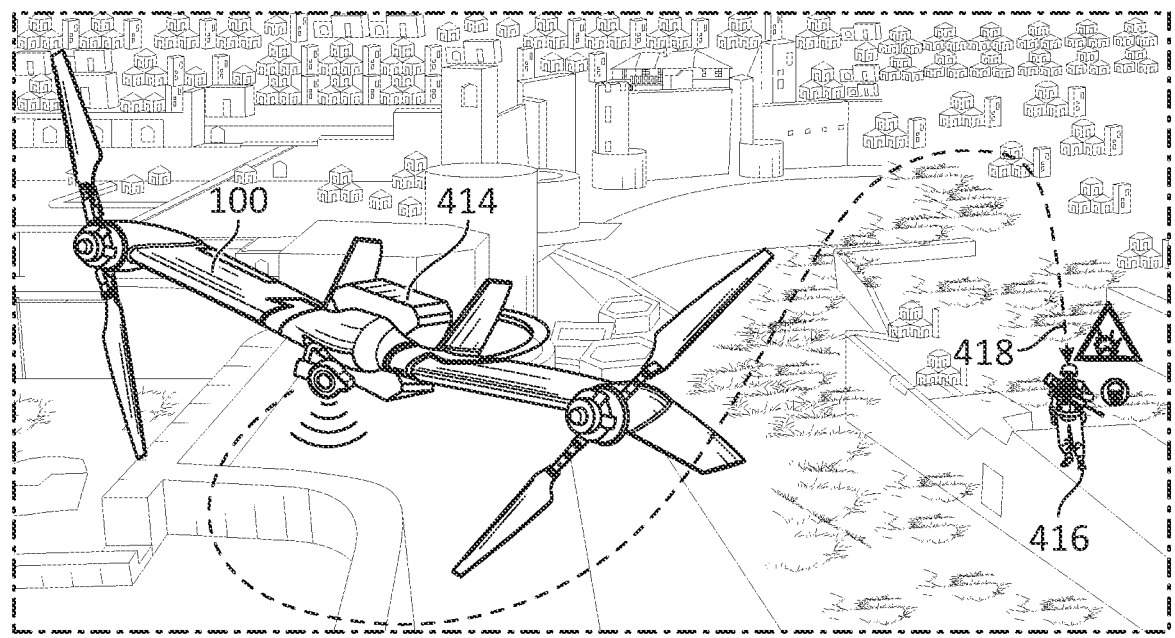
FIG. 4D illustrates use of the UAV as an improvised explosive device or a static intelligence, surveillance, and reconnaissance device, in accordance with an embodiment of the disclosure.

FIG. 4C illustrates a destruction payload of UAV 100, in accordance with an embodiment of the disclosure. FIG. 4D illustrates use of UAV 100 as an improvised explosive device (IED) or a static intelligence, surveillance, and reconnaissance (ISR) device, in accordance with an embodiment of the disclosure. In embodiments, UAV 100 may include an explosive charge 414 (e.g., a nano-charge, a phosphor ignition system, an electric short circuit mechanism, explosives, grenades, gas containers, or other destruction device/system). An operator may fly or otherwise command UAV 100 into the ground, a structure, or an enemy target 416 and trigger the explosive charge 414 either physically (e.g., impact trigger), via sensors (e.g., heat, proximity, face ID, AI trigger, etc.), or remotely (e.g., via a controller, such as an TAK controller). For example, a controller may direct UAV destruction and/or UAV engagement of enemy target 416. An operator may assign a target to UAV 100 and trigger UAV-IED detonation. In some embodiments, an operator may manually pilot UAV 100 into enemy target 416 (e.g., via remote control, a heads-up display, etc.), such as via point-of-view guidance and a live view UAV feed.

In some embodiments, the UAV 100 may be piloted to a designated position 418. An operator may land and hide the UAV 100 at the designated position 418 for use as an IED triggered in a manner similar to that described above. In embodiments, the UAV 100 may be flown and landed in the designated position 418 to function as an ISR device.

FIGS. 5A, 5C, 5D, and 5E illustrate various views of UAV 100 in the folded configuration, in accordance with an embodiment of the disclosure. As shown, the wings 102 may fold and collapse to limit size and form of UAV 100. For example, each wing may hinge or fold in one or more (e.g., a plurality of) locations 500 to fold and collapse UAV 100 into a compact form, such as to facilitate transport and storage.

Figure 5A:
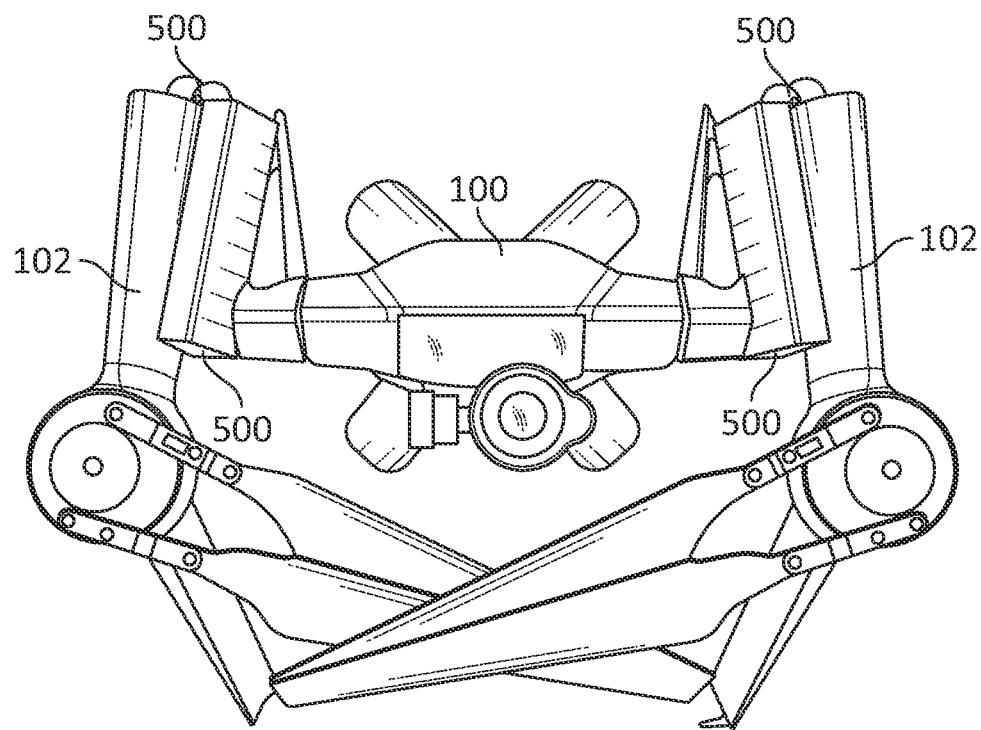
FIG. 5A illustrates the UAV in a folded configuration, in accordance with an embodiment of the disclosure.
Figure 5B:
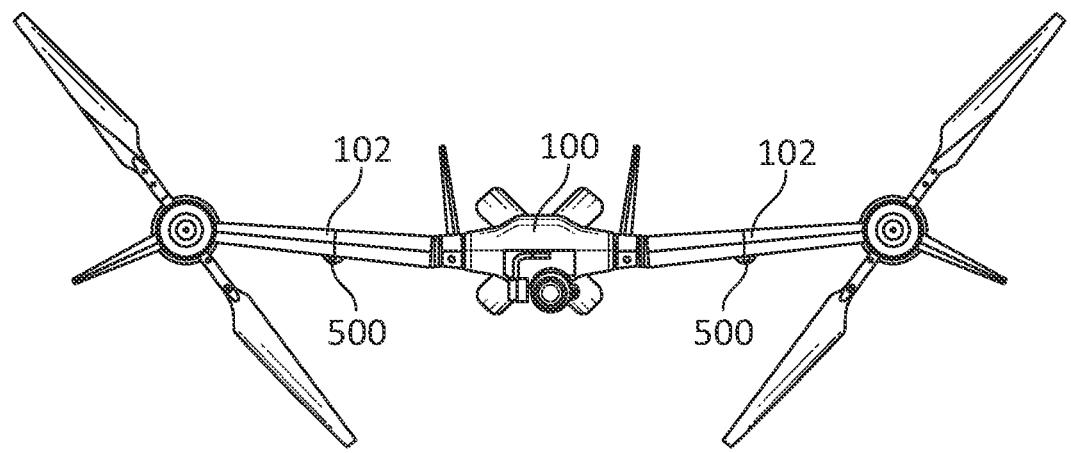
FIG. 5B illustrates the UAV in an unfolded configuration, in accordance with an embodiment of the disclosure.
Figure 5C:
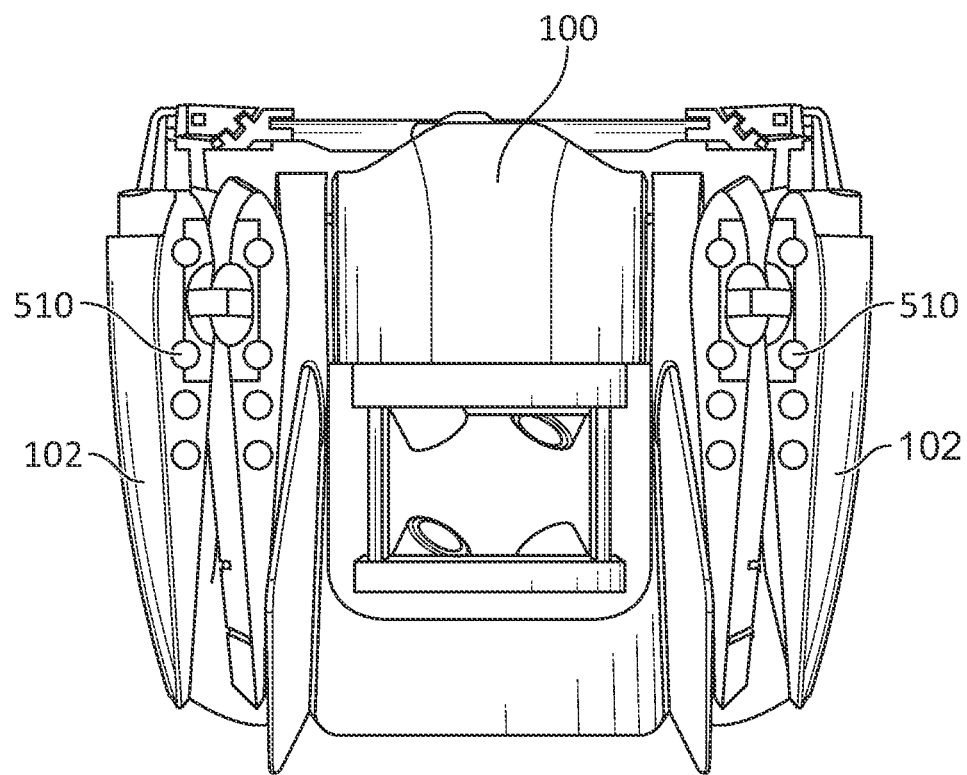
FIGS. 5C, 5D, and 5E illustrate various views of the UAV in the folded configuration, in accordance with an embodiment of the disclosure.
Figure 5D:
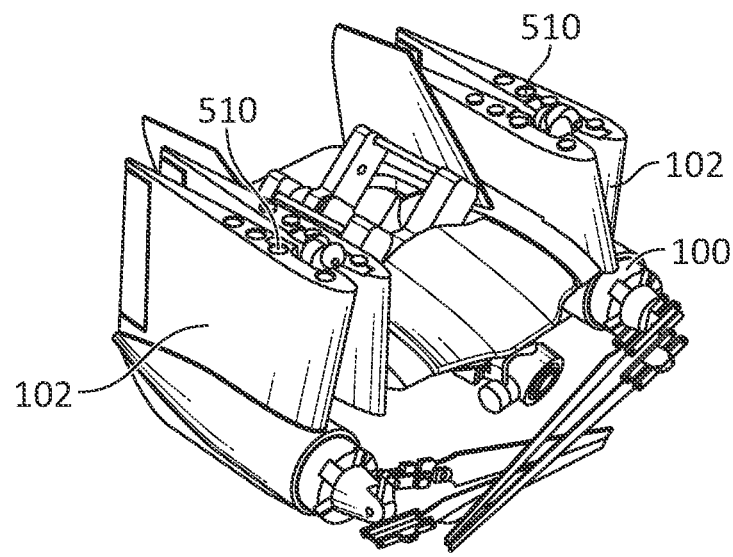
Figure 5E:
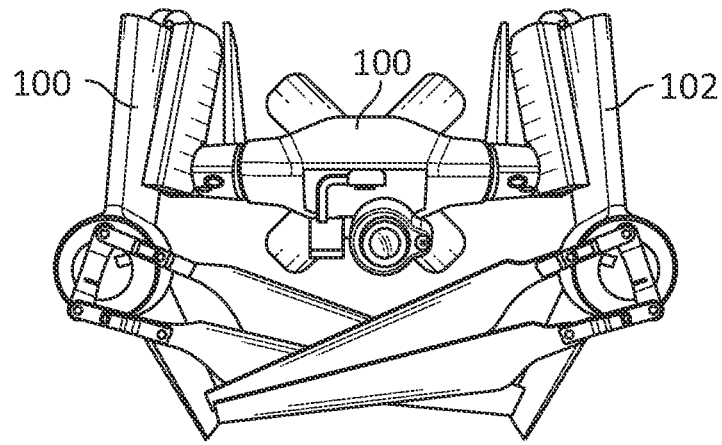

FIG. 5B illustrates UAV 100 in an unfolded configuration, in accordance with an embodiment of the disclosure. As shown, the wings 102 may be unfolded into their extended states for flight. The wings 102 may be held in their unfolded, extended states via various configurations. For example, wing sections may be held together via magnets, locks, or other structures 510. When unfolded, the wings 102 may provide a dihedral wing structure for improved flight stability and performance.

Figure 6:
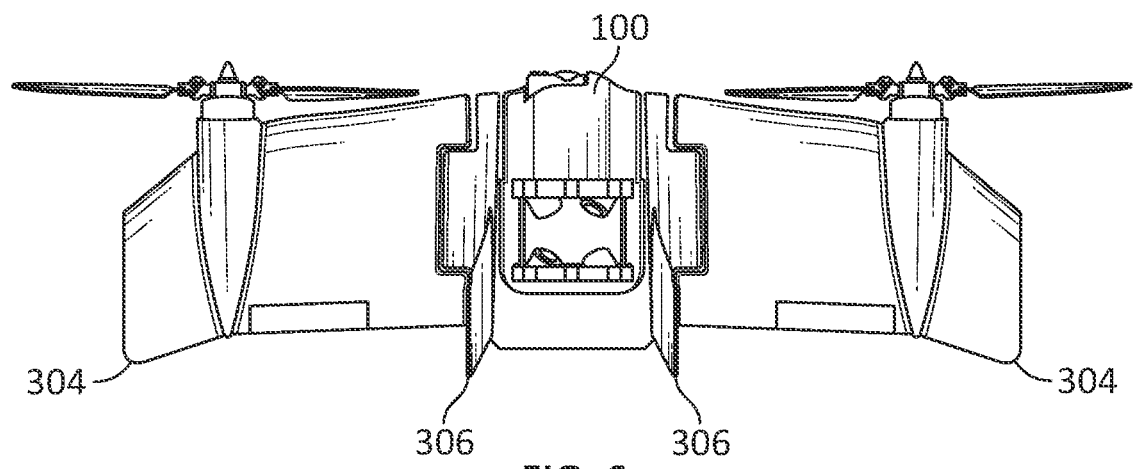
FIG. 6 illustrates a top view of the UAV, in accordance with an embodiment of the disclosure.

FIG. 6 illustrates a top view of UAV 100, in accordance with an embodiment of the disclosure. Referring to FIGS. 5B and 6, UAV's angled wing tips 304 and center fuselage fins 306 may act as built-in vertical take-off and landing gear. For instance, while on the ground, UAV 100 may sit on its angled wing tips 304 and center fuselage fins 306 touching the ground at four spots, although other configurations are contemplated. The angled wing tips 304 and center fuselage tail fins 306 may also provide improved flight stability and performance.

Figure 7:
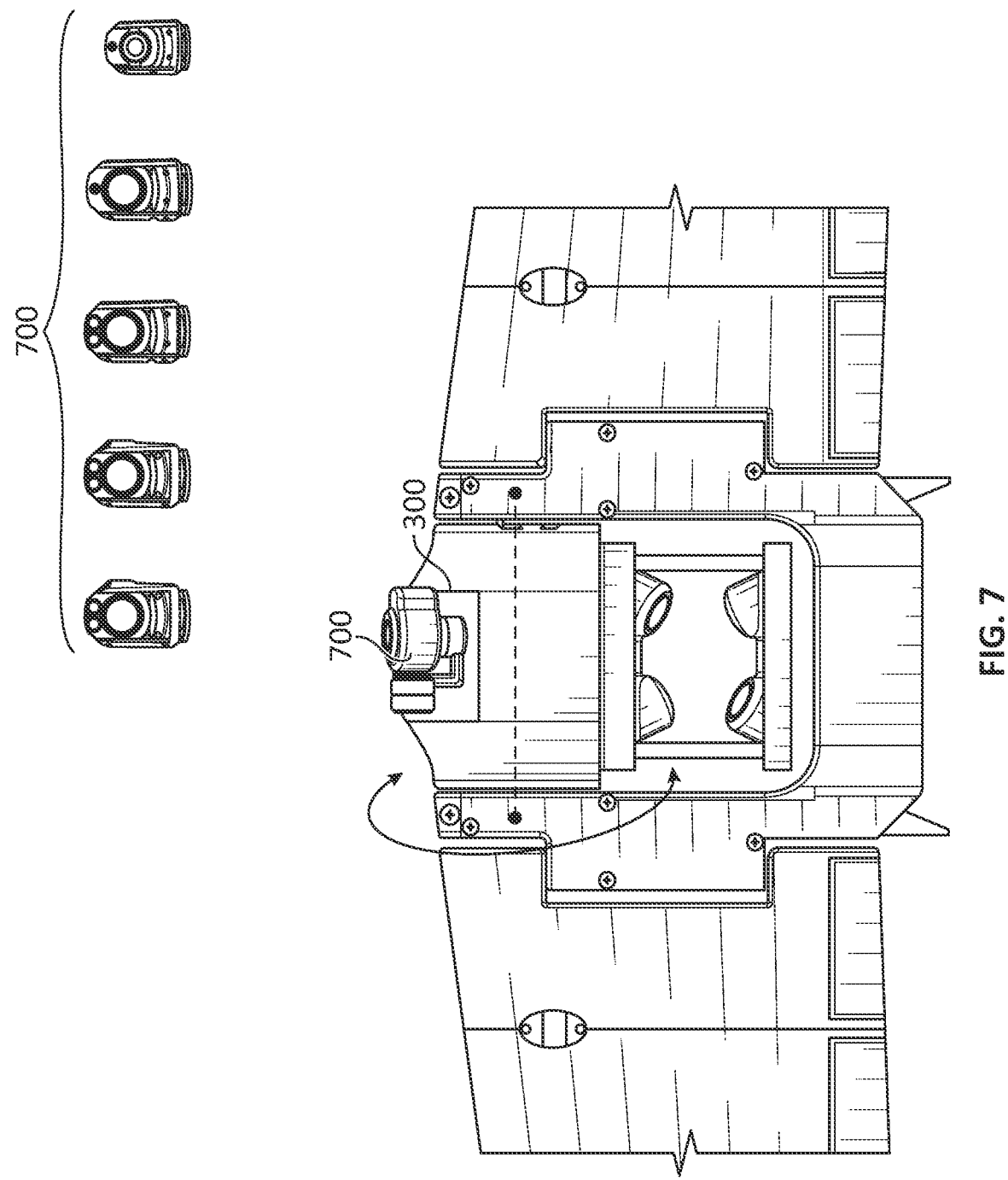
FIG. 7 illustrates a rotating and interchangeable payload system of the UAV, in accordance with an embodiment of the disclosure.

FIG. 7 illustrates the rotating payload 300 of UAV 100, in accordance with an embodiment of the disclosure. Referring to FIG. 7, the rotating payload 300 may be a 360-degree rotating payload system for multi-payload carrier capability. For example, the rotating payload 300 may include an interchangeable rotating payload adapter head 700, able to carry and switch quickly between multiple different payloads (e.g., different ISR cameras). The rotating payload system may have automatic leveling technology (gimbal tech), keeping the payload head 700 in the application-desired position independent of aircraft movement or aircraft position in space.

Figure 8:
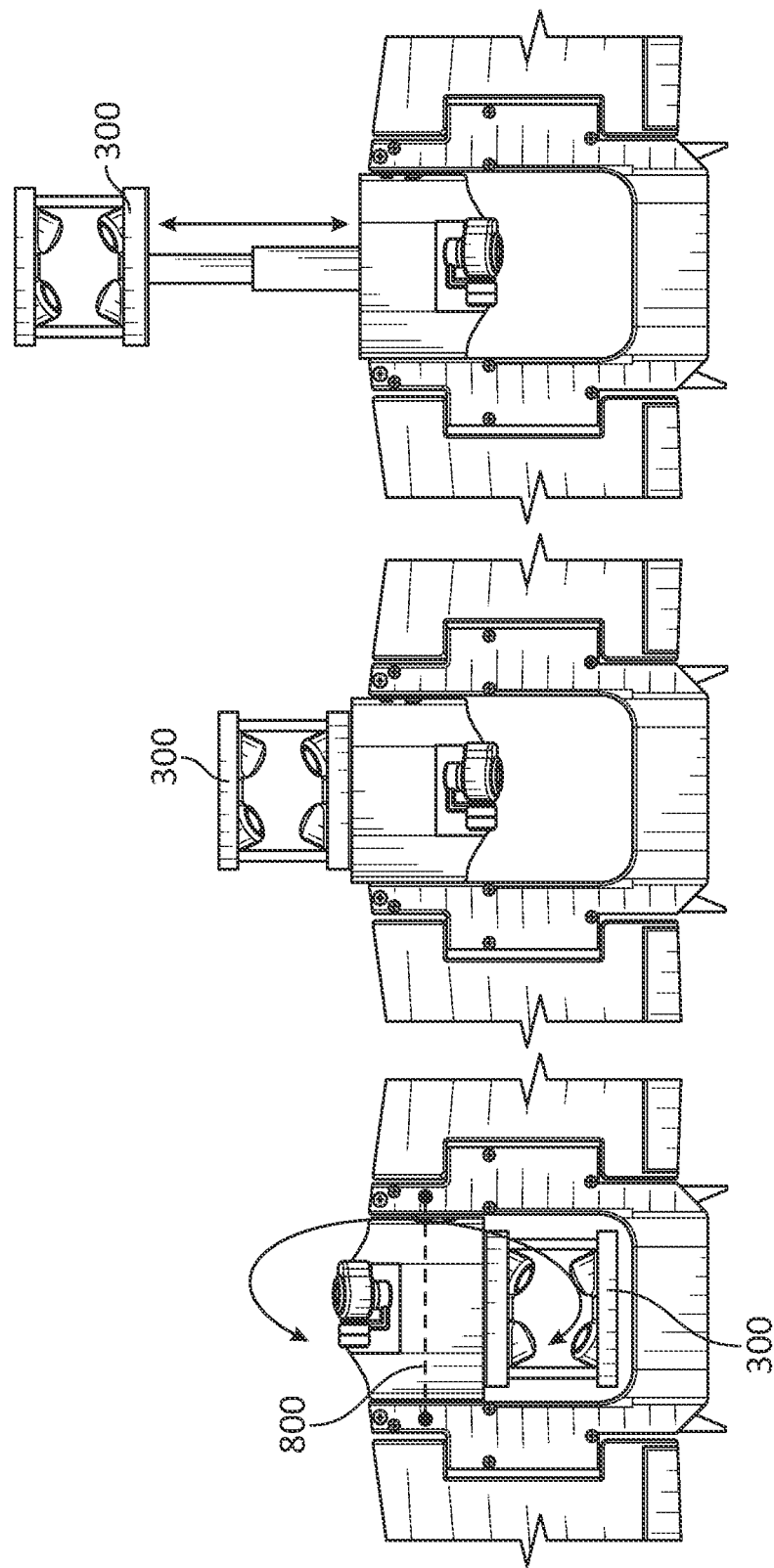
FIG. 8 illustrates the rotating payload in a plurality of positions, in accordance with an embodiment of the disclosure.

FIG. 8 illustrates the rotating payload 300 in a plurality of positions, in accordance with an embodiment of the disclosure. Referring to FIG. 8, the rotating payload 300 may rotate about a gimbal axis 800. Additionally, or alternatively, the rotating payload system may move and lock one or more payloads (e.g., wind, ISR, CBRN and atmospheric sensors) in and out to change the height of the payload 300 (i.e., sensors) relative to the aircraft and relative to the propulsion system. In embodiments, retraction movement of the payload 300 may be mechanically linked to the rotation movement of the payload head 700. For example, when wind/atmospherics sensor turns from 6 o'clock position to 12 o'clock position, during that 180-degree turn the mechanism automatically pushes the wind sensor out. Rotating the payload head 700 back or an additional 180-degrees, the mechanism may automatically retract the sensor in (e.g., to its storage position). The rotating mechanism can be a combined "twist and expand" mechanism, pushing the atmospherics sensor out while turning it upwards to the 12 o'clock position.

Figure 9:
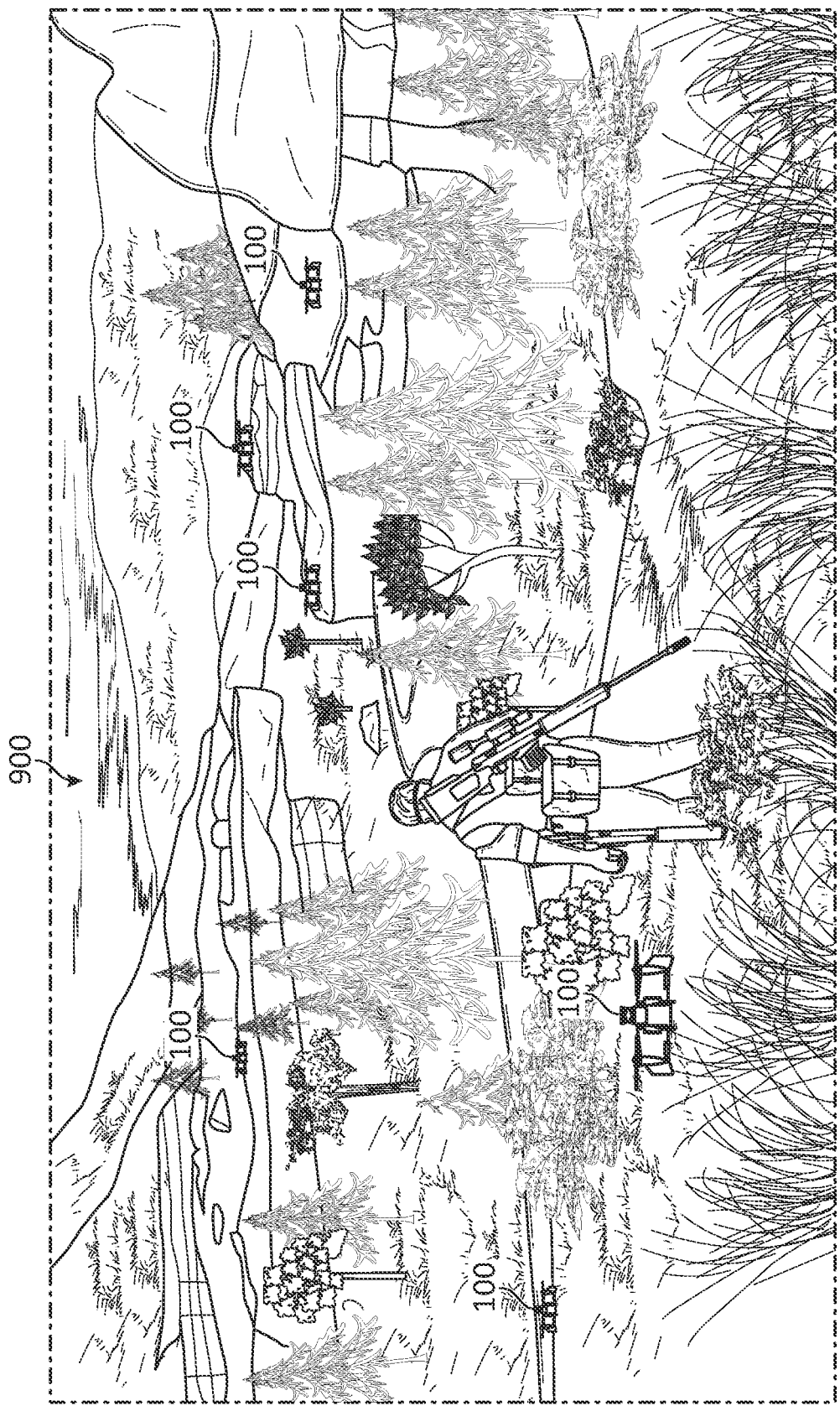
FIG. 9 illustrates a system including a plurality of UAVs, with each UAV in a landed condition, in accordance with an embodiment of the disclosure.

FIG. 9 illustrates a system 900 including a plurality of UAVs 100, with each UAV 100 in a landed condition, in accordance with an embodiment of the disclosure. As shown, multiple UAV systems may be placed in an area to provide multiple data and/or surveillance points. Each UAV 100 may be placed manually by an operator, or each UAV 100 may be piloted and placed in a designated position (e.g., autonomously). Each UAV 100 may land and take-off autonomously or manually. Each UAV's AI, sensor and payload capabilities may be fully functioning and transmitting data to and from the user (e.g., an operator) when landed, with each UAV 100 able to make one or more tactical decisions to protect the mission, the operator, and/or itself.

Figure 10:
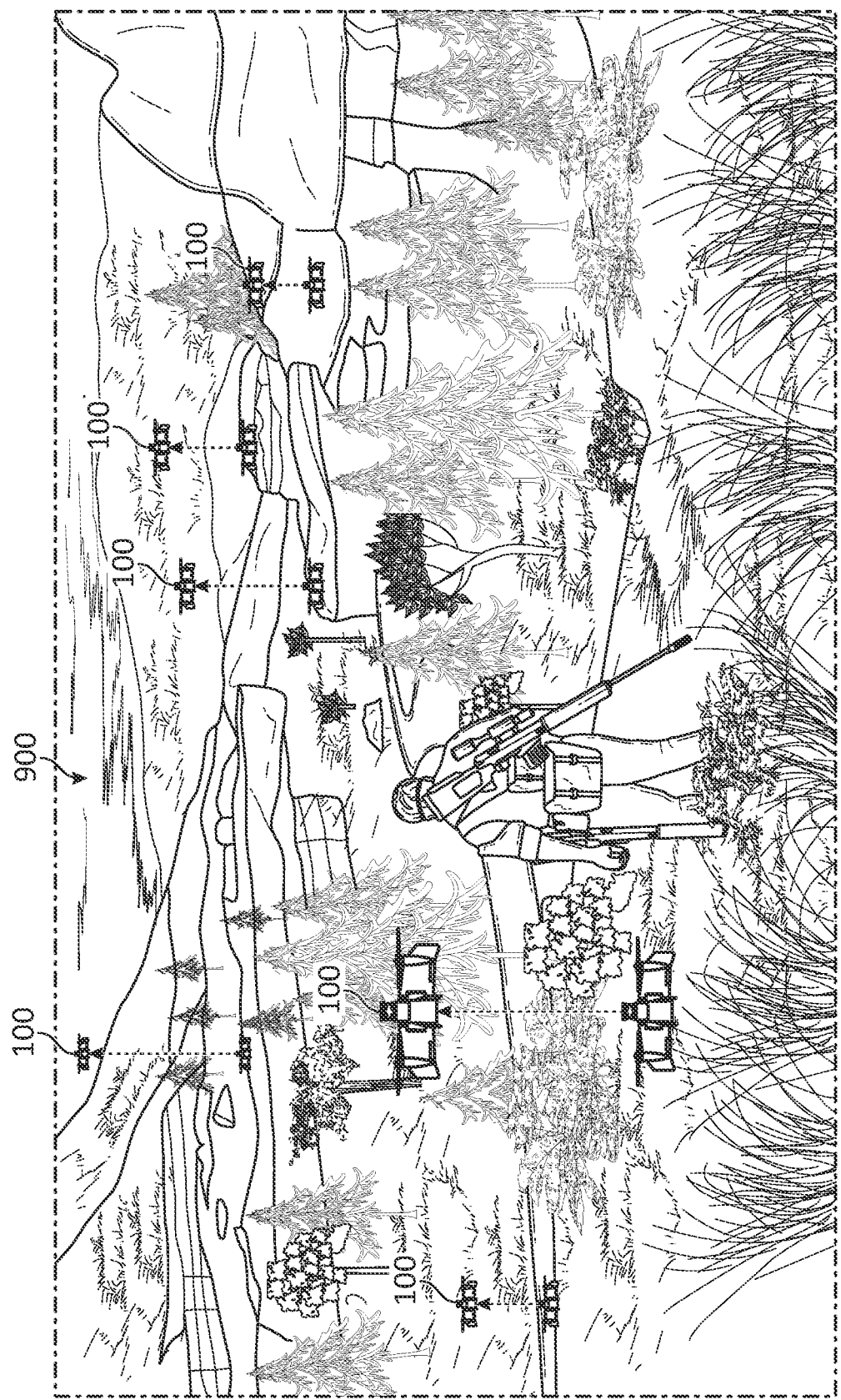
FIG. 10 illustrates the system and shows each UAV in a vertical take-off condition, in accordance with an embodiment of the disclosure.

FIG. 10 illustrates the system 900 and showing each UAV 100 in a vertical take-off condition, in accordance with an embodiment of the disclosure. As shown, each UAV 100 may take off vertically to gather atmospheric data and/or provide surveillance from an elevated or flight position. Each UAV's AI, sensor and payload capabilities may be fully functioning and transmitting data to and from the user (e.g., an operator) when in flight, with each UAV 100 able to make one or more tactical decisions to protect the mission, the operator, and/or itself.

Figure 11A:
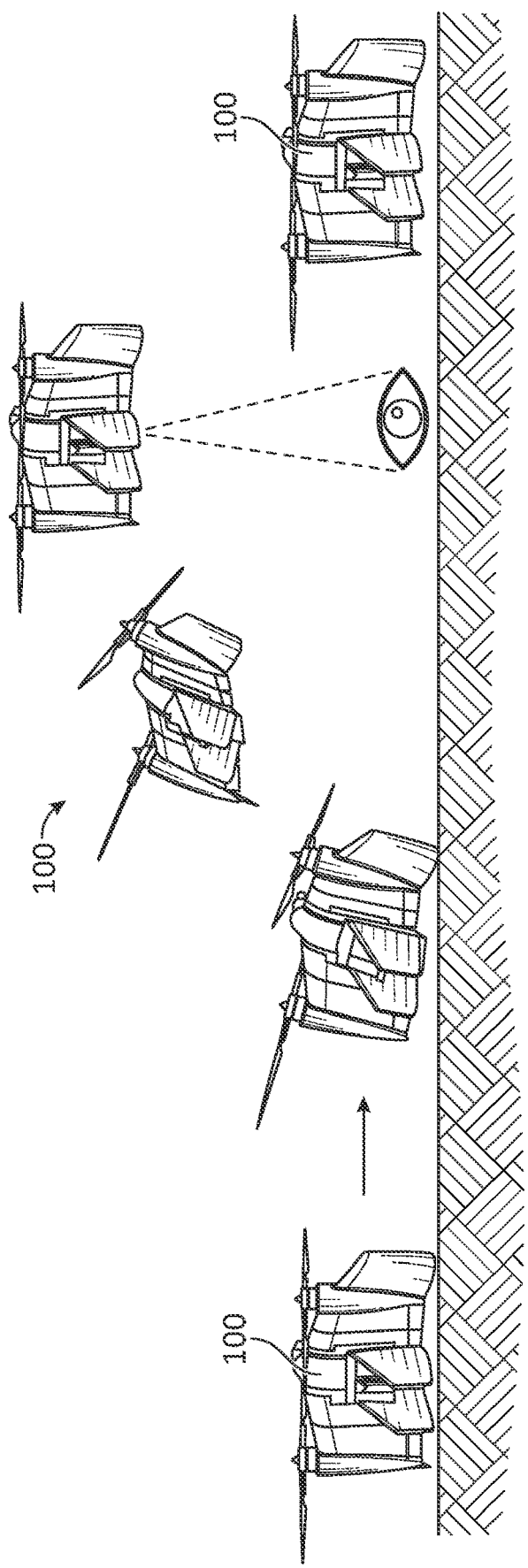
FIG. 11A illustrates a tip-over prevention system of the UAV, in accordance with an embodiment of the disclosure.
Figure 11B:
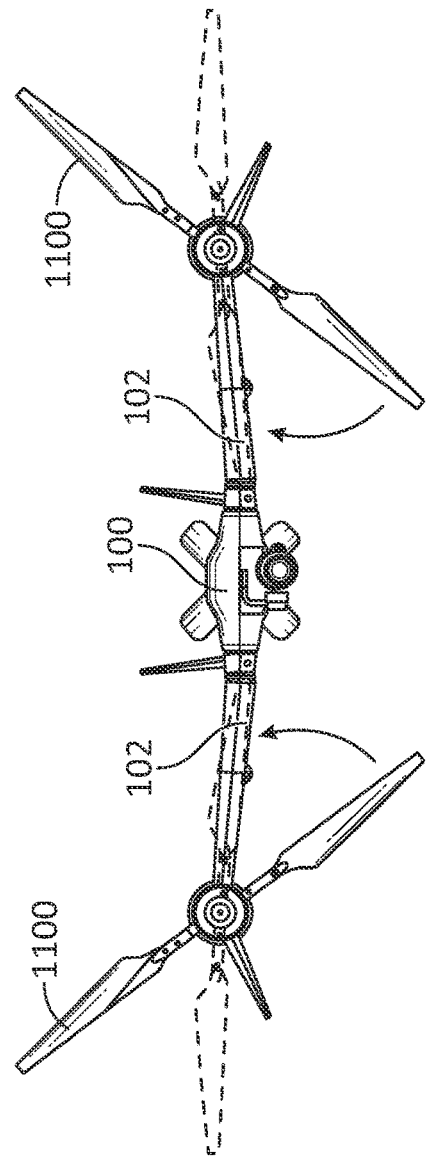
FIG. 11B illustrates a park position of the UAV, in accordance with an embodiment of the disclosure.

FIG. 11A illustrates a tip-over prevention system of UAV 100, in accordance with an embodiment of the disclosure. FIG. 11B illustrates a park position of UAV 100, in accordance with an embodiment of the disclosure. Referring to FIGS. 11A and 11B, UAV 100 may be equipped with one or more safety and/or damage prevention systems. For example, referring to FIG. 11A, UAV 100 may have the ability to prevent itself from tipping over when on ground and the ability to self-recover from a crash or fall. In such embodiments, gyroscopic sensors monitor the orientation of the aircraft while on the ground, constantly looking for threatening lateral and other directional forces that could bring the vertical upright position of the aircraft out of balance. If such threatening force appears and pushes or pulls the aircraft out of balance, UAV 100 initiates an instant thrust boost to catch itself from tipping over and falling to the ground. UAV 100 may instantly take off by itself to a designated flight level above ground and remain in a hover position. UAV 100 may then initiate a sensor-based landing area and threat assessment scan, looking for a new and safe landing spot. After automatic assessment or manual inspection through the user, UAV 100 may initiate a landing procedure to continue its prior task before the threat occurred.

Referring to FIG. 11B, UAV 100 may automatically adjust its components when landed on the ground. For instance, when landed on the ground, UAV 100 may automatically adjust its rotor blades 1100 into a park position—aligning the rotor blades 1100 with the direction of the wings 102. Such configurations may limit rotor breakage or damage in case of a fall or crash.

Figure 12:
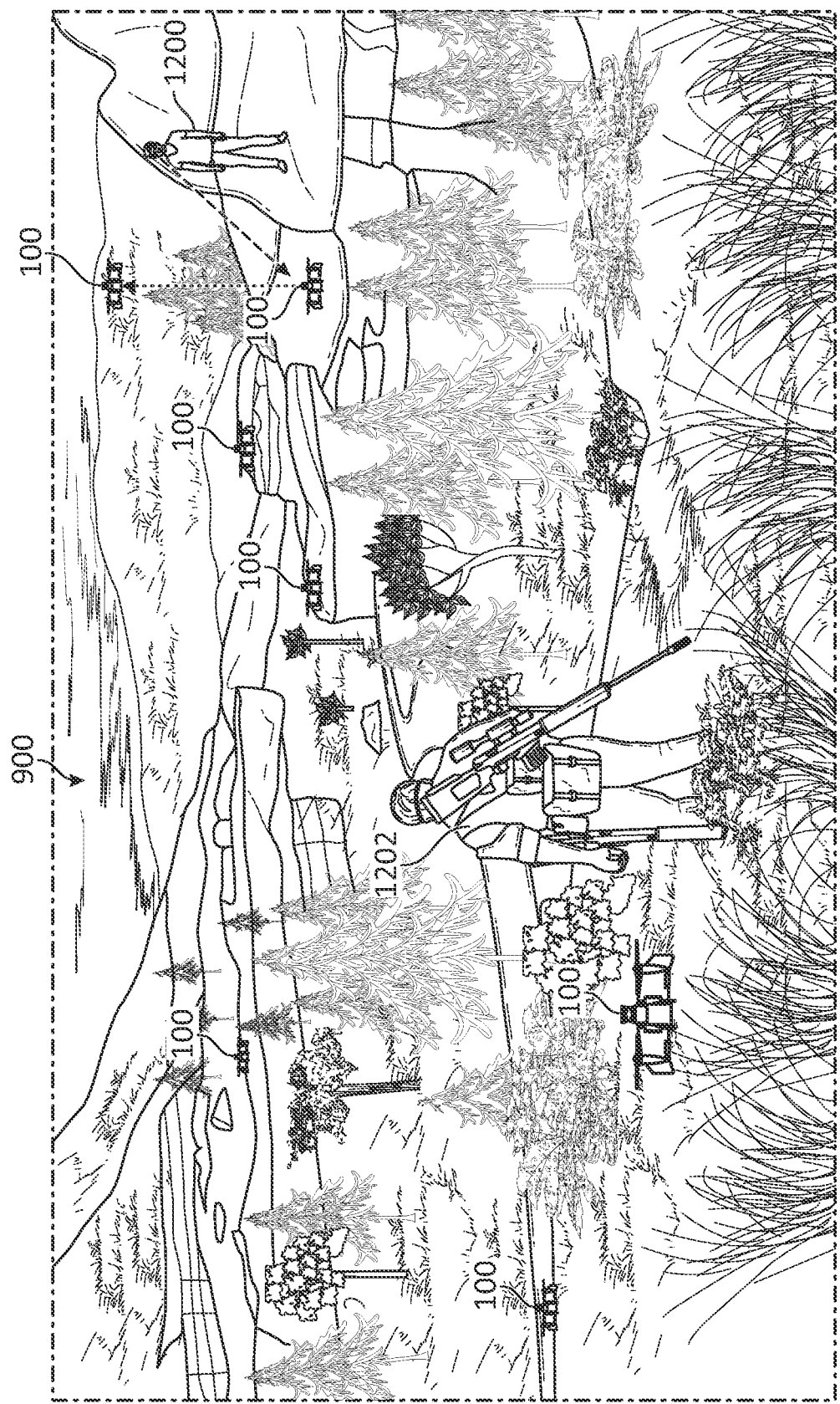
FIG. 12 illustrates the system of FIGS. 9 and 10 and shows a threat analysis, in accordance with an embodiment of the disclosure.

FIG. 12 illustrates the system 900 of FIGS. 9 and 10 and showing a threat analysis, in accordance with an embodiment of the disclosure. UAV 100 may constantly scan its environment for possible threats 1200 to the aircraft, an operator 1202, and/or the mission and has the capability to decide on its own or by user input to take off and leave its current area or space to maintain discreteness of the operation or maneuver.

Figure 13:
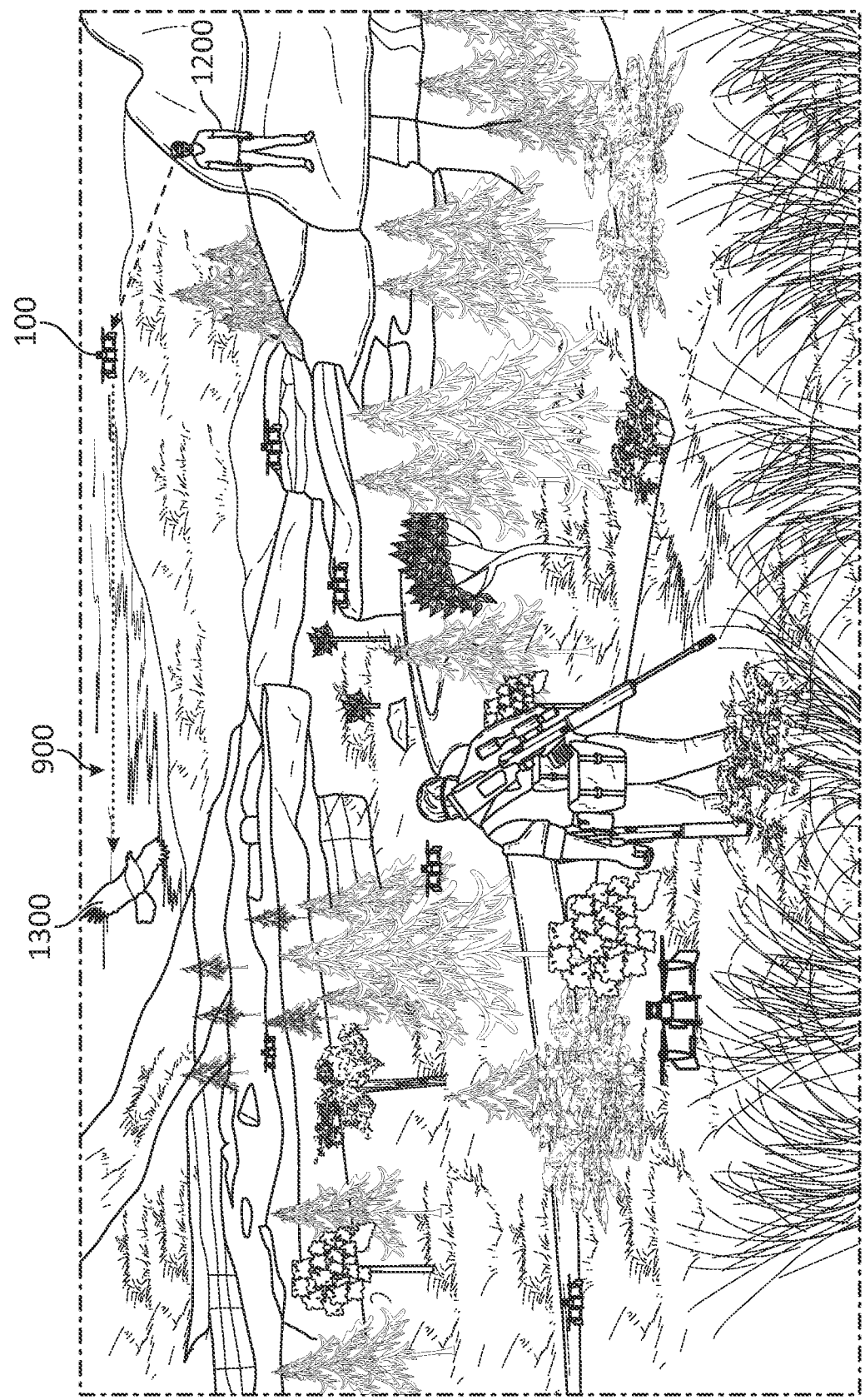
FIG. 13 illustrates the system and shows a bio-mimicking behavior of the UAV, in accordance with an embodiment of the disclosure.

FIG. 13 illustrates the system 900 and shows a bio-mimicking behavior of UAV 100, in accordance with an embodiment of the disclosure. When airborne, UAV 100 may apply a bio-mimicking behavior to blend in with nature and the animal kingdom. For example, UAV 100 may initiate a flight pattern similar to a bird 1300 to maintain discreteness of the operation or maneuver. The bio-mimicking behavior may be chosen based on locale, environment, or season. For instance, the bio-mimicking behavior may imitate a local bird to further facilitate discreteness of the operation or maneuver.

Figure 14:
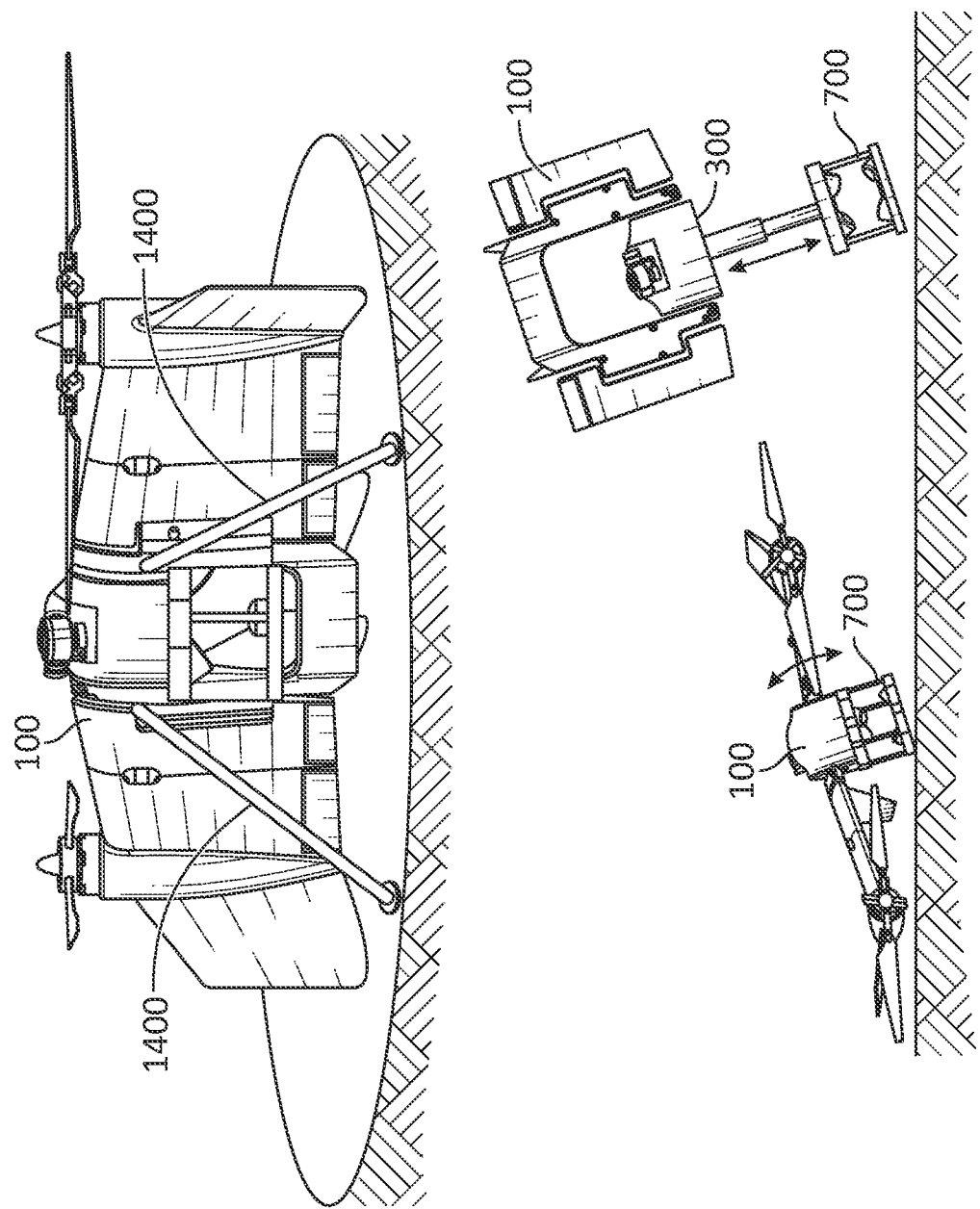
FIG. 14 illustrates additional self-recovery features of the UAV, in accordance with an embodiment of the disclosure.

FIG. 14 illustrates additional self-recovery features of UAV 100, in accordance with an embodiment of the disclosure. As shown, UAV 100 may include self-recovery features that allow a safe and successful aircraft launch after a crash, fall or tip-over. For example, UAV 100 may include fix-mounted or deployable landing legs 1400 that prevent the aircraft from tipping over. In some embodiments, the rotating and expandable payload head 700 may act as a kinetic recovery feature that alters the aircraft's position on the ground, such as to bring the rotors 104 into a free-spinning position/elevation. From the free-spinning position, UAV 100 may initiate an instant boost to initiate an instant aircraft launch where the aircraft and all its features test and reset themselves before bringing the aircraft back to the ground in a safe, upright and controlled manner.

Figure 15:
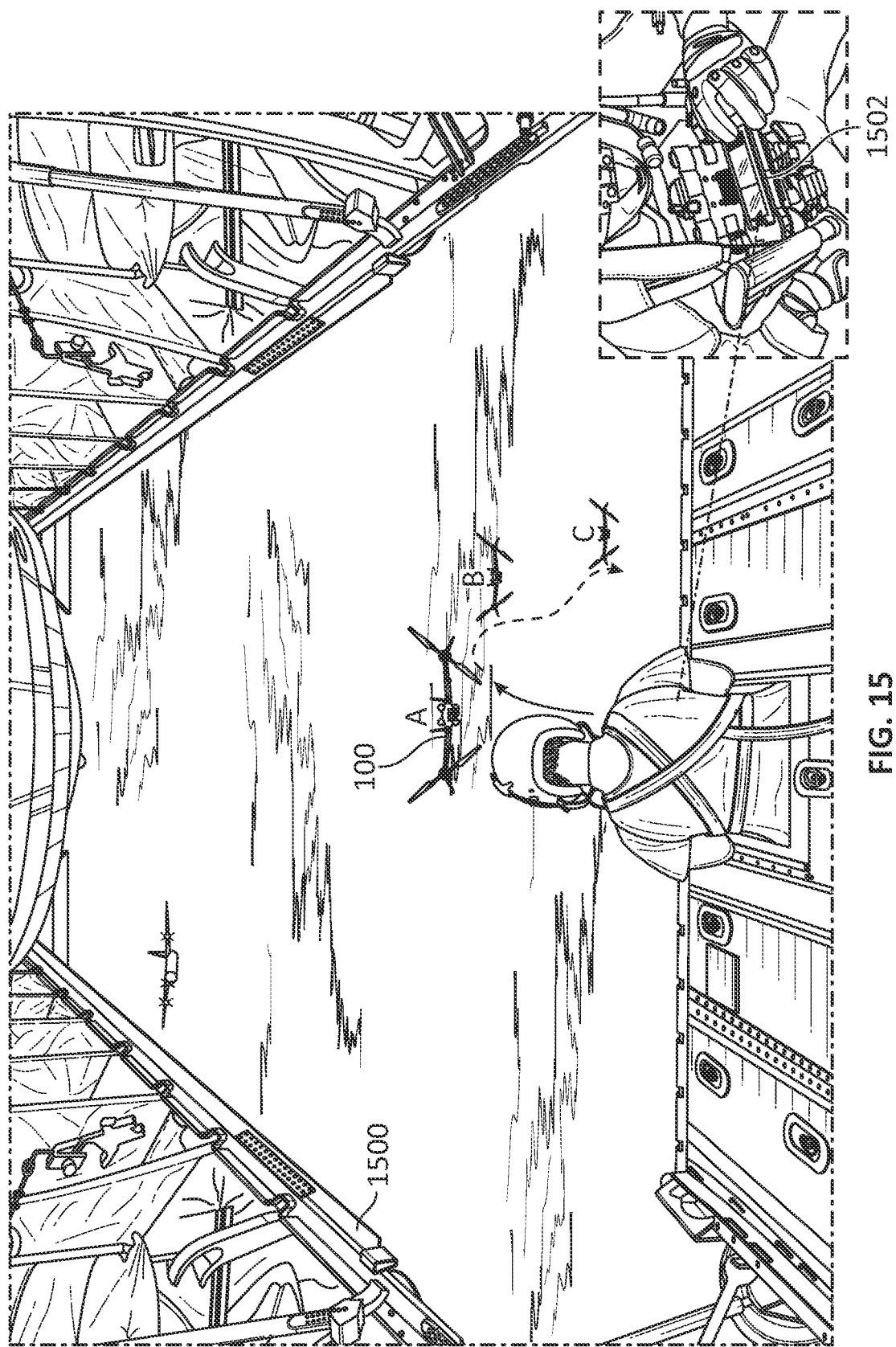
FIG. 15 illustrates a low flight or low speed carrier airdrop mode of the UAV, in accordance with an embodiment of the disclosure.

FIG. 15 illustrates a low flight airdrop mode of UAV 100, in accordance with an embodiment of the disclosure. In some embodiments, UAV 100 may have low velocity airdrop survivability. For example, UAV 100 may be released, launched, or thrown from a fixed-wing or rotary-wing aircraft 1500 at low flight velocity. UAV 100 may launch itself when in free fall and gain control over its flight maneuvers and/or stability automatically (autonomously). As shown, a real-time data stream may exist from UAV 100 to the user/operator (e.g., to an TAK system 1502).

Figure 16:
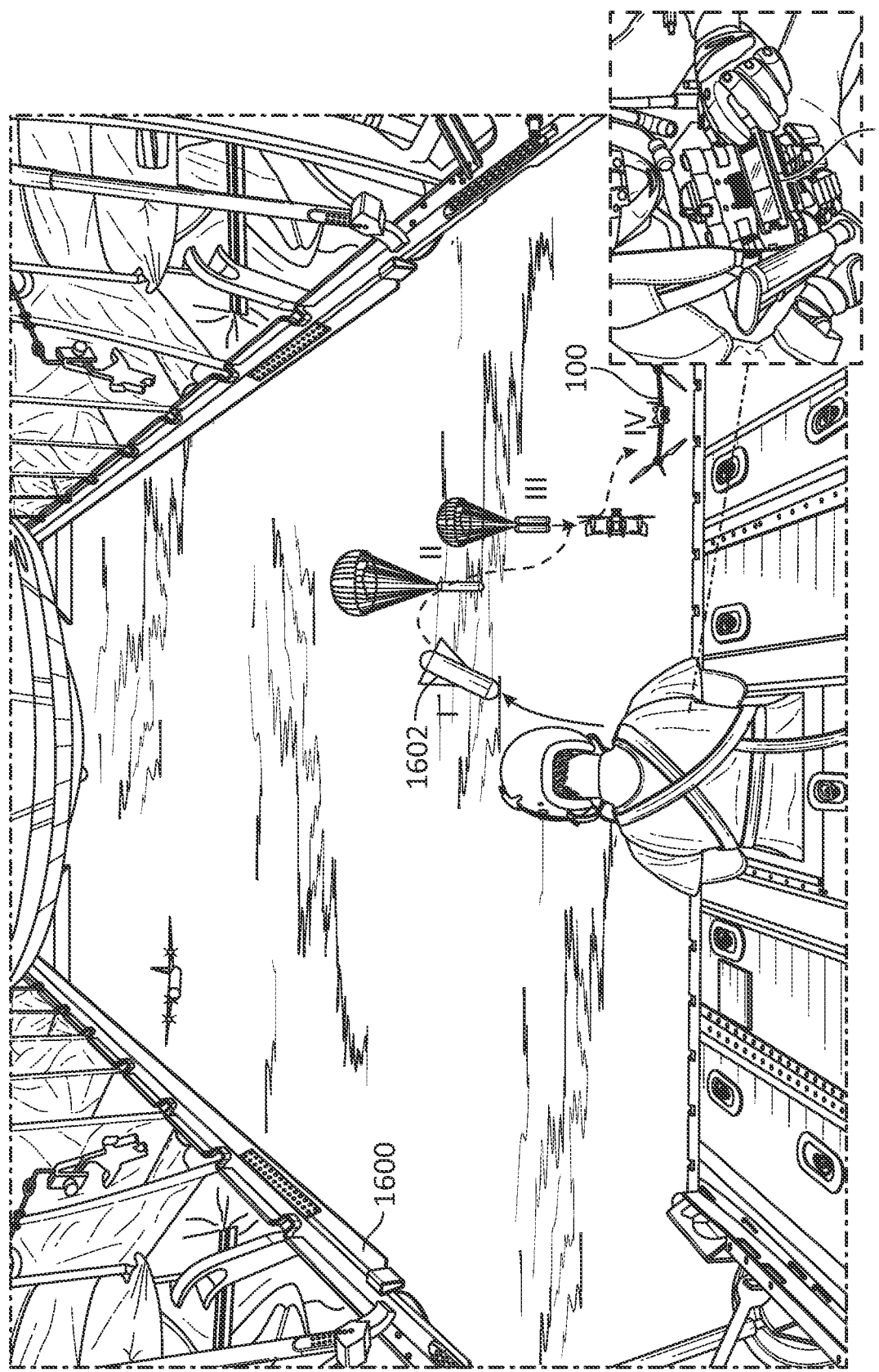
FIG. 16 illustrates a high flight or high-speed carrier airdrop mode of the UAV, in accordance with an embodiment of the disclosure.

FIG. 16 illustrates a high flight airdrop mode of UAV 100, in accordance with an embodiment of the disclosure. In embodiments, UAV 100 may have high velocity airdrop survivability. For instance, UAV 100 may be released, launched, or thrown from a fixed-wing or rotary-wing aircraft 1600 at high flight velocity (e.g., greater than 130 mph). As shown, UAV 100 may be released inside a protective shell compartment 1602 with automatic parachute and aircraft release systems triggered by timer, remote trigger, or designated atmospheric value/parameter.

FIG. 17 illustrates a high speed/high altitude airdrop shell 1700 for UAV 100, in accordance with an embodiment of the disclosure. As shown, the airdrop shell 1700 may be released, thrown, or deployed from a fixed-wing or rotary-wing manned or unmanned aircraft or airborne platform 1702. During freefall, atmospherics are measured and transmitted in real-time to the user. At a certain point, freefall of the airdrop shell 1700 may be slowed down by automatic or manual parachute deployment. During parachute mode, atmospherics are measured and transmitted in real-time to the user. When conditions are right, UAV 100 may automatically release from the airdrop shell 1700, whether triggered by timer, atmospheric trigger, remote, freefall speed, or the like. For example, the airdrop shell 1700 may open, and UAV 100 may slide out of the shell compartment by gravity force. Once clear of the airdrop shell 1700, UAV 100 may start its rotors 104 automatically when the aircraft enter freefall again to gain control over its flight status. Once flight status of UAV 100 is regained, UAV 100 may be ready to operate and execute missions in space environment, with ISR and atmospherics measurements transmitted in real-time to the user.

The airdrop shell 1700 may have many configurations. For example, the airdrop shell 1700 may protect UAV 100 from instant high-speed forces and environmental exposure when released from extreme altitudes. The airdrop shell 1700 may have an aerodynamic shape that softens the instant exposure to high-speed wind forces. The airdrop shell 1700 may have an aerodynamic shape that actively or passively starts to spin once it hits the airstream behind the carrier aircraft. The airdrop shell 1700 may have an aerodynamic shape with stabilizer surfaces or wings to ensure a stable launch from the carrier aircraft. The airdrop shell 1700 may be released on a cut-away rope that remains attached to the inside of the carrier aircraft until the shell 1700 has reached a stable spin or glide status in the airstream. The airdrop shell 1700 may use a passive or automatic one or two stage parachute deployment system (1. Pilot chute, 2. Main chute) to stabilize the exposure to the airstream and then reduce the shell's speed while falling back to earth. The airdrop shell 1700 may include a passive or active trigger that releases the UAV 100 from the shell platform. Such mechanism may be triggered by a timer, altitude sensor, location sensor, manual remote user input, temperature sensor, air pressure sensor, or Lidar sensor. The airdrop shell 1700 may be built from a material that disintegrates over time when exposed to sunlight and/or other environmental conditions (e.g., will leave no footprint in enemy territory).

In some embodiments, the airdrop shell 1700 may be parachute-less. For instance, the airdrop shell 1700 may have a shape that takes advantage of the autorotation principle to slow down the vertical fall, known from spinning maple seeds or passenger helicopters (emergency procedure). The airdrop shell 1700 bio-mimicking a maple seed shape may use an aerodynamically, stabilized stationary (non-spinning) center compartment, housing the UAV 100 while maintaining a controlled outer rotating wing system comprising of one or multiple autorotating blades. The autorotating passive fall allows UAV 100 (which sits inside the shell 1700) to measure real-time atmospherics while falling back to earth and sending this information back to the carrier aircraft (e.g., HALO jumpers that are ready to skydive after the UAV 100 has mapped the local air profile and has reached the hovering final ISR altitude (300 ft above the landing zone) streaming live footage back to the HALO teams and their TAK screens 1502).

Figure 18A:
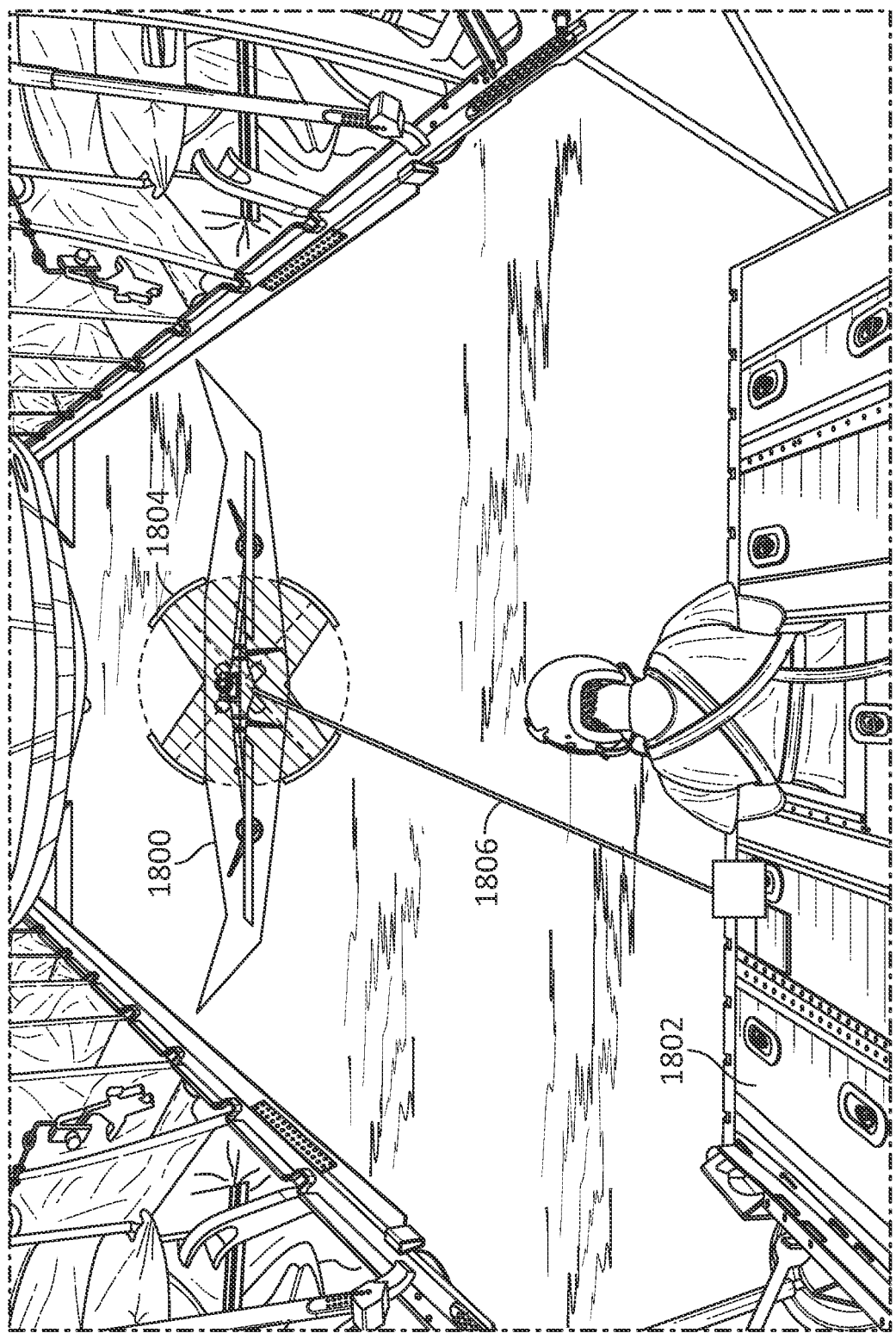
FIGS. 18A and 18B illustrate a parachute-less airdrop shell tethered to a carrier aircraft, in accordance with an embodiment of the disclosure.
Figure 18B:
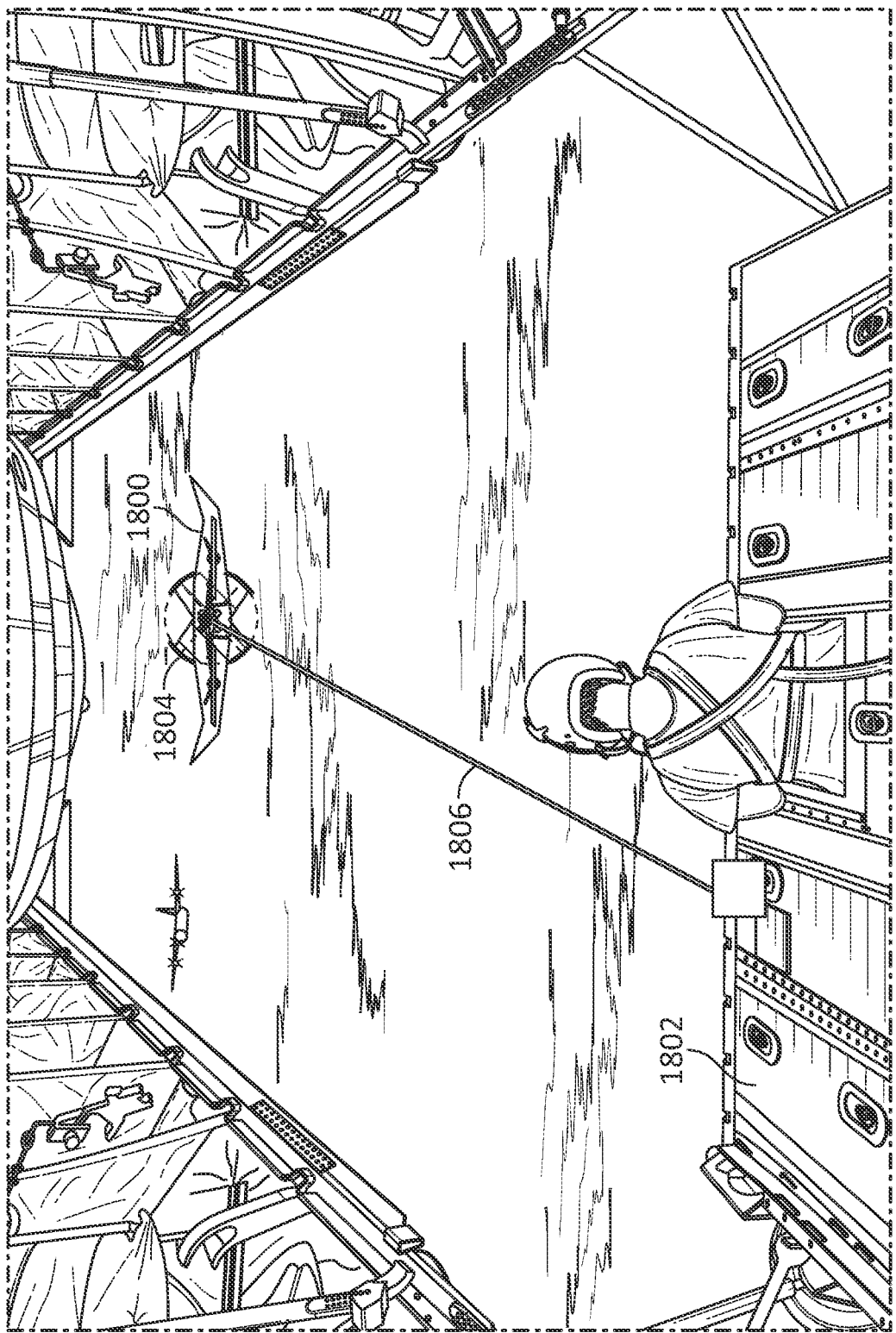

FIGS. 18A and 18B illustrate a parachute-less airdrop shell 1800 tethered to a carrier aircraft 1802, in accordance with an embodiment of the disclosure. As shown, autorotating rotor blade flaps 1804 may be in compact positions alongside the main shell body. In this position, the blade flaps 1804 may be spring-loaded and held in position by constant pull (drag force) that is created by the release rope 1806 attached to the carrier aircraft.

Figure 19:
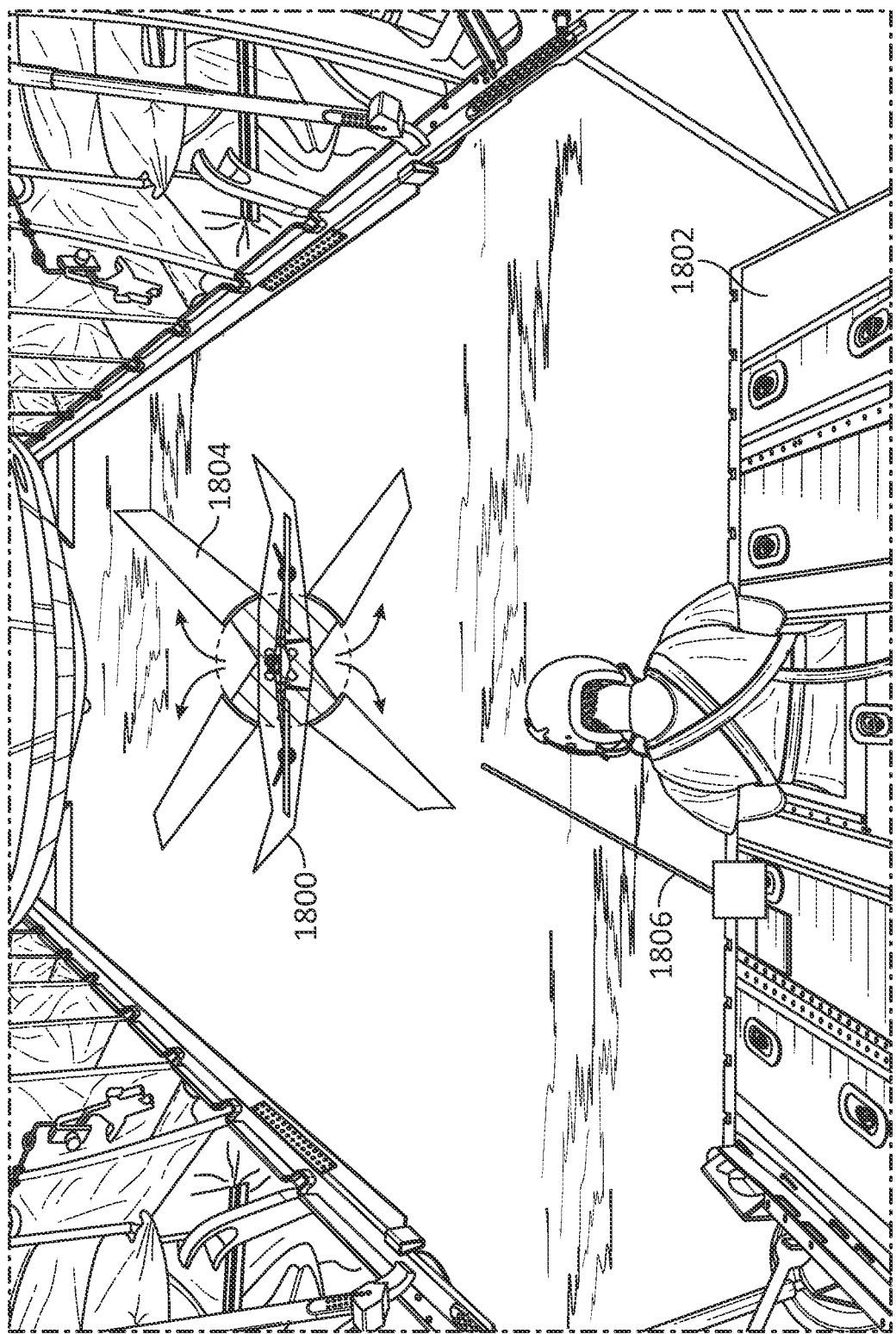
FIGS. 19-20 illustrate the parachute-less airdrop shell released from the carrier aircraft, in accordance with an embodiment of the disclosure.
Figure 20:
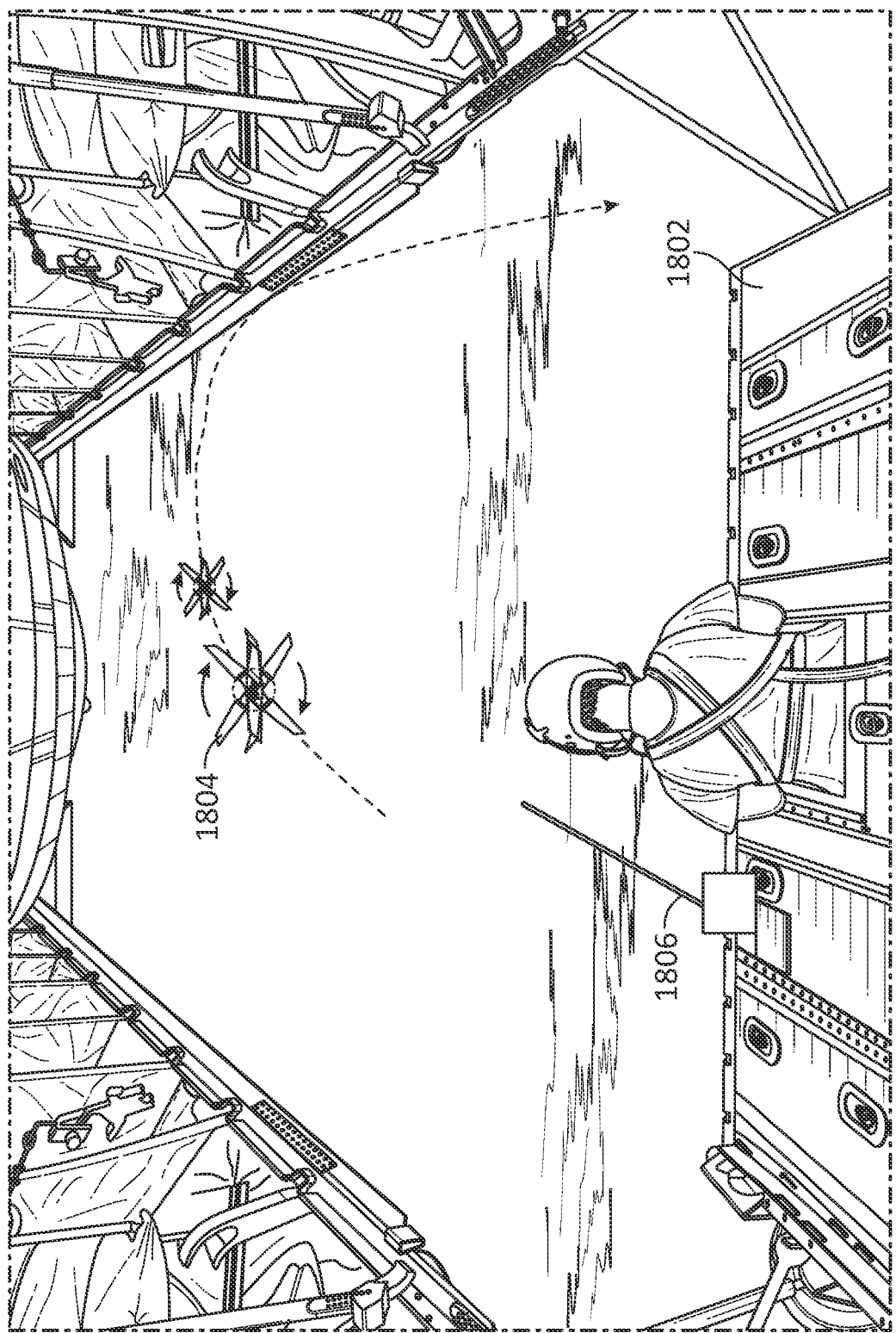

FIGS. 19-20 illustrate the parachute-less airdrop shell 1800 released from the carrier aircraft 1802, in accordance with an embodiment of the disclosure. As shown in FIG. 19, the blade flaps 1804 may pop out by 90 degrees once the rope 1806 has released the shell 1800 and/or the airspeed of the shell 1800 has decreased enough so that the blade flaps 1804 aren't held down by the high-speed airstream. As shown in FIG. 20, the blade flaps 1804 of the airdrop shell 1700 may begin rotating when exposed to the airstream. In embodiments, the main body (i.e., center fuselage, center of mass, airdrop shell) may remain stationary while the blade flaps 1804 are rotating.

Figure 21:
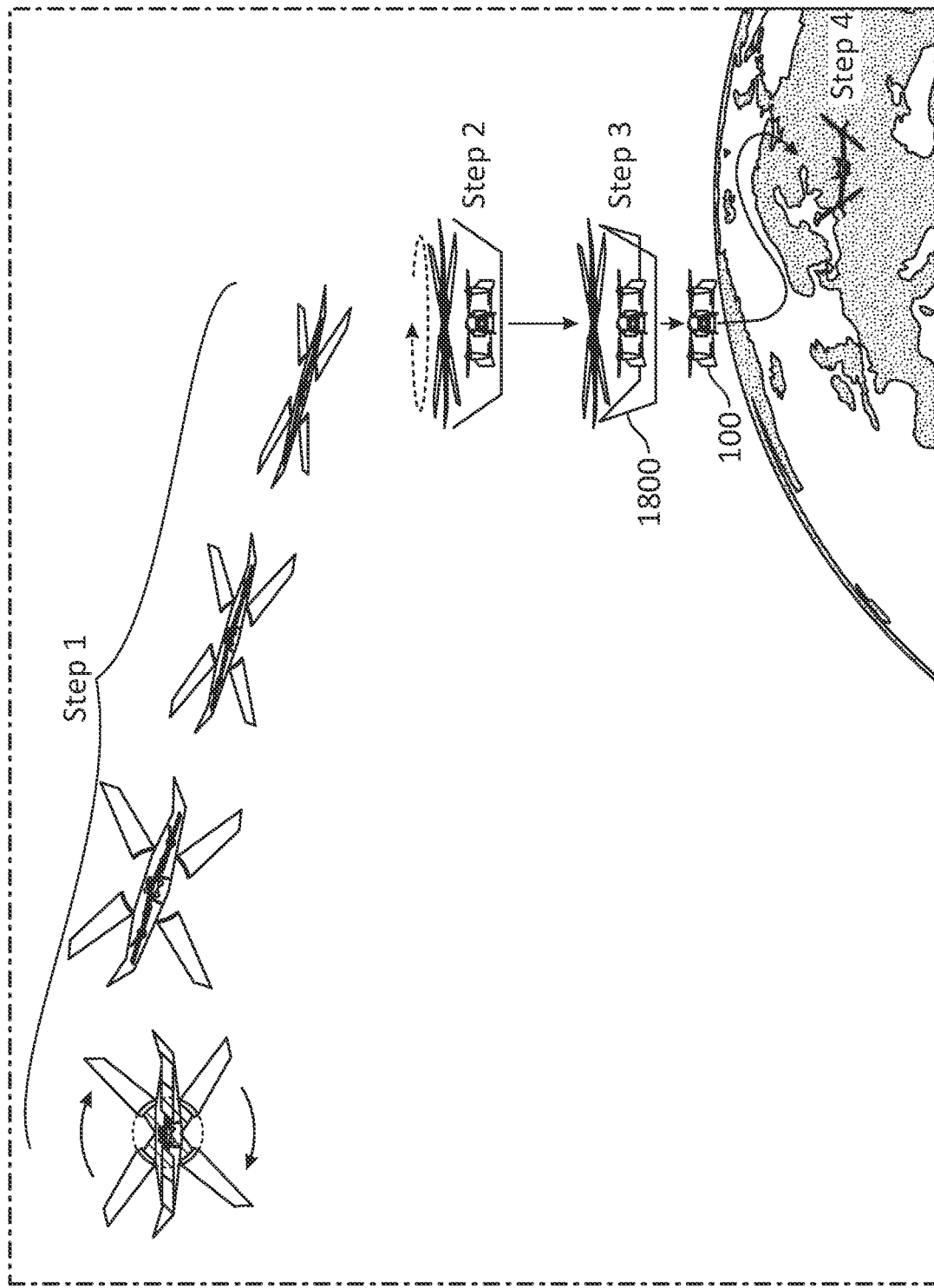
FIG. 21 illustrates deployment of the parachute-less airdrop shell, in accordance with an embodiment of the disclosure.
Figure 22:
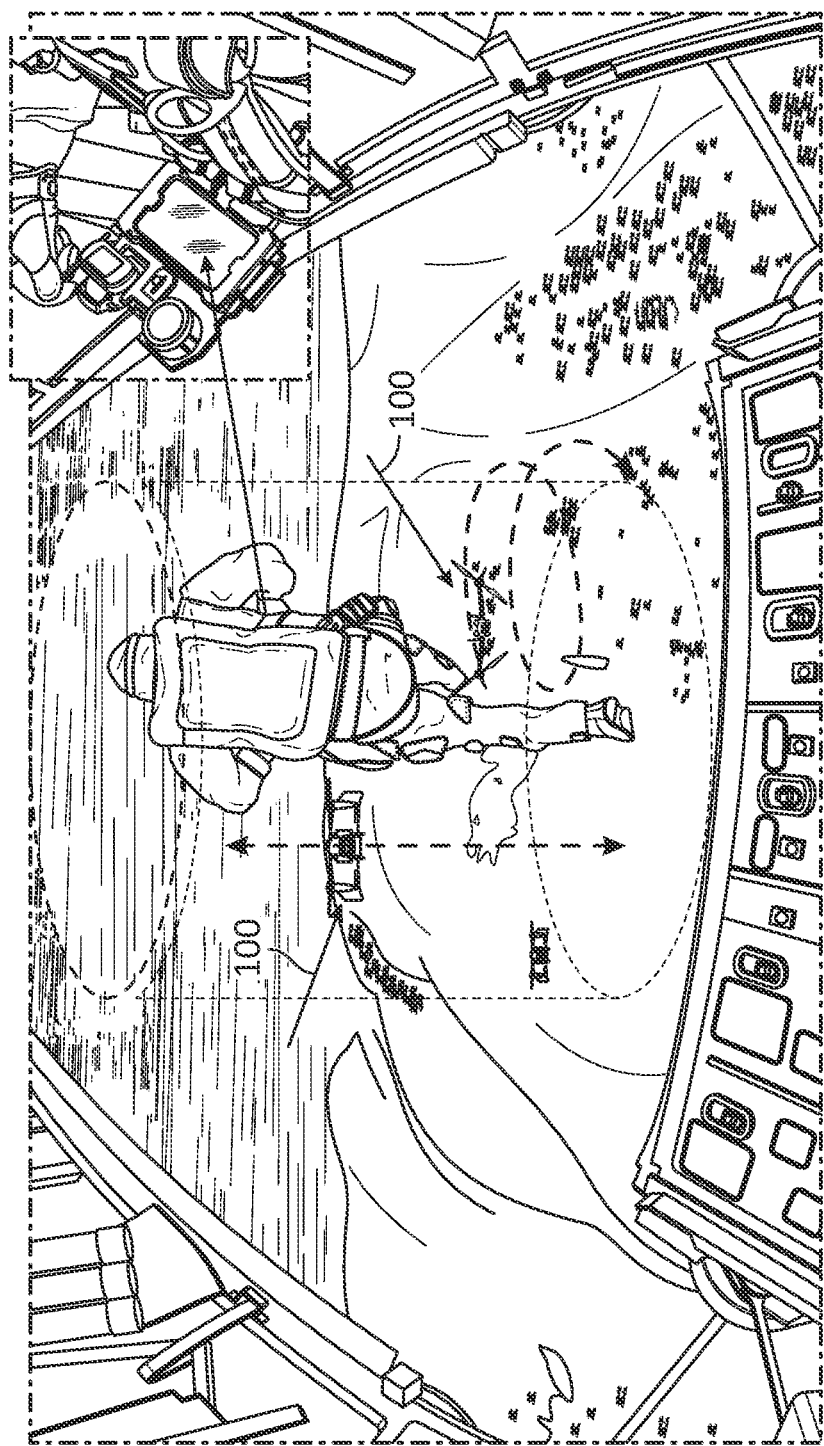
FIGS. 22-28 illustrate various UAV-assisted operations, in accordance with one or more embodiments of the disclosure.

FIG. 21 illustrates deployment of the parachute-less airdrop shell 1800, in accordance with an embodiment of the disclosure. At Step 1, the parachute-less airdrop shell 1800 may be released, thrown, or dropped from a fixed-wing or rotary-wing manned or unmanned aircraft or airborne platform, with atmospherics measured and transmitted in real-time to the user during freefall. At Step 2, freefall may be slowed down by autorotating rotor blades, with atmospherics measured and transmitted in real-time to the user. At Step 3, UAV 100 may automatically release, triggered by timer, atmospheric trigger, remote, freefall speed, etc. For example, UAV 100 may slide out of the shell compartment by gravity force and start its rotors 104 automatically when the aircraft enters freefall again to gain control over its flight status. At Step 4, UAV 100 may be ready to operate and execute missions in the environment.

FIGS. 22-28 illustrate various UAV-assist operations, in accordance with one or more embodiments of the disclosure. For example, referring to FIG. 22, UAV 100 may be utilized to map and measure a desired atmospheric corridor and calculate an atmospheric profile prior to a parachute jump from an airborne platform. In such embodiments, UAV 100 may measure wind parameters and atmospherics in vertical descent or ascent modes, in a static hover mode, and/or in motion (e.g., by applying sensor-fusion technology and/or wind triangle calculations). UAV 100 may provide a real-time data stream to the user (e.g., parachute jumper).

Figure 23:
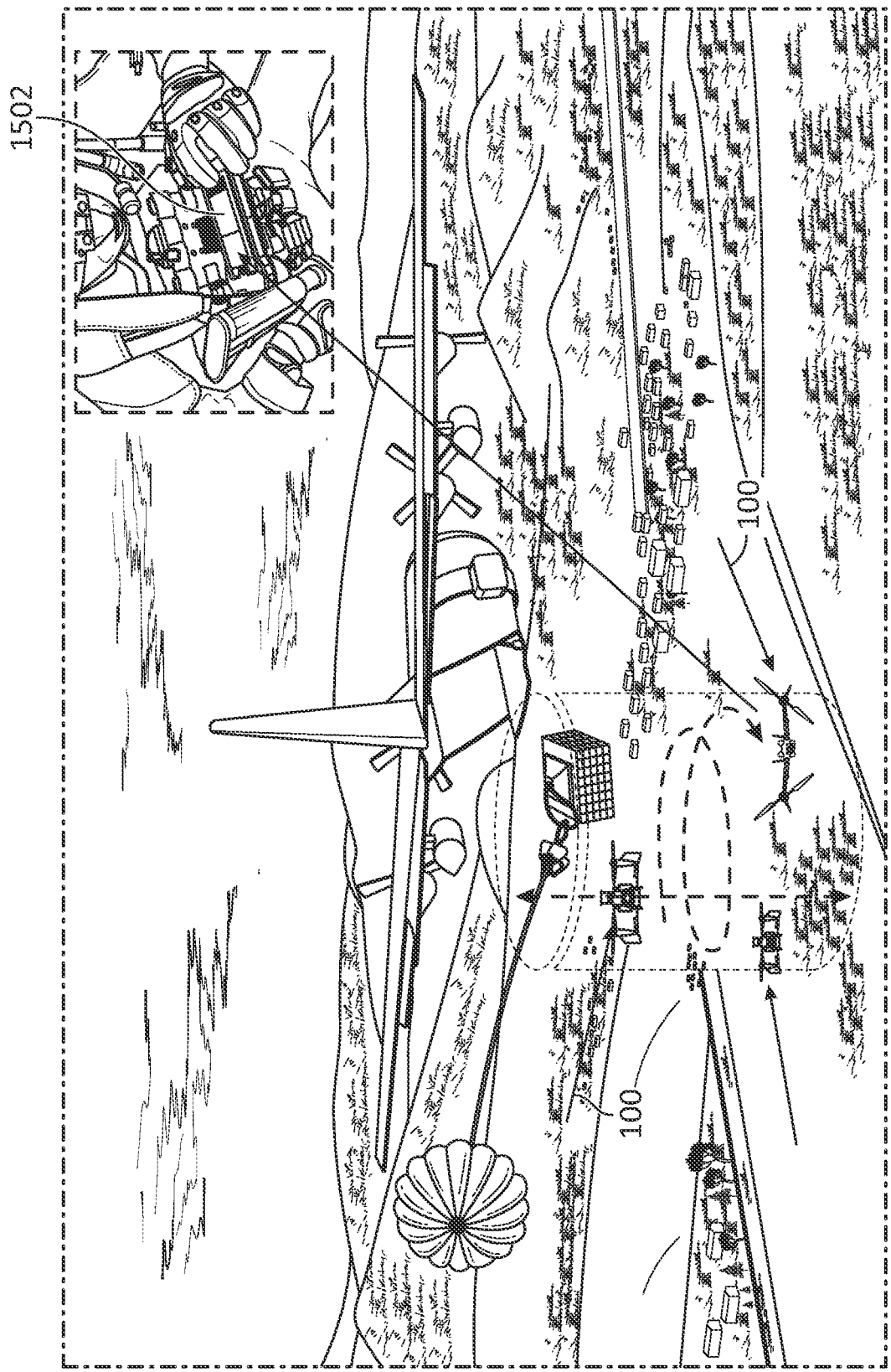

Referring to FIG. 23, UAV 100 may be utilized to map and measure a desired atmospheric corridor and calculate an atmospheric profile prior to an equipment drop from an airborne platform. In such embodiments, UAV 100 may measure wind parameters and atmospherics in vertical descent or ascent modes, in a static hover mode, and/or in motion (e.g., by applying sensor-fusion technology and/or wind triangle calculations). UAV 100 may provide a real-time data stream to the user (e.g., load master or pilot, via TAK system 1502).

Figure 24:
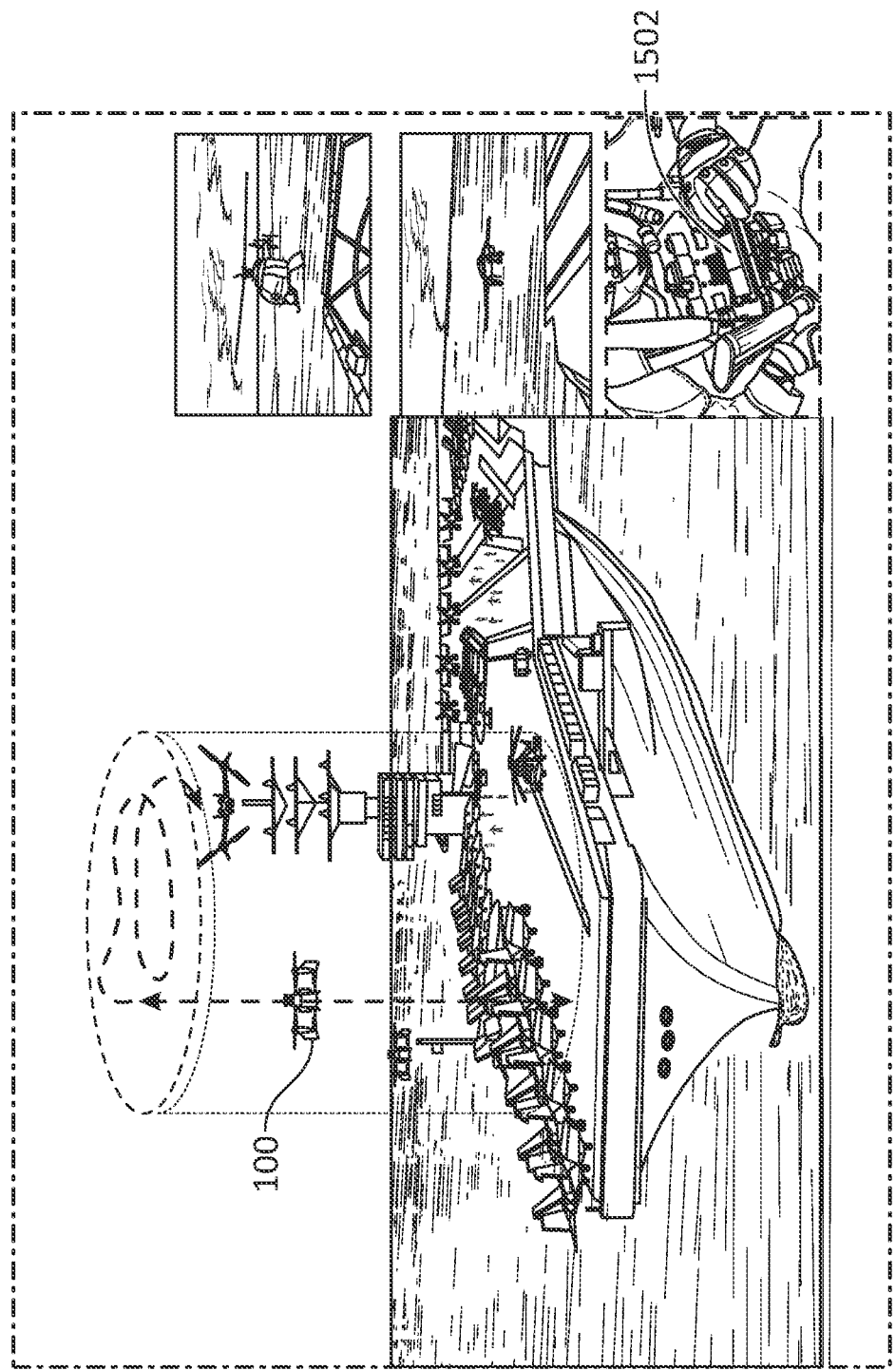

Referring to FIG. 24, UAV 100 may assist take-off and landing procedures on aircraft carriers or other stationary or moving ships and platforms on the water. UAV 100 may measure wind parameters and atmospherics in vertical descent or ascent modes, in a static hover mode, and/or in motion (e.g., by applying sensor-fusion technology and/or wind triangle calculations). UAV 100 may provide a real-time data stream to the user (e.g., ship captain, pilot, or other UAV/UAS, via TAK system 1502).

Figure 25:
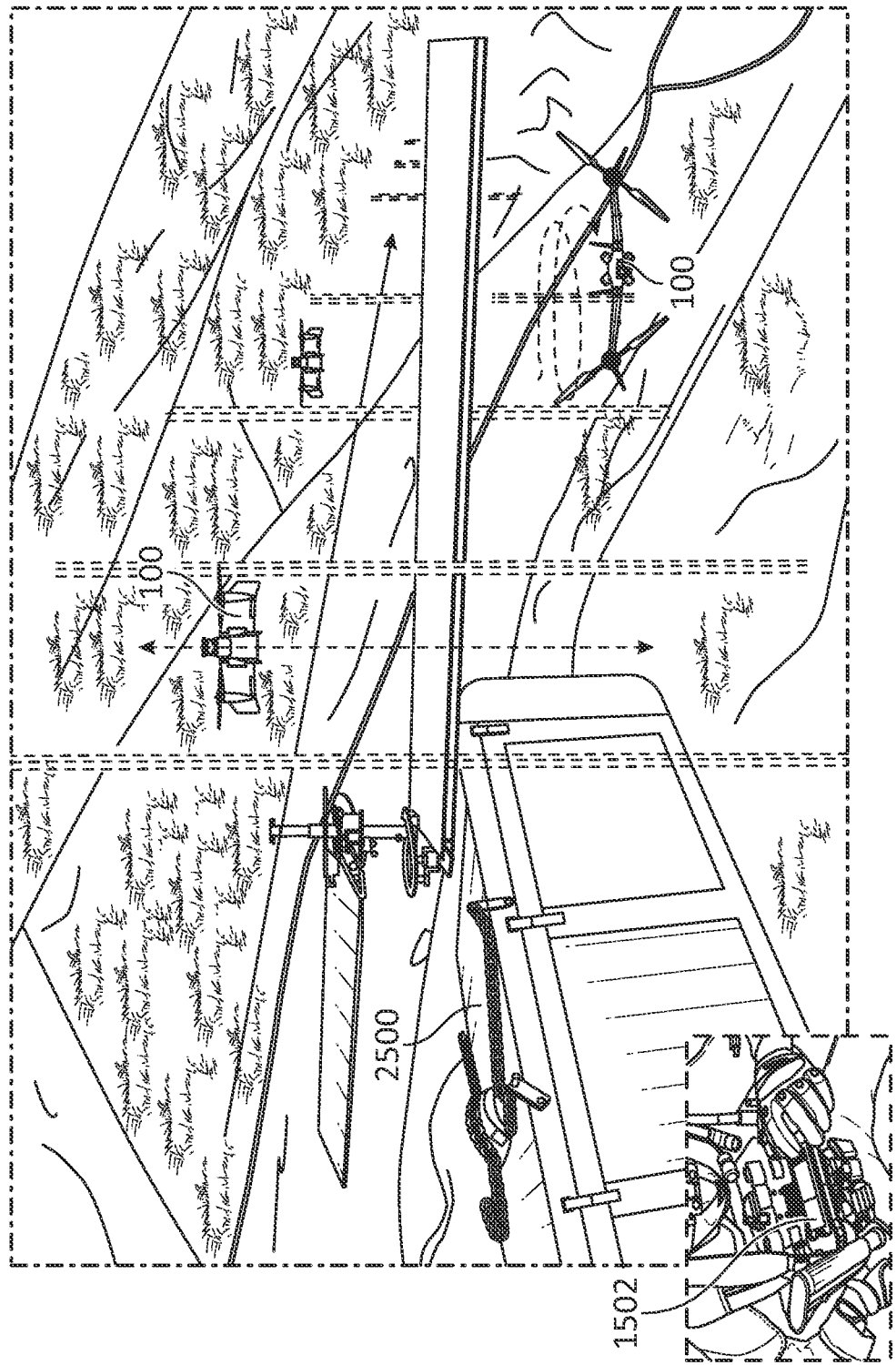
Figure 26:
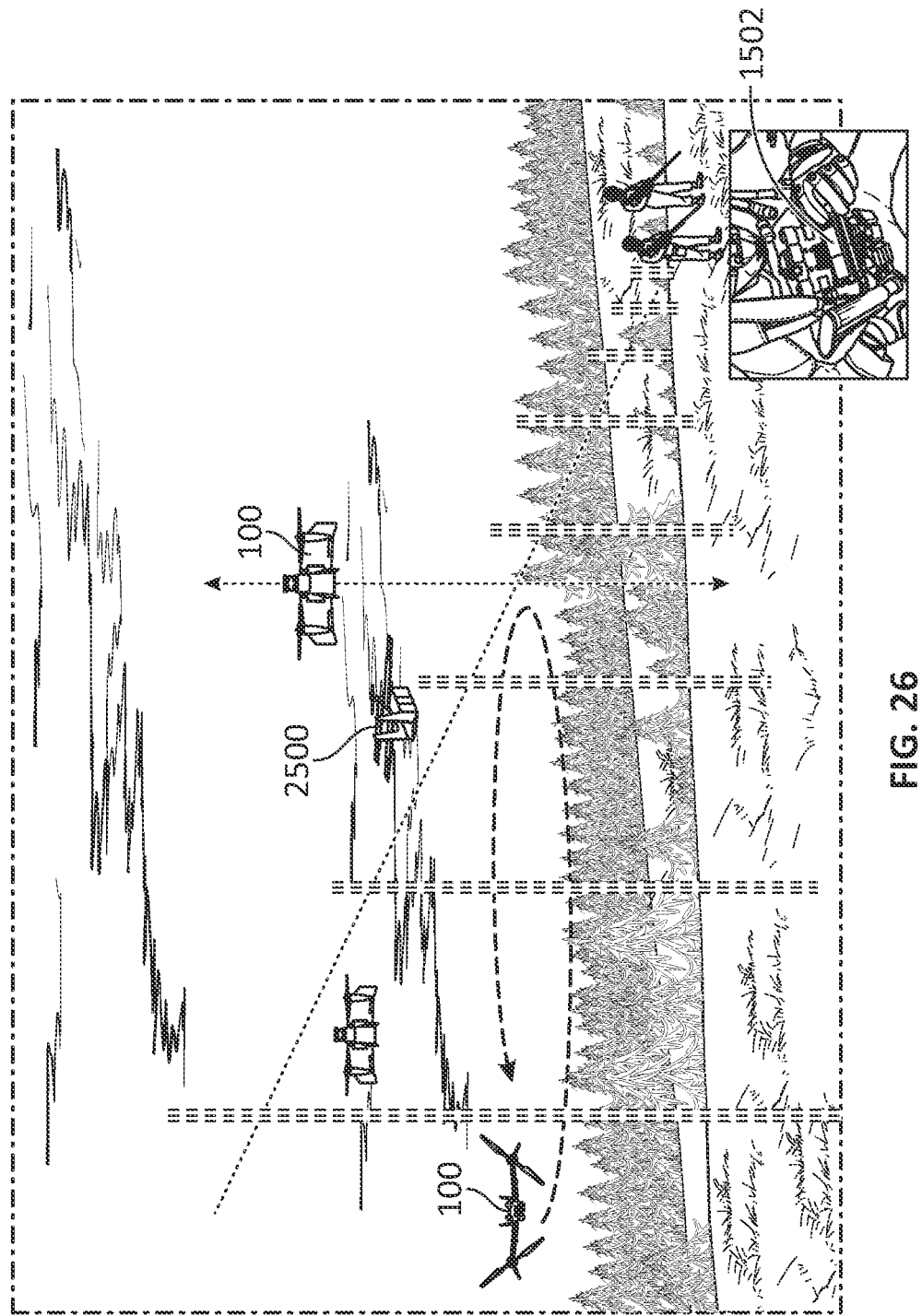

Referring to FIGS. 25-26, UAV 100 may be utilized for air corridor mapping and profiling for silent glider applications. In such embodiments, UAV 100 may support precision landing of a silent glider 2500. UAV 100 may measure wind parameters and atmospherics in vertical descent or ascent modes, in a static hover mode, and/or in motion (e.g., by applying sensor-fusion technology and/or wind triangle calculations). UAV 100 may provide a real-time data stream to the user (e.g., pilot or the silent glider itself, via TAK system 1502).

Figure 27:
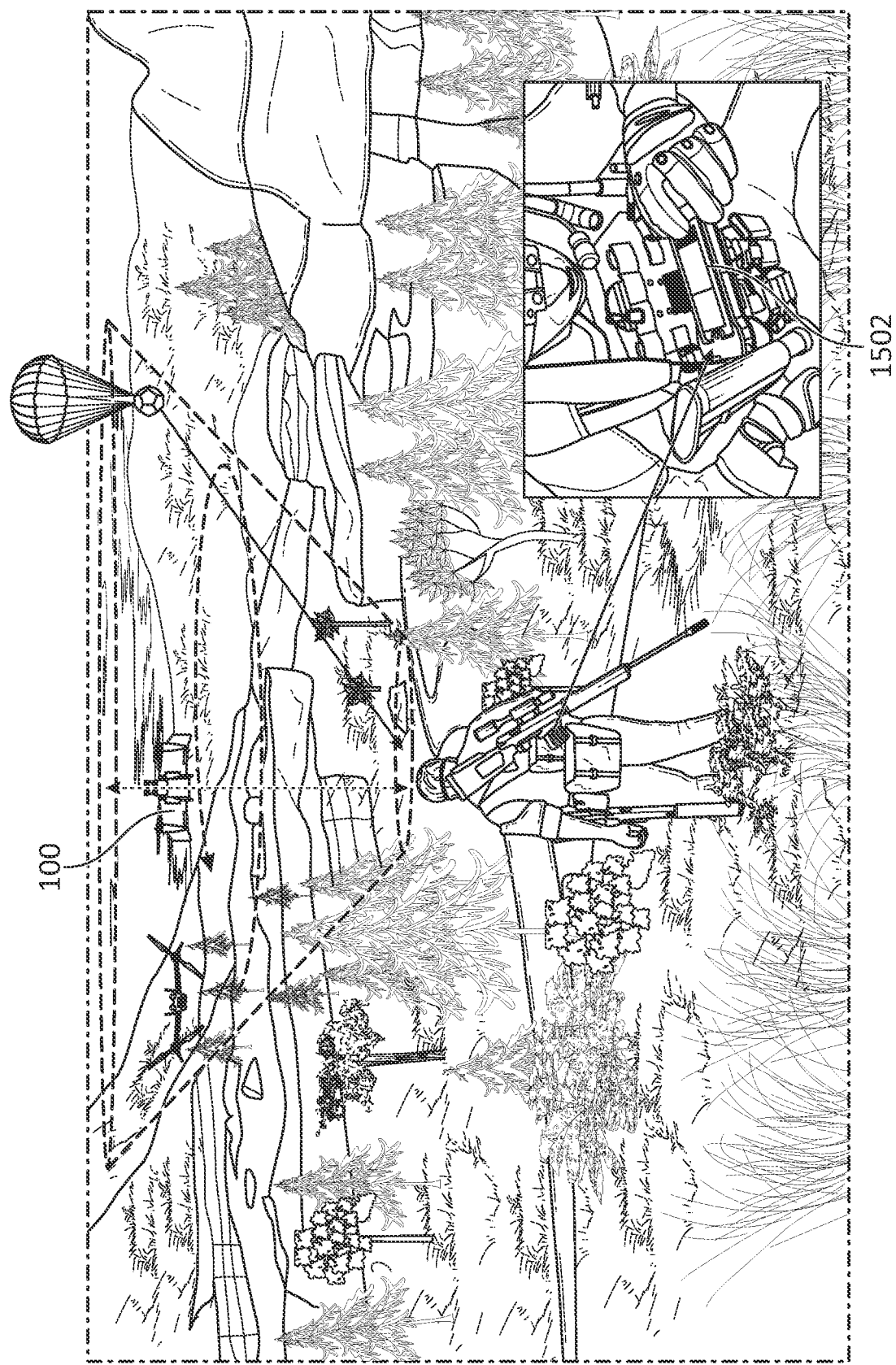
Figure 28:
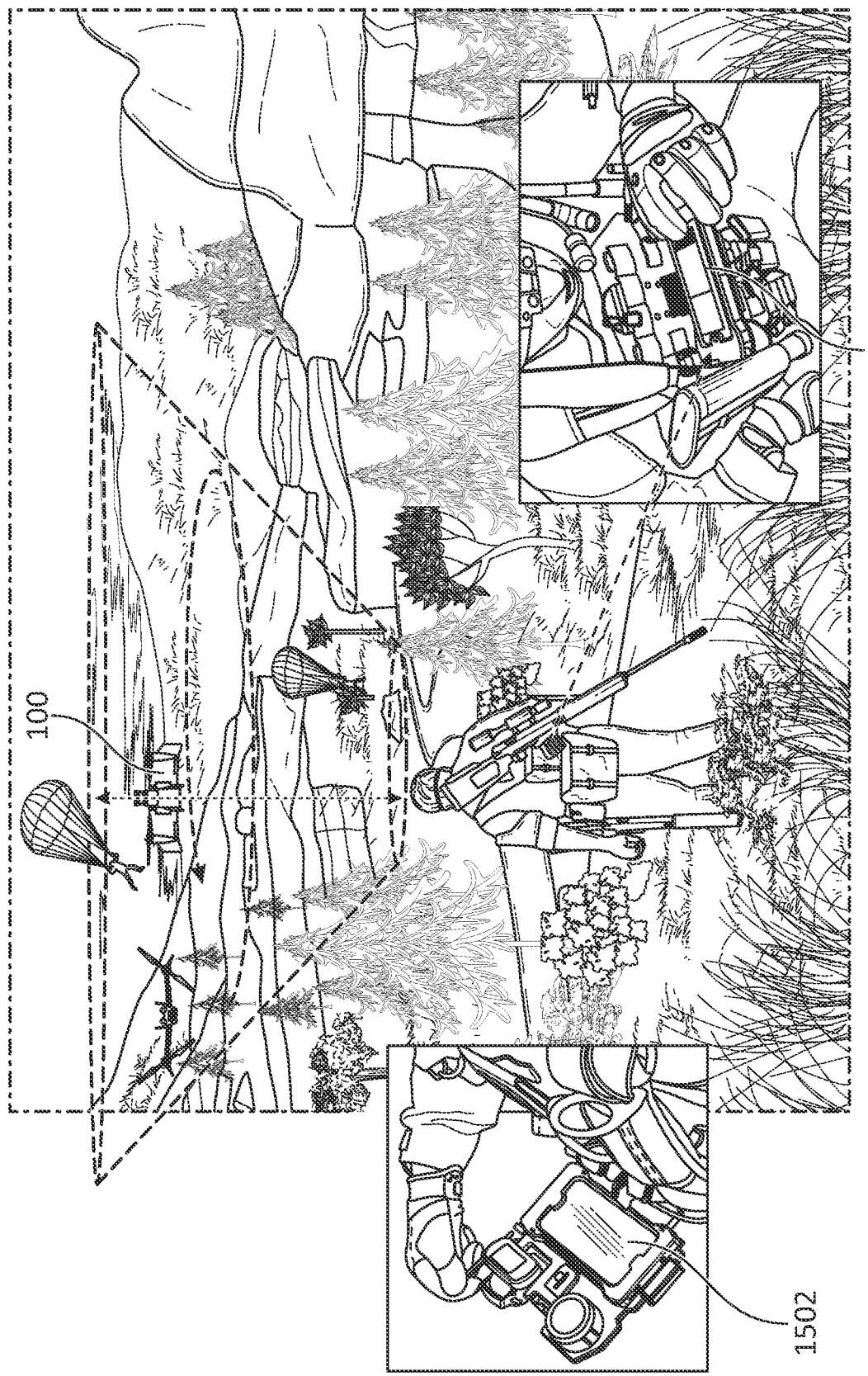

Referring to FIG. 27, UAV 100 may facilitate air corridor mapping and profiling for resupply and air drop applications. For example, UAV 100 may support precision landing and air profile mapping behind enemy lines (combat applications) and remote areas (search and rescue, medical delivery, personnel recovery, etc.). Similarly, and referring to FIG. 28, UAV 100 may support air corridor mapping and profiling for precision skydive and parachute jumps and landings as well as a live video feed of the landing zone from the UAV to the operator's interface (e.g. TAK 1502).

Figure 29:
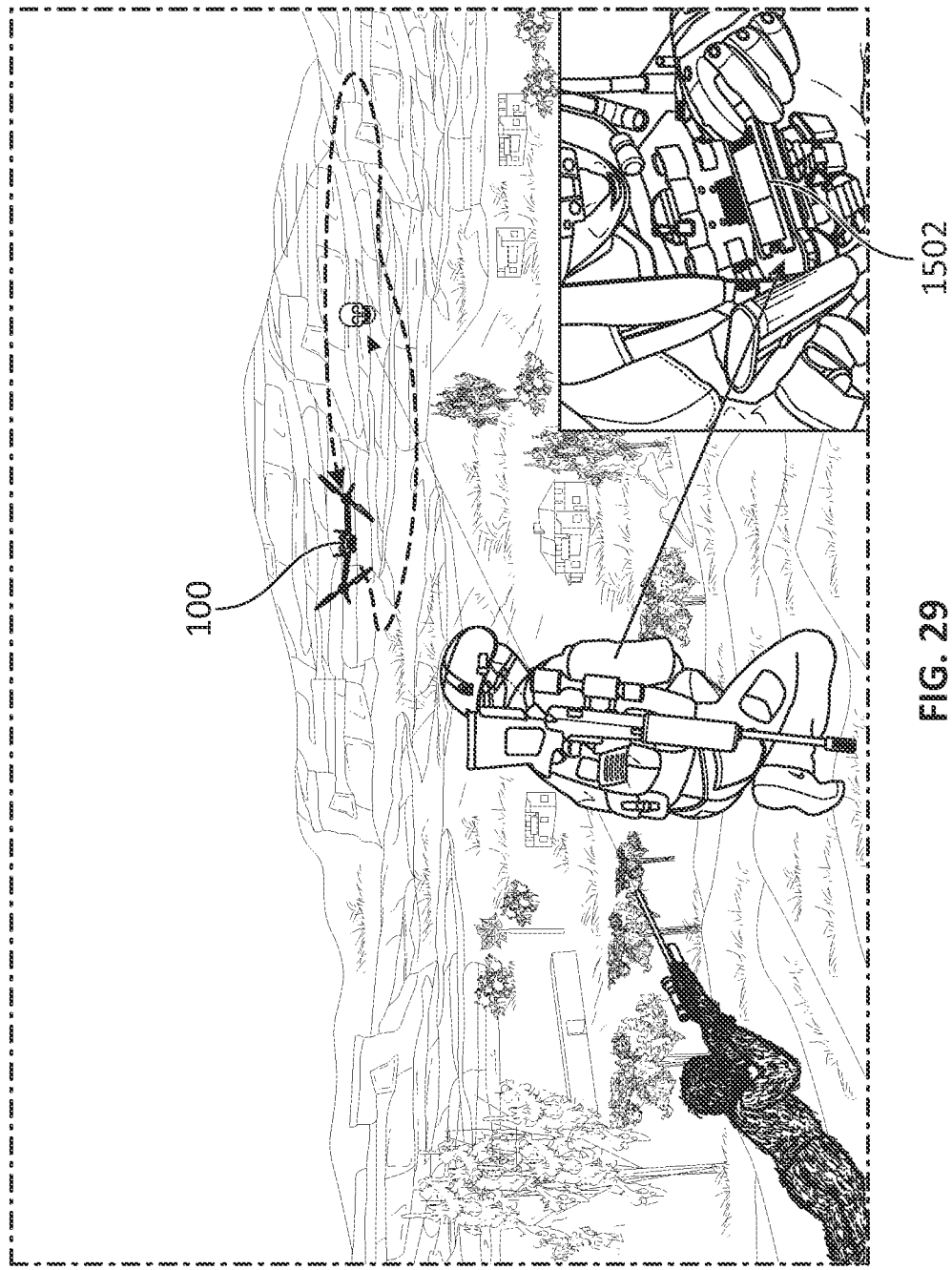
FIGS. 29-31 illustrate various weapons-assist operations utilizing the UAV, in accordance with one or more embodiments of the disclosure.
Figure 30:
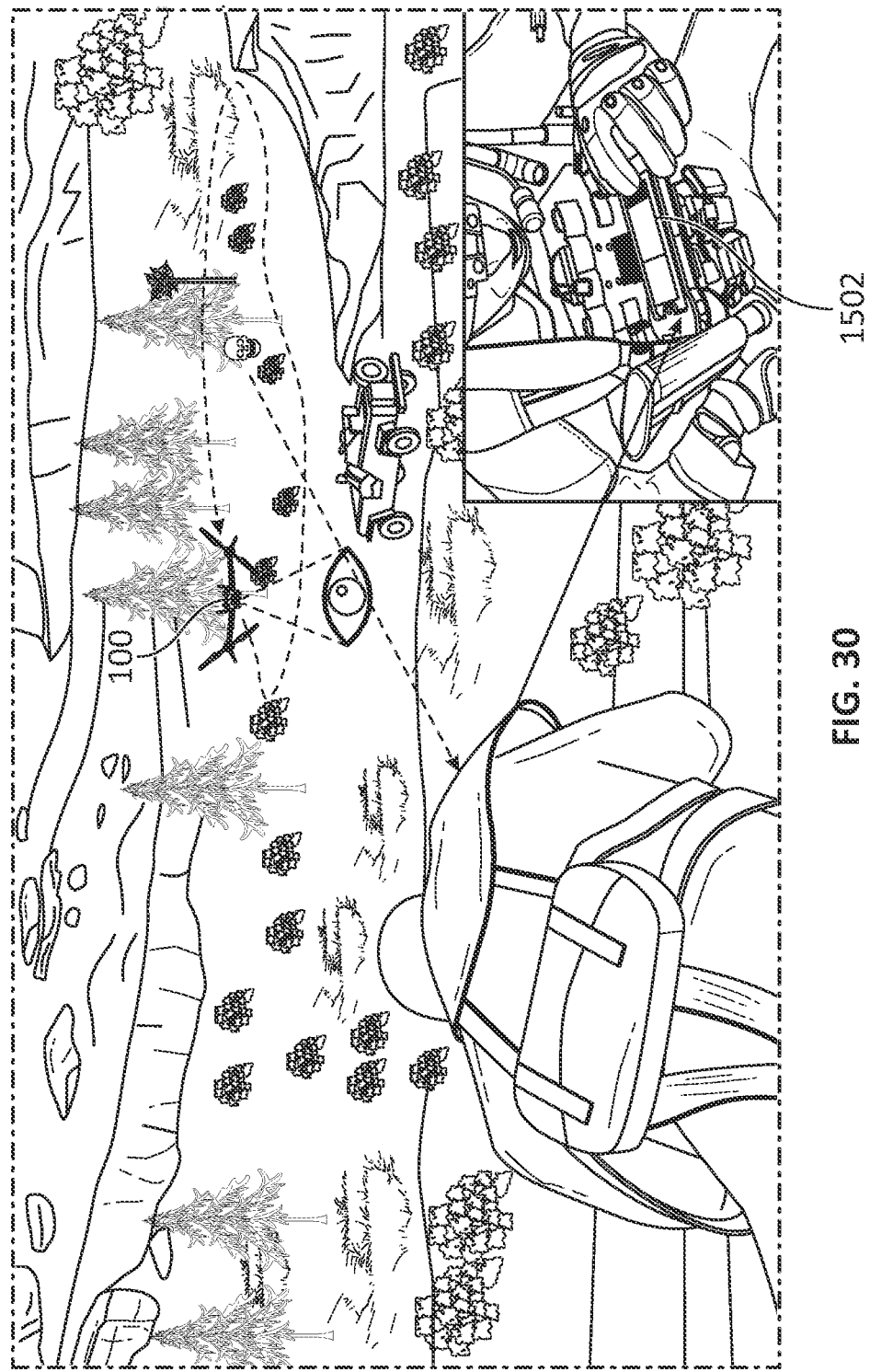
Figure 31:
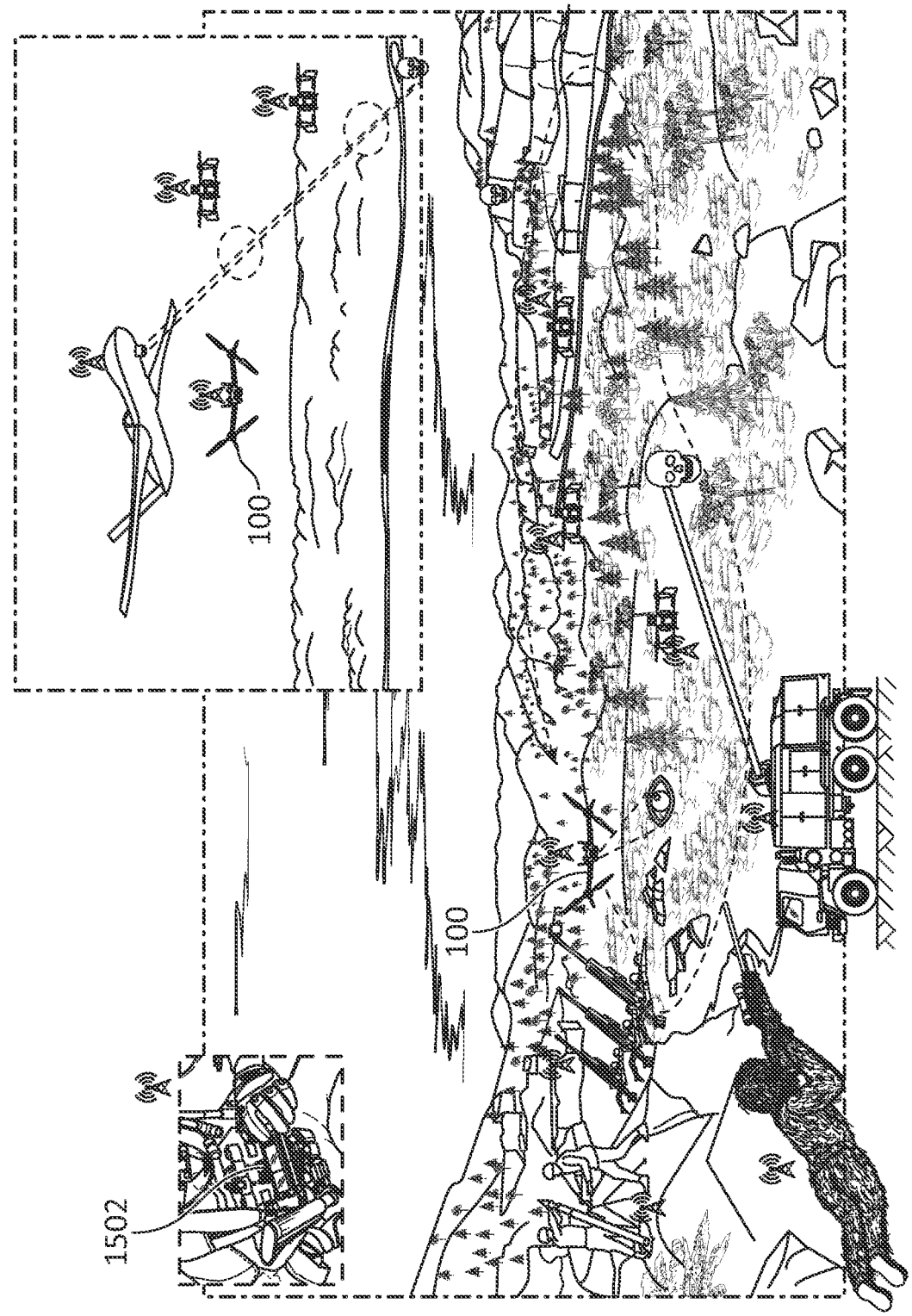

FIGS. 29-31 illustrate various weapons-assist operations utilizing UAV 100, in accordance with one or more embodiments of the disclosure. For example, referring to FIGS. 29-31, UAV 100 may provide or assist a ballistic system operable to gather wind data and other atmospherics at one or more points along a flight path of a weapons projectile (e.g., bullet, mortar, artillery, directed energy, laser and frequency weapons, etc.) and calculate a ballistic solution for the projectile based on the gathered data. In this regard, the UAV 100 may be similar to the airborne devices disclosed in U.S. application Ser. No. 16/822,925, filed Mar. 18, 2020, now U.S. Pat. No. 10,866,065, and U.S. application Ser. No. 17/099,592, filed Nov. 16, 2020, the disclosures of which are hereby incorporated by reference in their entireties for all purposes. In addition, the ballistic system of the present disclosure may be similar to the ballistic system disclosed in either U.S. application Ser. No. 16/822,925 or U.S. application Ser. No. 17/099,592. For directed energy, laser and frequency weapons, UAV 100 may assist directed energy systems to maximize their efficiency and effectiveness (e.g., atmospheric measurements supporting frequency and beam tuning).

Figure 32:
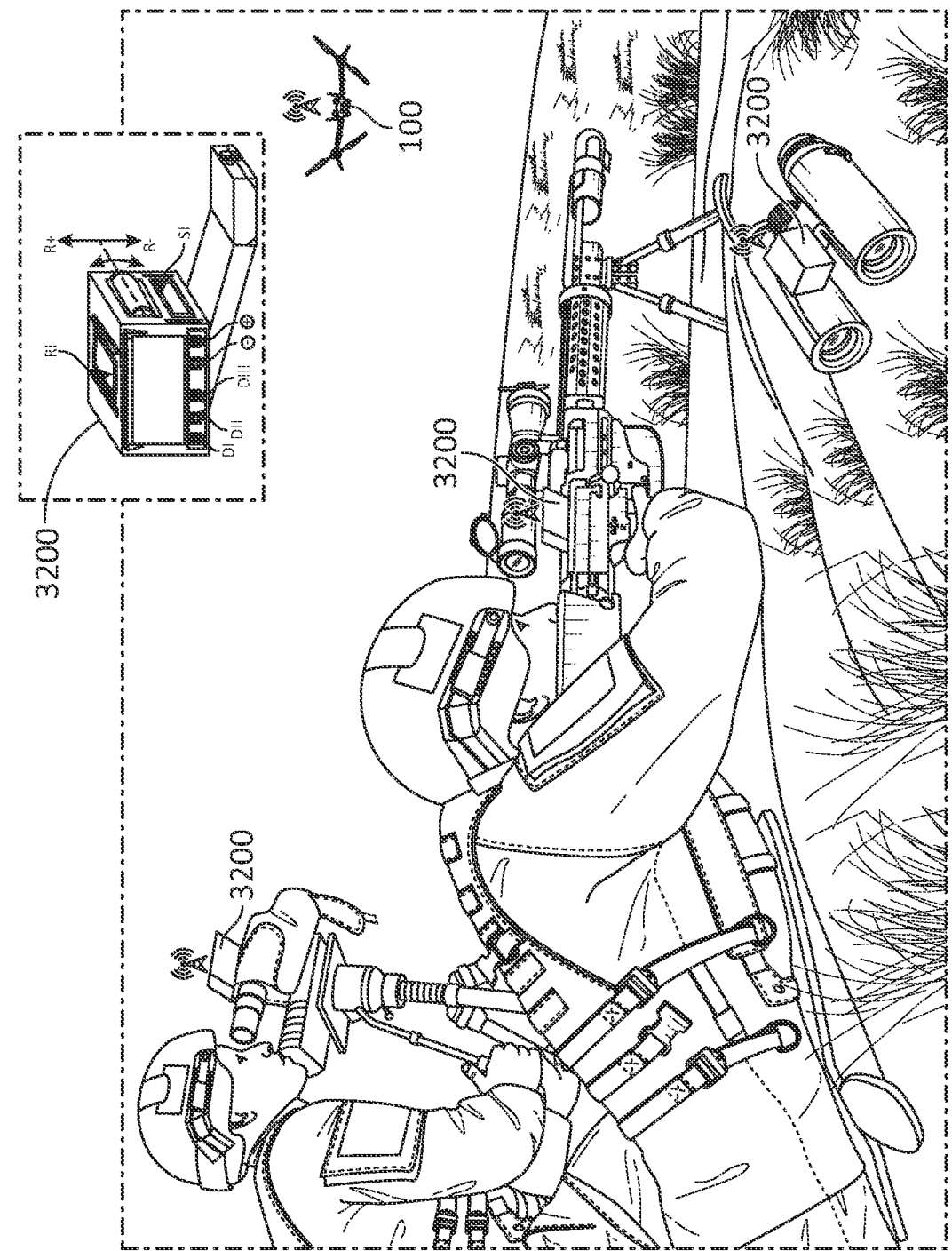
FIG. 32 illustrates a UAV coordinator, in accordance with an embodiment of the disclosure.

FIG. 32 illustrates a UAV coordinator, in accordance with an embodiment of the disclosure. Referring to FIG. 32, a coordinator or controller 3200 is provided that interfaces or communicates with UAV 100. Except as otherwise noted below, the coordinator 3200 may be similar to the data interface disclosed in either U.S. application Ser. No. 16/822,925 or U.S. application Ser. No. 17/099,592, which are incorporated by reference in their entireties for all purposes.

As disclosed herein, the coordinator 3200 may be weapon-mounted, tripod-mounted (e.g., spotter scope, JTAC fire control unit, CAS laser designator), or handheld (e.g., attached to binoculars, telescope, remote controlled camera system). Depending on the application, coordinator 3200 may be mounted to a rail (e.g., a Picatinny rail), slot, attachment point, or accessory of weapons system, such as a scope or accessory mount, although other configurations are contemplated.

Figure 33:
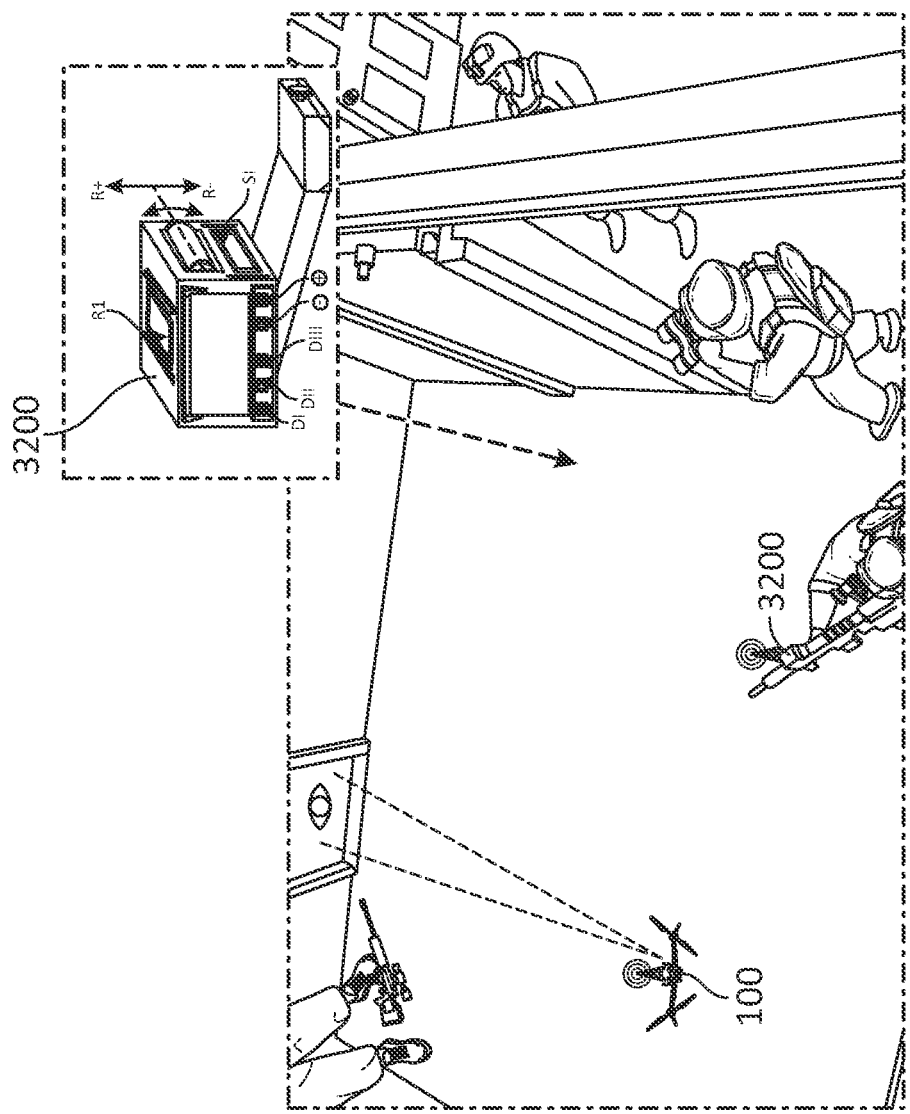
FIG. 33 illustrates a weapon-mounted coordinator and UAV system in a close-quarters battle situation, in accordance with an embodiment of the disclosure.
Figure 34:
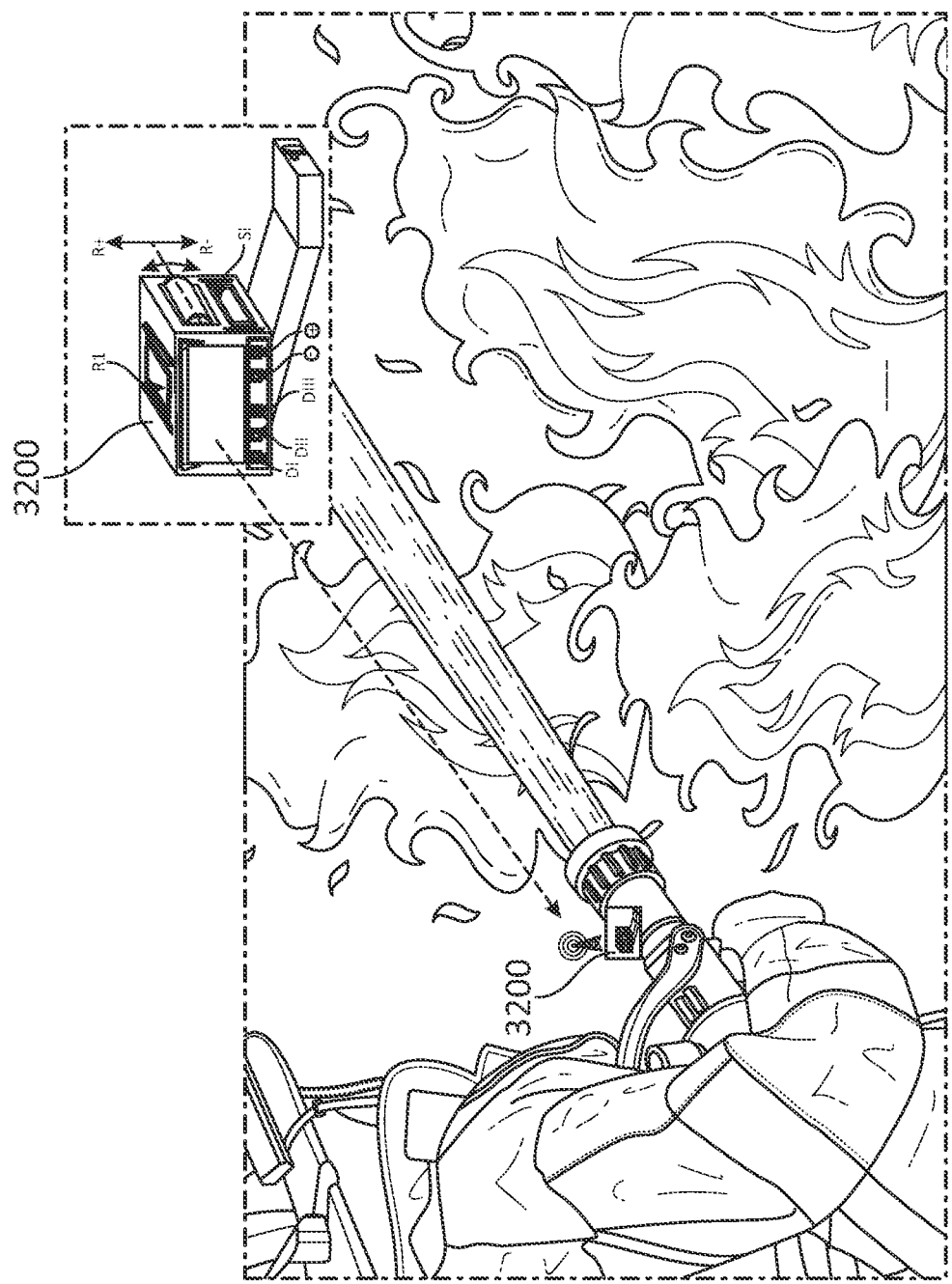
FIG. 34 illustrates a firehose-mounted coordinator and UAV system in a firefighting situation, in accordance with an embodiment of the disclosure.
Figure 35A:
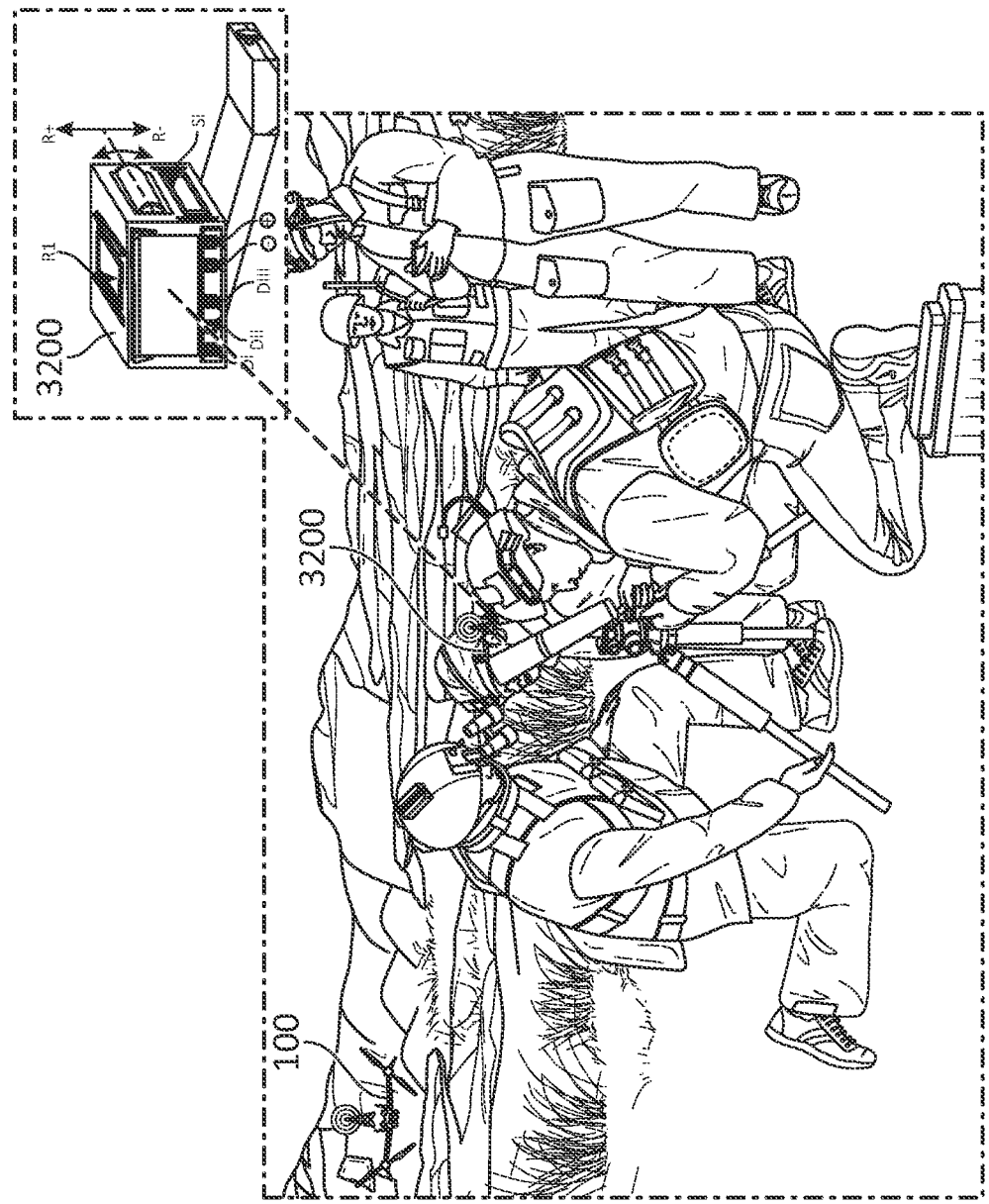
FIGS. 35A and 35B illustrate a mortar-mounted coordinator and UAV system, in accordance with an embodiment of the disclosure.
Figure 35B:
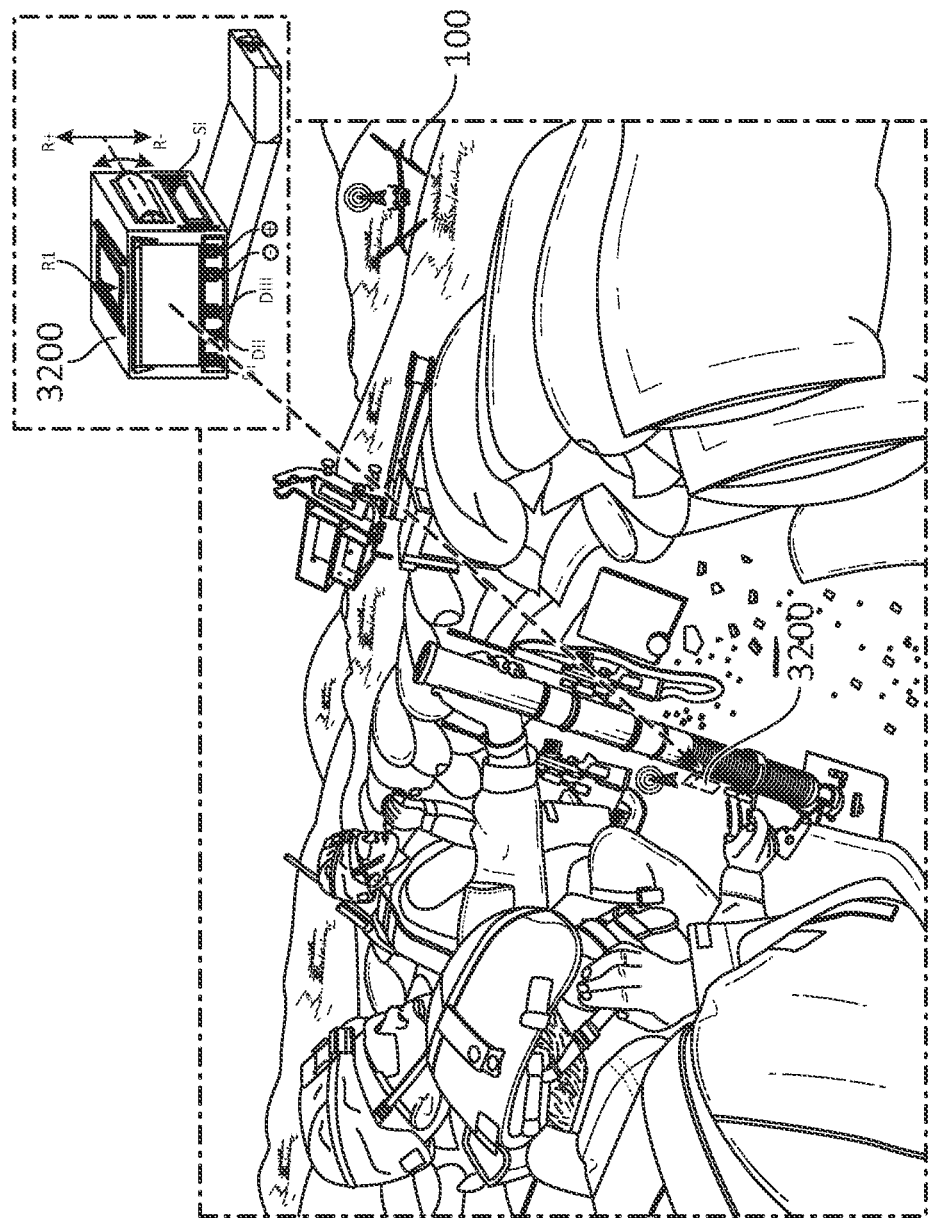
Figure 36:
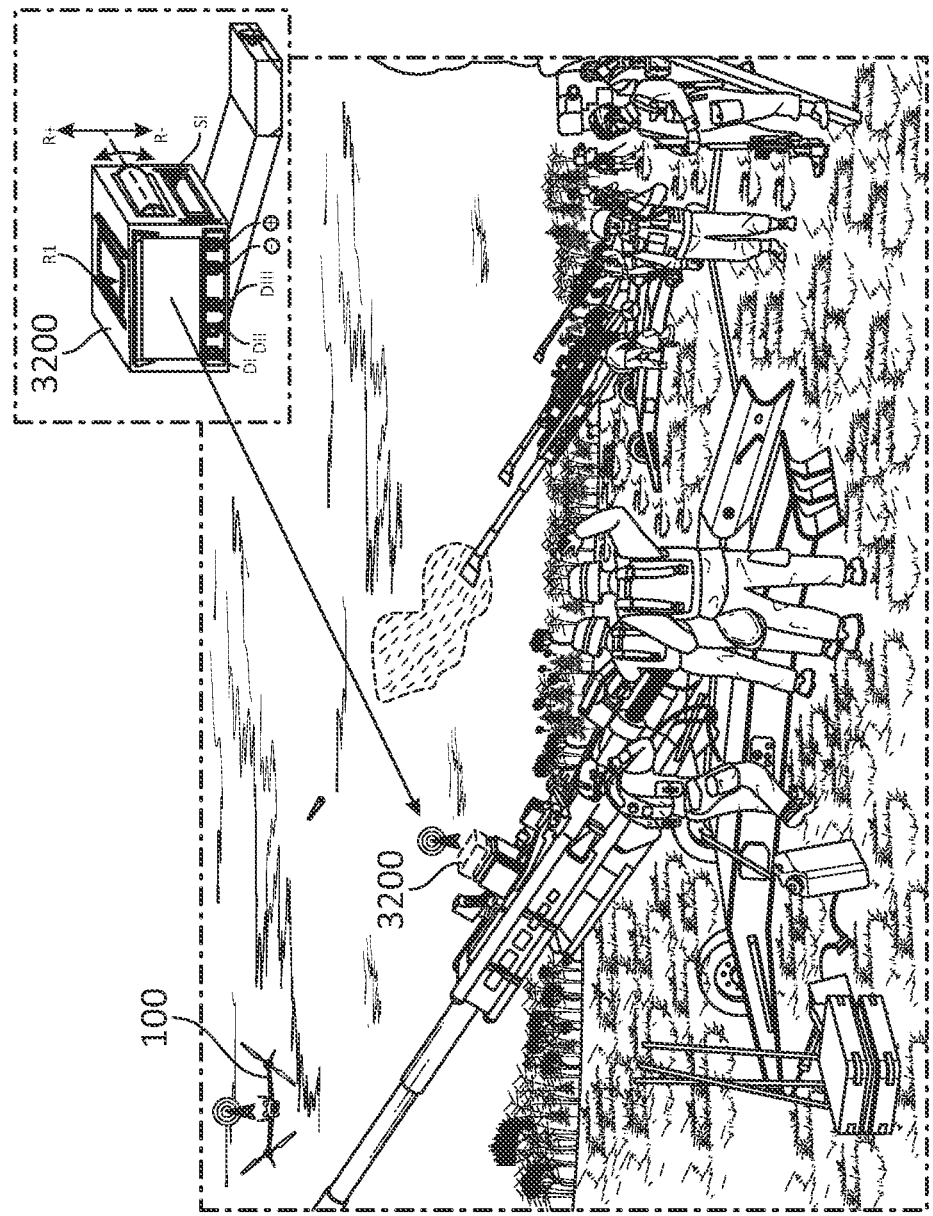
FIG. 36 illustrates an artillery-mounted coordinator and UAV system, in accordance with an embodiment of the disclosure.

The coordinator 3200 may enable automatic access to specific target and area data gathered by UAV 100, such as atmospherics, CBRN and ISR data, alongside the desired direction of fire, target location relative to coordinator 3200 location or flight path to the target location from a designated position not near the coordinator 3200 (e.g. a second user or target observer). The coordinator 3200 and UAV 100 may be in communication with each other, either directly or indirectly via a computer module (e.g., TAK 1502), such as to control operation of UAV 100 and/or provide the specific area data to a user via the coordinator 3200. For example, FIG. 33 illustrates a weapon-mounted coordinator and UAV system in a close-quarters battle (CQB) situation, in accordance with an embodiment of the disclosure. In such examples, the coordinator 3200 may receive CQB-pertinent area data from UAV 100 to aid the static or dynamic shooter. Referring to FIG. 34, the coordinator 3200 may direct UAV 100 to gather data alongside the direction of the water stream and/or the coordinator 3200 may receive atmospheric data from UAV 100 relevant to the direction of water, such as CBRN data and wind direction and magnitude, etc. Referring to FIGS. 35A and 35B, the coordinator 3200 may direct UAV 100 to gather atmospheric, ISR, and CBRN data alongside the direction of the mortar fire and/or the coordinator 3200 may receive atmospheric data from UAV 100 relevant to the direction of mortar fire, such as data relevant to a ballistic solution. Similarly, referring to FIG. 36, the coordinator 3200 may direct UAV 100 to gather atmospheric, ISR, and CBRN data alongside the direction of artillery fire and/or the coordinator 3200 may receive atmospheric data from UAV 100 relevant to the direction of artillery fire. Similarly, referring to FIG. 31, the coordinator 3200 may direct UAV 100 to gather atmospheric, ISR, and CBRN data alongside the direction of a directed energy beam, laser, microwave or other frequency beam and/or the coordinator 3200 may receive atmospheric data from UAV 100 relevant to the direction of directed energy beam, laser, microwave or other frequency beam.

Figure 37:
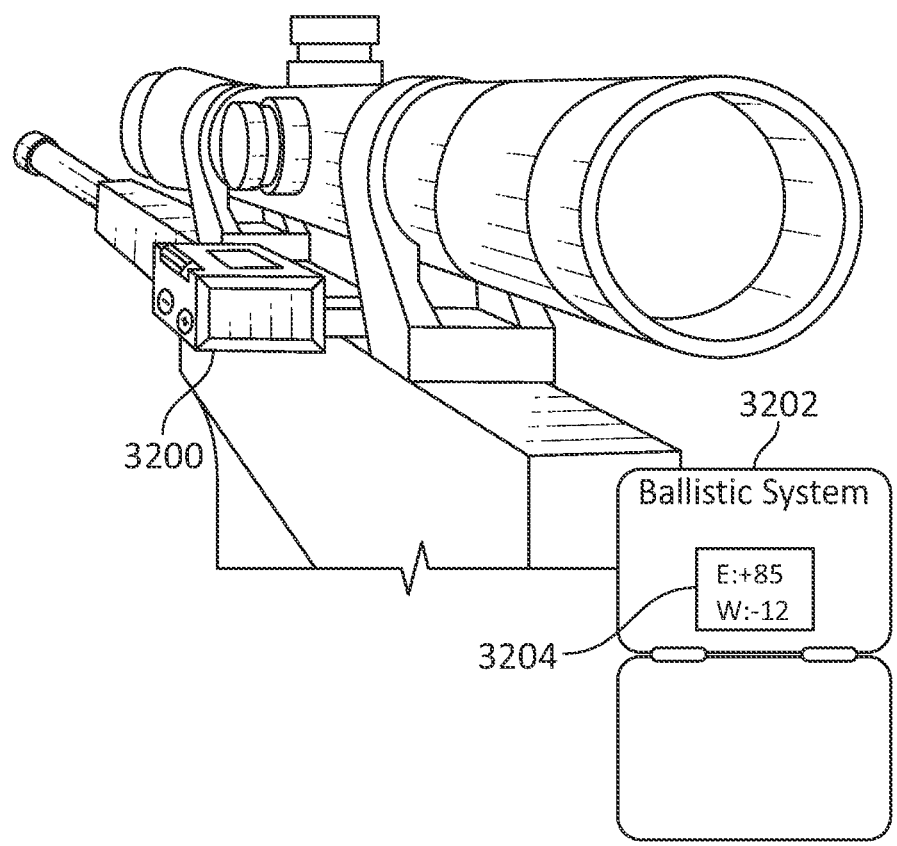
FIG. 37 illustrates a weapon-mounted coordinator in communication with a ballistic system, in accordance with an embodiment of the disclosure.

FIG. 37 illustrates a weapon-mounted coordinator in communication with a ballistic system 3202, in accordance with an embodiment of the disclosure. In embodiments, the coordinator 3200 may provide situation-specific data to a ballistics calculator. For instance, the coordinator 3200 may provide the ballistics calculator data related to direction of fire, slant angle, weapon tilt, target range, atmospherics, among others, or any combination thereof. Such information, along with atmospheric data collected by UAV 100, may be used to calculate a ballistics solution 3204 (e.g., elevation and/or windage calculations) for the shooter.

Figure 38:
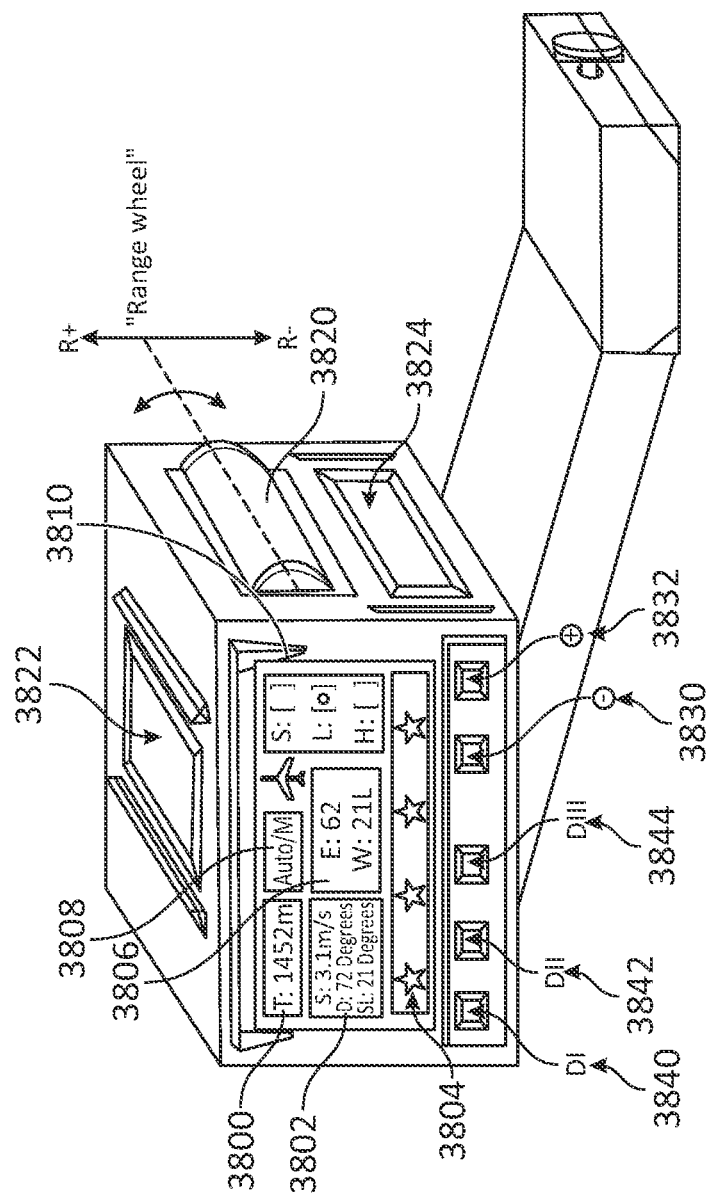
FIG. 38 illustrates the coordinator, in accordance with an embodiment of the disclosure.

FIG. 38 illustrates the coordinator 3200, in accordance with an embodiment of the disclosure. The coordinator 3200 may include various displays. For instance, the coordinator 3200 may include a "range to target" display 3800 that indicates the distance to the target, whether input manually or gathered from an internal or external range finder. The coordinator 3200 may include a "FFP 0 core parameters" display 3802 that indicates wind speed, wind direction, and slant angle at the firing position, gathered by internal and externally-linked sensors (e.g. laser range finder, or inertial navigation system (INS 6020), or a motion, compass, visual, and gyroscopic sensor or other gravitational forces sensors, including artificial intelligence enhanced sensors). The coordinator 3200 may include an "anti-cant level indication" display 3804 that provides visual feedback to the shooter regarding weapon cant (e.g., centered, left-canted, right-canted, etc.). The coordinator 3200 may include a "real time firing solution" display 3806, which displays the calculated ballistic solution based on weapon and atmospheric data gathered by the coordinator 3200 and UAV 100, respectively. In some embodiments, the coordinator 3200 may include a "UAV positioning mode" display 3808 that indicates whether one or more UAVs 100 are being positioned automatically or manually alongside the flight path of the projectile or designated mission flight path or loiter area. In "auto" mode, one or more UAVs 100 may be positioned via algorithmic settings or artificial intelligence control based on local topography, the flight path, potential threat detection, numbers of drones, etc. In "manual" mode, one or more UAVs 100 may be positioned via user input, as detailed below. In some embodiments, the coordinator 3200 may include a "UAV flight mode" display 3810 indicating the flight mode of UAV 100 (e.g., standby mode, low profile data measuring mode, high profile data measuring mode, park mode, self-destruction, etc.).

With continued reference to FIG. 38, the coordinator 3200 may include various controls. For instance, the coordinator 3200 may include a range wheel 3820, a range button 3822, and a "UAV send it" button 3824. The range wheel 3820 may allow the user to manually input the range to target, as displayed on the "range to target" display 3800. The range button 3822 may import distance to target data from internal and/or external sensors. In some embodiments, the range button 3822 may request the ballistics computer to calculate the ballistic solution based on current conditions (e.g., based on atmospherics collected by the coordinator 3200 and/or external devices, such as UAV 100). A quick press of the "UAV send it" button 3824 may launch the drones to their designated positions. In some embodiments, holding the "UAV send it" button 3824 may recover the drones and have them return to home (e.g., the firing position, the FFP 0 location, etc.) at any given moment. In some embodiments, the coordinator 3200 may include a "drone flight level down" button 3830 and a "drone flight level up" button 3832, which lower or raise, respectively, UAV's flight position and/or adjust UAV's flight mode.

The controller may include one or more drone positioning buttons. For example, coordinator 3200 may include a "Drone 1" button 3840, a "Drone 2" button 3842, and a "Drone 3" button 3844, although other configurations are contemplated. Such buttons may allow "point and position" functionality. For instance, an operator may point the coordinator 3200 to a first desired area or position to place a first drone, whereupon depressing the "Drone 1" button 3840 sets the flight position or placement of the first drone. The weapons operator may set the flight position or placement of a second drone and a third drone in a similar manner using the "Drone 2" button 3842 and the "Drone 3" button 3844. For weapon-mounted applications, the weapon may be pointed to the desired area or position to set the position of the drones.

Figure 39B:
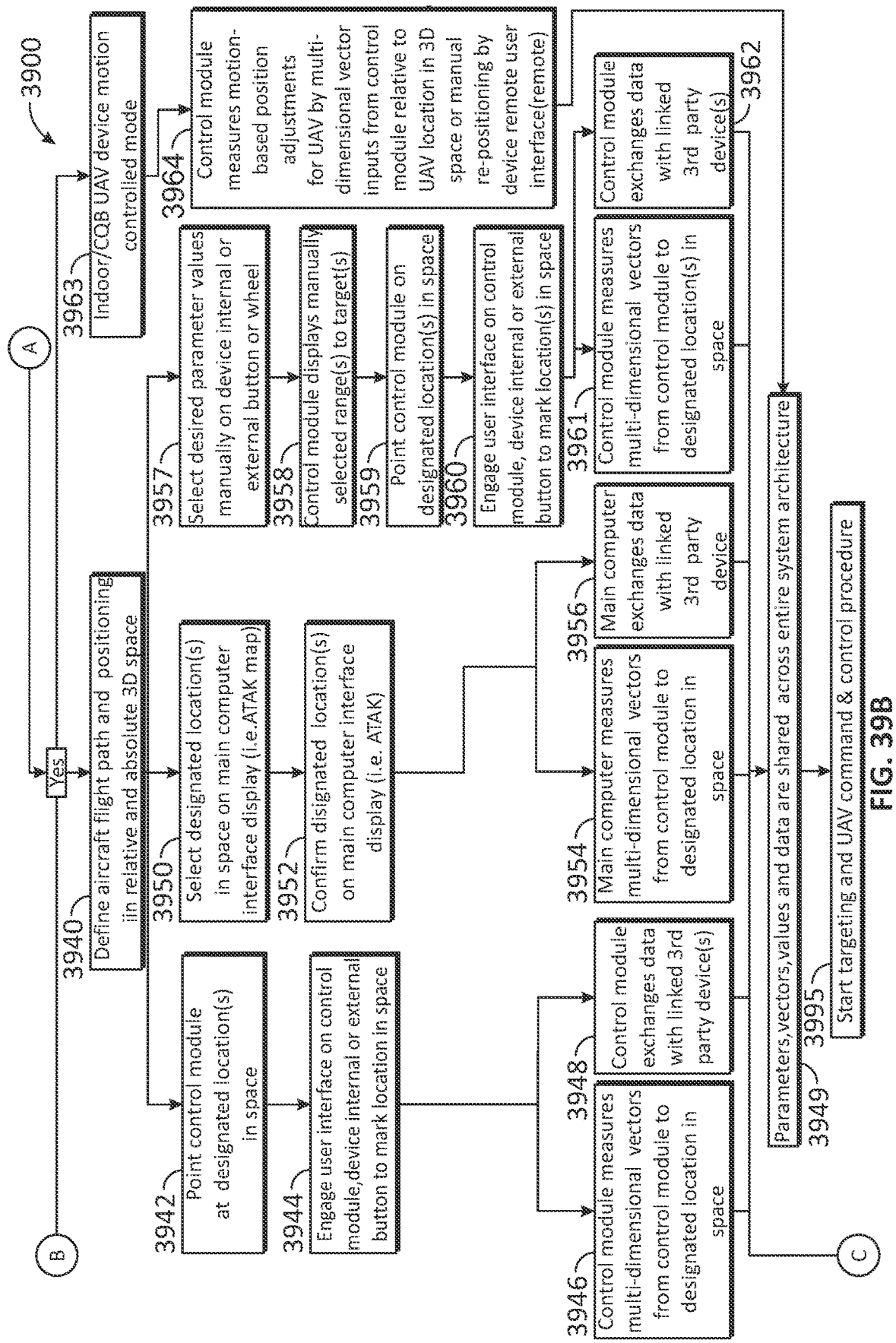
Figure 39C:
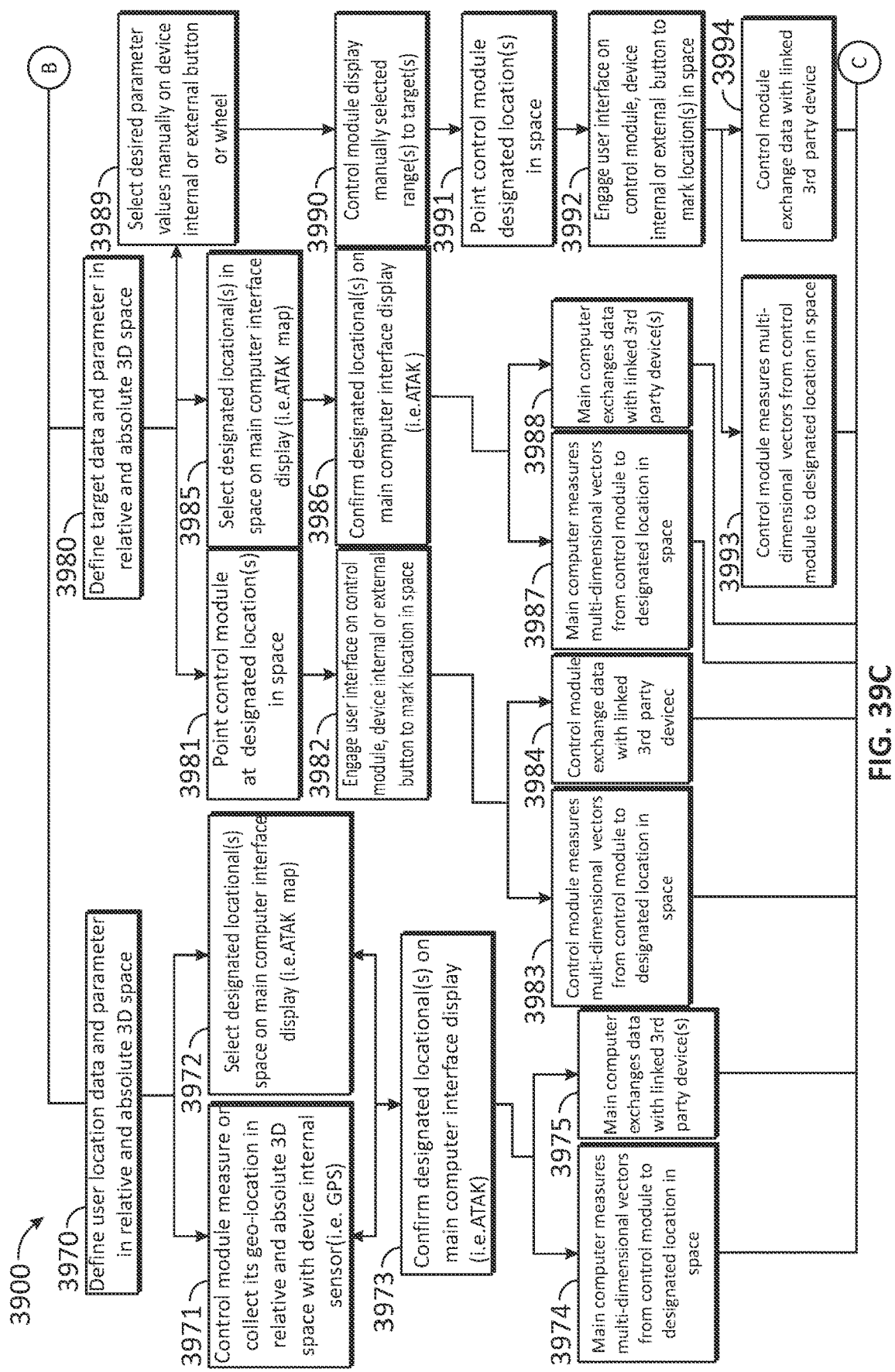

FIGS. 39A, 39B, and 39C illustrate a flowchart of a control module process 3900, in accordance with an embodiment of the disclosure. Any step, sub-step, sub-process, or block of process 3900 may be performed in an order or arrangement different from the embodiments illustrated by FIGS. 39A-39C. For example, one or more blocks may be omitted from or added to the process 3900. Process 3900 may be applied to any embodiment disclosed herein.

Referring to FIG. 39A, the process 3900 may begin by setting a master control module (e.g., the coordinator 3200 described above) (block 3901). In block 3902, the master control module may be synchronized with other slave control modules in the space. This synchronization effort may include but is not limited to multiple users pointing their weapon-mounted or device-mounted coordinators at a virtual reference point in space in order to synchronize the coordinator-internal INS 6020 sensor module to define a common reference direction in 3D space. In block 3904, a data exchange link is established and maintained between the master and slave control modules. In block 3906, control module master function can be switched within the designated control module network (i.e., amongst the peers of the network).

Block 3908 includes setup, link-up and configuration amongst all system devices. For instance, block 3910 includes syncing with a main computer, block 3912 includes syncing with one or more aircrafts, block 3914 includes syncing with aircraft computer and autopilot software, block 3916 includes syncing with ballistic computer and software, and block 3918 includes syncing with any third-party devices for target, aircraft command and control, and atmospheric, ISR and environmental data gathering. As shown, each of the main computer, aircraft, aircraft computer and autopilot software, ballistic computer and software, and third-party devices may import and export data as needed.

In block 3920, the coordinator 3200 collects atmospheric and environmental data (e.g. ISR, CBRNE), with the atmospheric and environmental data shared across linked external communications network or data cloud (block 3922) and/or parameters and data shared across the entire system architecture (block 3924). In block 3926, data exchange is established and maintained amongst the system architecture and linked external communications network and data cloud.

In block 3930, the main computer may run system checks across the entire system architecture, and the coordinator 3200 and main computer may show system status in block 3932. In block 3934, a systems readiness check may be performed. If the system is not ready, the process 3900 may proceed back to block 3930 to rerun system checks and system analysis across the entire system architecture.

Referring to FIG. 39B, if the system is deemed ready in block 3934, process 3900 may define an aircraft flight path and positioning in relative and absolute 3D space (block 3940). Block 3940 may include three subsystems. For example, in a first subsystem, the coordinator 3200 may be pointed at designated location(s) in space (block 3942). In such embodiments, internal logic or external buttons of the coordinator 3200 may mark the location(s) in space (block 3944), such as via the coordinator 3200 measuring multi-dimensional vectors to designated location(s) in space (block 3946) and/or the coordinator 3200 exchanging data with linked third-party device(s) (block 3948). The first subsystem may then proceed to block 3949, where parameters, vectors, values and data are shared across the entire system architecture.

In a second subsystem of block 3940, designated location(s) may be selected in space on a main computer interface display (e.g., TAK map) (block 3950). In block 3952, the designated location(s) may be confirmed on the main computer interface display (i.e., TAK 1502). In block 3954, the main computer may measure multi-dimensional vectors from the coordinator 3200 to designated location(s) in space. In block 3956, the main computer may exchange data with linked third-party device(s). The second subsystem may then proceed to block 3949.

In a third subsystem of block 3940, desired parameter values may be selected manually on the coordinator 3200 (block 3957). In block 3958, the coordinator 3200 may display manually selected range(s) to target(s). In block 3959, the coordinator 3200 may be pointed to designated location(s) in space. Internal logic or external buttons of the coordinator 3200 may mark the location(s) in space (block 3960), such as via the coordinator 3200 measuring multi-dimensional vectors to designated location(s) in space (block 3961) and/or the coordinator 3200 exchanging data with linked third-party device(s) (block 3962). The third subsystem may then proceed to block 3949.

If the system is deemed ready in block 3934, process 3900 may proceed to an indoor/CQB (close-quarters battle) device motion controlled mode (block 3963). In such embodiments, the coordinator 3200 may measure motion-based position adjustments for UAV 100 by multi-dimensional vector inputs from the coordinator 3200 relative to UAV 100 in 3D space or manual repositioning by device remote user interface (block 3964). As shown, process 3900 may then proceed to block 3949.

Referring to FIG. 39C, if the system is deemed ready in block 3934, process 3900 may proceed to define user location data and parameters in relative and absolute 3D space (block 3970). For example, the coordinator 3200 may measure or collect its geolocation in relative and absolute 3D space with device internal INS sensor (e.g., GPS) (block 3971). In block 3972, designated location(s) may be selected in space on a main computer interface display (e.g., TAK map). In block 3973, the designated location(s) may be confirmed on the main computer interface display (i.e., ATAK, TAK). After confirming the designated location(s), the main computer may measure multi-dimensional vectors from the coordinator 3200 to designated location(s) in space (block 3974) and/or the main computer may exchange data with linked third-party device(s) (block 3975).

If the system is deemed ready in block 3934, process 3900 may proceed to define target data and parameters in relative and absolute 3D space (block 3980). Block 3980 may include three subsystems. For example, in a first subsystem, the coordinator 3200 may be pointed at designated location(s) in space (block 3981). In such embodiments, internal logic or external buttons of the coordinator 3200 may mark the location(s) in space (block 3982), such as via the coordinator 3200 measuring multi-dimensional vectors to designated location(s) in space (block 3983) and/or the coordinator 3200 exchanging data with linked third-party device(s) (block 3984). The first subsystem may then proceed to block 3949.

In a second subsystem of block 3980, designated location(s) may be selected in space on a main computer interface display (e.g., TAK map) (block 3985). In block 3986, the designated location(s) may be confirmed on the main computer interface display (i.e., TAK 1502). In block 3987, the main computer may measure multi-dimensional vectors from the coordinator 3200 to designated location(s) in space. In block 3988, the main computer may exchange data with linked third-party device(s). The second subsystem may then proceed to block 3949.

In a third subsystem of block 3980, desired parameter values may be selected manually on the coordinator 3200 (block 3989). In block 3990, the coordinator 3200 may display manually selected range(s) to target(s). In block 3991, the coordinator 3200 may be pointed to designated location(s) in space. Block 3992 may include engaging a user interface on the coordinator 3200, device internal or external button to mark location(s) in space (block 3992), such as via the coordinator 3200 measuring multi-dimensional vectors to designated location(s) in space (block 3993) and/or the coordinator 3200 exchanging data with linked third-party device(s) (block 3994). The third subsystem may then proceed to block 3949.

Referring to FIG. 39B, after proceeding to block 3949, process 3900 may start targeting and execute UAV command and control procedure(s) (block 3995), as noted above and detailed below with reference to FIG. 40.

Figure 40A:
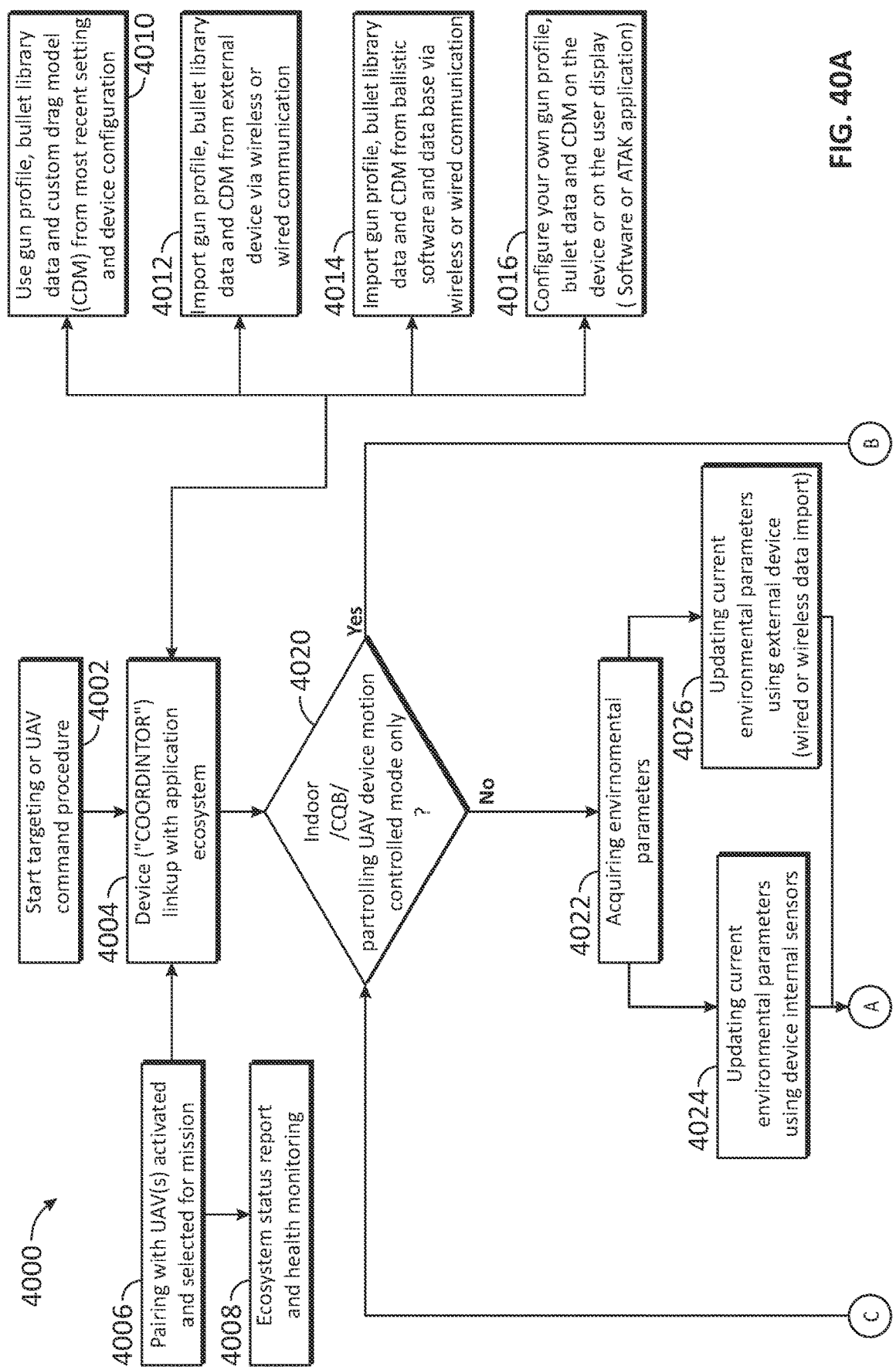
FIGS. 40A, 40B, and 40C illustrate a flowchart of targeting and UAV command and control procedures, in accordance with an embodiment of the disclosure.
Figure 40B:
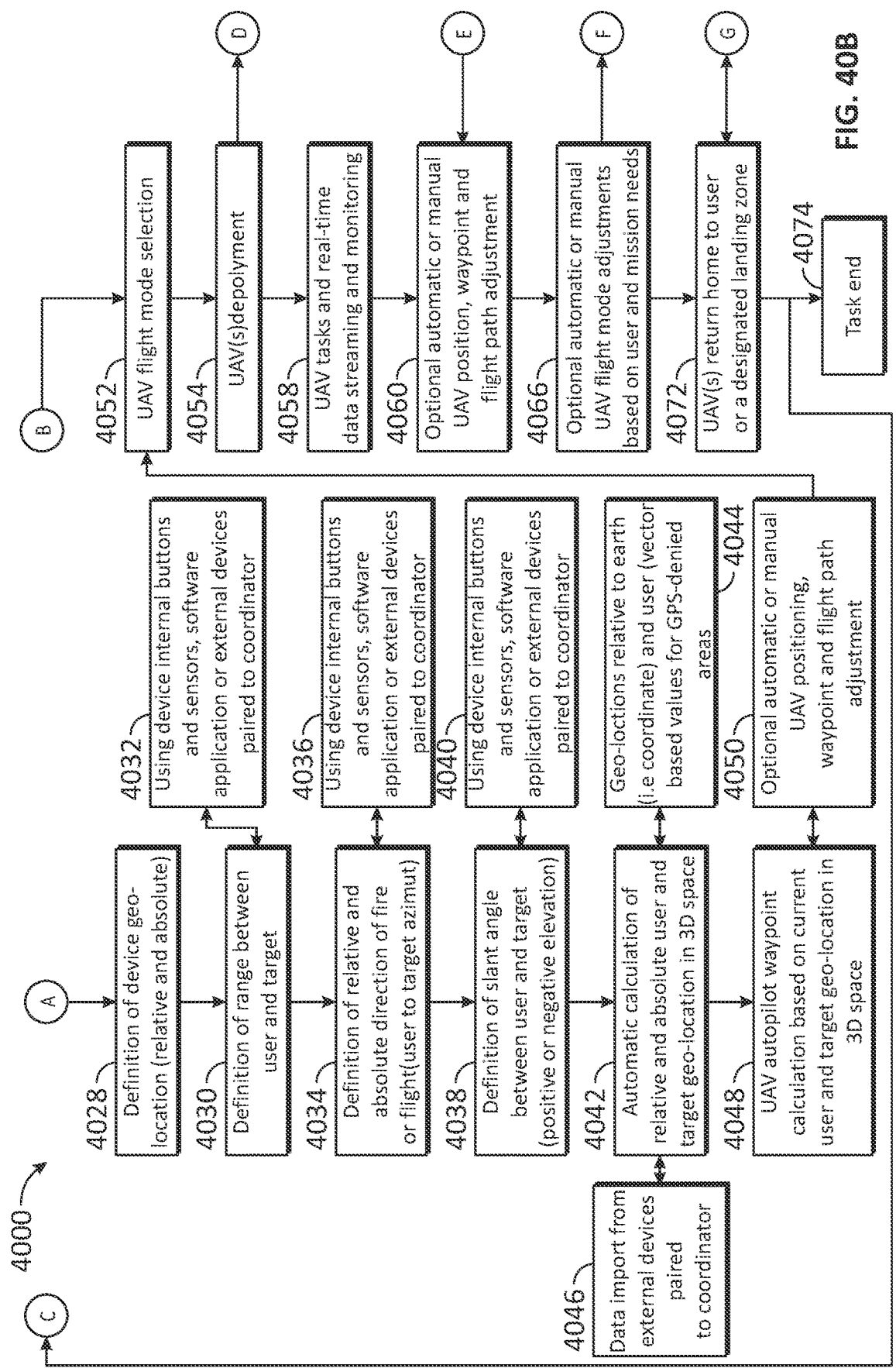
Figure 40C:
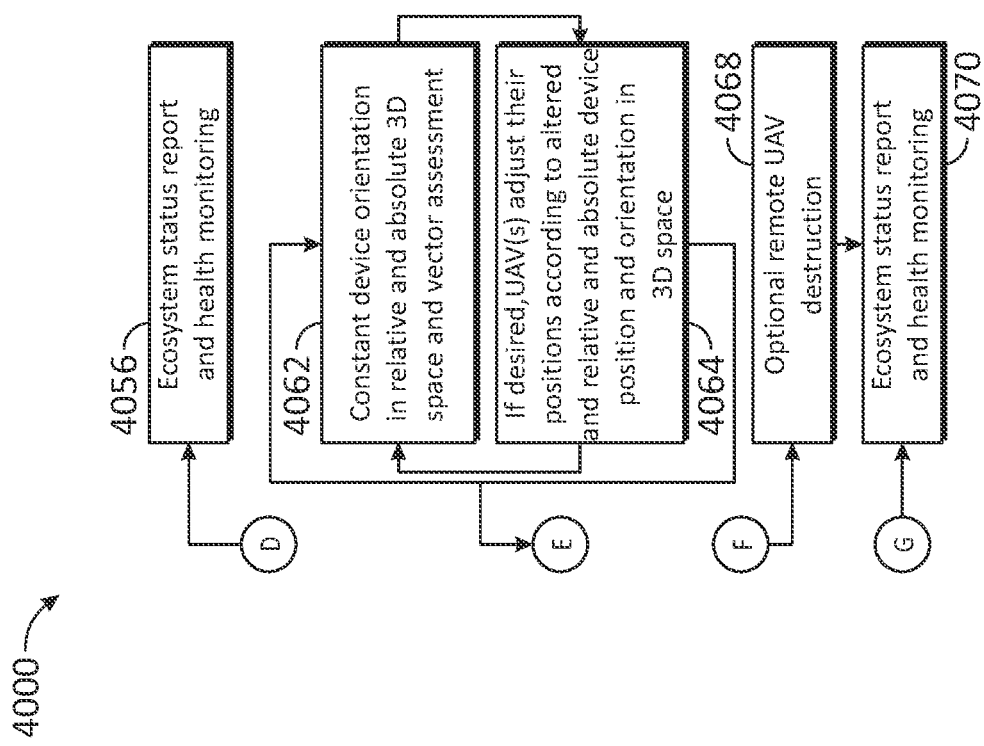

FIGS. 40A, 40B, and 40C illustrate a flowchart of a process of targeting and UAV command and control procedures, in accordance with an embodiment of the disclosure. The process illustrated in FIG. 40 may be performed in block 3995 illustrated in FIG. 39B, described above. Any step, sub-step, sub-process, or block of process may be performed in an order or arrangement different from the embodiments illustrated by FIG. 40. For example, one or more blocks may be omitted from or added to the process. Process may be applied to any embodiment disclosed herein.

As shown, process may begin with a start targeting or UAV command procedure (block 4002), which triggers coordinator linkup with application ecosystem (block 4004). Block 4004 may include various device pairing, status reports, and health monitoring, such as pairing with UAV(s) (e.g., one or more UAVs 100) activated and selected for mission (block 4006) and ecosystem status report and health monitoring (block 4008). Block 4004 may include configuration of various profiles. For instance, the coordinator 3200 may use a gun profile, bullet library data and custom drag model (CDM) from most recent setting and device configuration (block 4010). In embodiments, the coordinator 3200 may import gun profile(s), bullet library data and CDM from an external device via wireless or wired communication (block 4012). In block 4014, the coordinator 3200 may import gun profile(s), bullet library data and CDM from ballistics software and database via wireless or wired communication. In block 4016, the system may configure a gun profile, bullet data and CDM on the coordinator 3200 or on a user display (e.g., software or TAK application).

Process may proceed to block 4020, which checks whether the system is in an indoor, CQB, or patrolling UAV device motion controlled mode. If not, process may proceed in acquiring environmental parameters (block 4022). Block 4022 may include updating current environmental parameters using device internal sensors (block 4024) and/or using external device(s) via wired or wireless data import (block 4026).

Process may then proceed to define and/or calculate one or more characteristics. For instance, process may obtain definition of device geolocation (relative and absolute) (block 4028) and definition of range between user and target (block 4030). Defining the range between user and target may include using device internal buttons and sensors, software application or external devices paired to the coordinator 3200 (block 4032). In embodiments, process may obtain definition of relative and absolute direction of fire or flight (user to target azimuth) (block 4034), which may include using device internal buttons and sensors, software application or external devices paired to the coordinator 3200 (block 4036). In embodiments, process may obtain definition of slant angle between user and target (positive or negative elevation) (block 4038), which may include using device internal buttons and sensors, software application or external devices paired to the coordinator 3200 (block 4040).

As shown, process may include automatic calculation of relative and absolute user and target geolocation in 3D space (block 4042). For example, the calculation may utilize geolocations relative to earth (i.e., coordinator 3200) and user (vector-based and computer vision-based values for GPS-denied areas) (block 4044). In some embodiments, data may be imported from external devices paired to the coordinator 3200 (block 4046).

Process may include UAV autopilot waypoint calculation(s) based on current user and target geolocation in 3D space (block 4048). In embodiments, optional automatic or manual UAV positioning, waypoint and flight path adjustment may occur in block 4050. Process may then proceed to UAV flight mode selection (block 4052). As shown, if block 4020 returns a yes, process may proceed directly to block 4052.

Once flight mode is selected, process may proceed to UAV deployment (block 4054), during which ecosystem status report and health monitoring occurs (block 4056). Once deployed, the UAV(s) perform mission tasks and provide real-time data streaming and monitoring (block 4058). In some embodiments, process may include optional automatic or manual UAV position, waypoint and flight path adjustment (block 4060). If so, process includes constant device orientation in relative and absolute 3D space and vector assessment (block 4062). If desired, the UAV(s) may adjust position according to altered relative and absolute device position and orientation in 3D space (block 4064). Blocks 4062 and 4064 may repeat as many times as needed for the duration of operations.

In some embodiments, process may include optional automatic or manual UAV flight mode adjustments based on user and mission needs (block 4066). If so, process includes optional UAV destruction (block 4068) or other flight mode adjustments, supported by ecosystem status report and health monitoring (block 4070). In block 4068, the UAV may include a nano-charge, a phosphor ignition system, acid, an electrical short circuit mechanism, an explosive charge, or other destruction application or system. The UAV destruction system (e.g., explosive charge(s)) may be carried by the rotating payload system, discussed above. The UAV destruction may be physically, sensor, or remotely triggered, such as by a centralized system or control. For example, the UAV may be remotely destroyed in case of enemy capture. In some embodiments, the UAV destruction may be used to engage a target. For instance, the UAV may be used as a suicide UAV to engage a target beyond a sniper engagement distance, where the UAV may be flown (directly) into an enemy and an explosive charge triggered physically (e.g., impact trigger), via sensors (e.g., heat, proximity, face identification, artificial intelligence or neural network decision or trigger, etc.), or remotely (e.g., via TAK mission control system 1502). In embodiments, an operator may fly the UAV to a designated position, land and hide the UAV, and use the UAV as an improvised explosive device (IED) triggered in a similar manner.

As shown, process may include UAV return home to user or a designated landing zone (block 4072). Once the UAV(s) return home or land in the designated landing zone, process may return to block 4020 for further operations, or process may end (block 4074).

Figure 41:
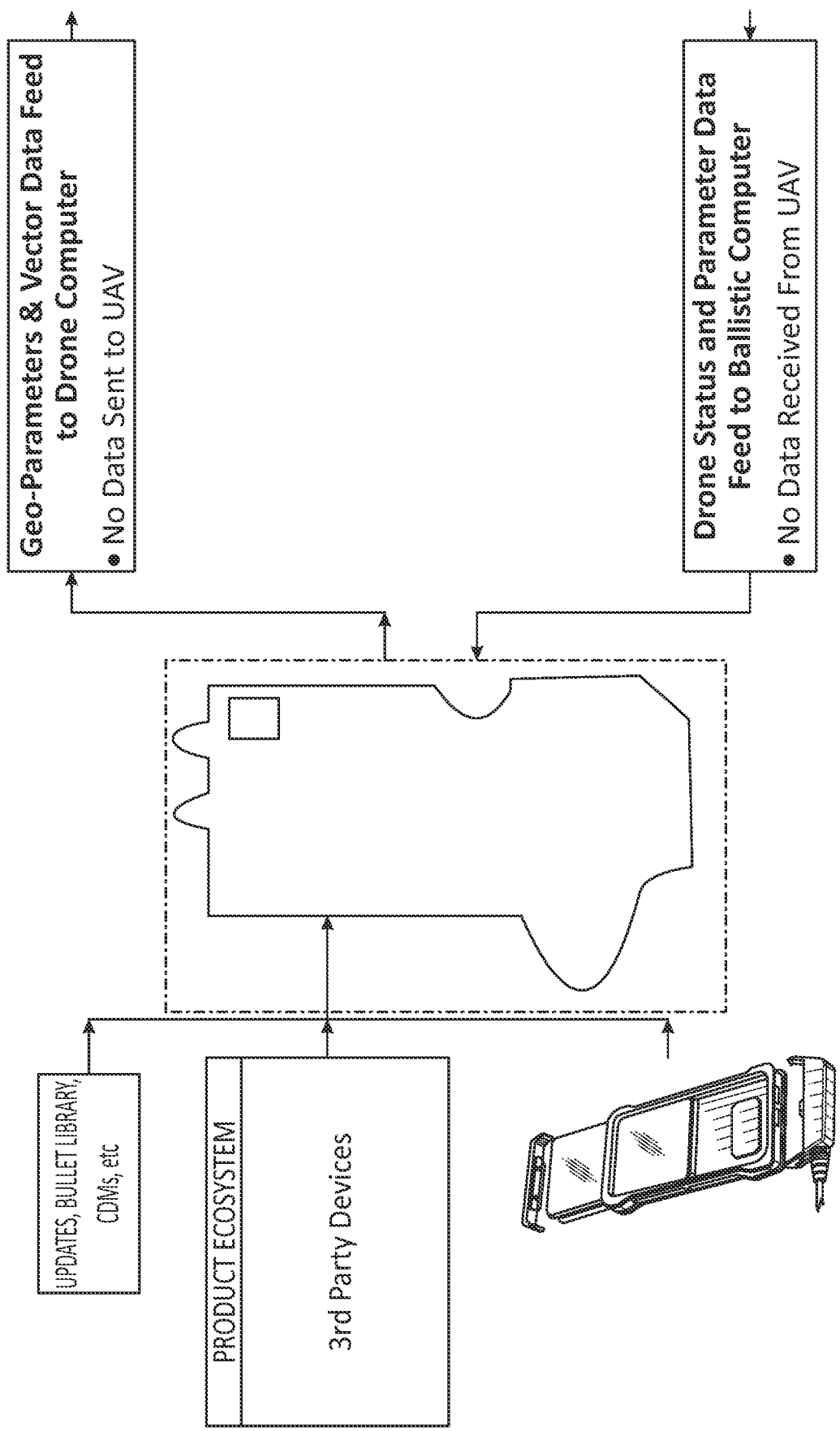
FIGS. 41-46 illustrate six respective operations supporting the flowcharts illustrated in FIGS. 39A-40, in accordance with an embodiment of the disclosure.
Figure 42:
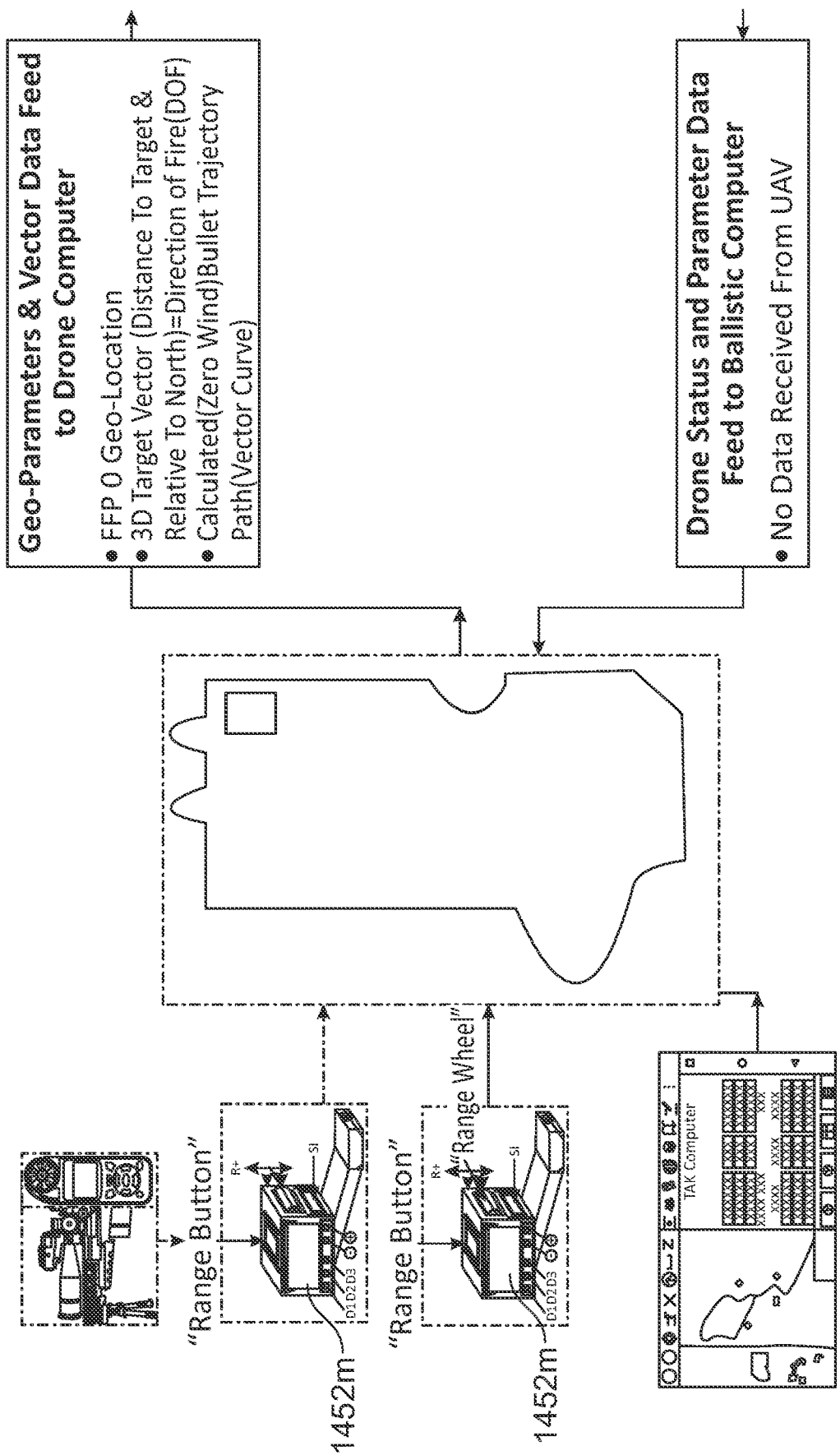
Figure 43:
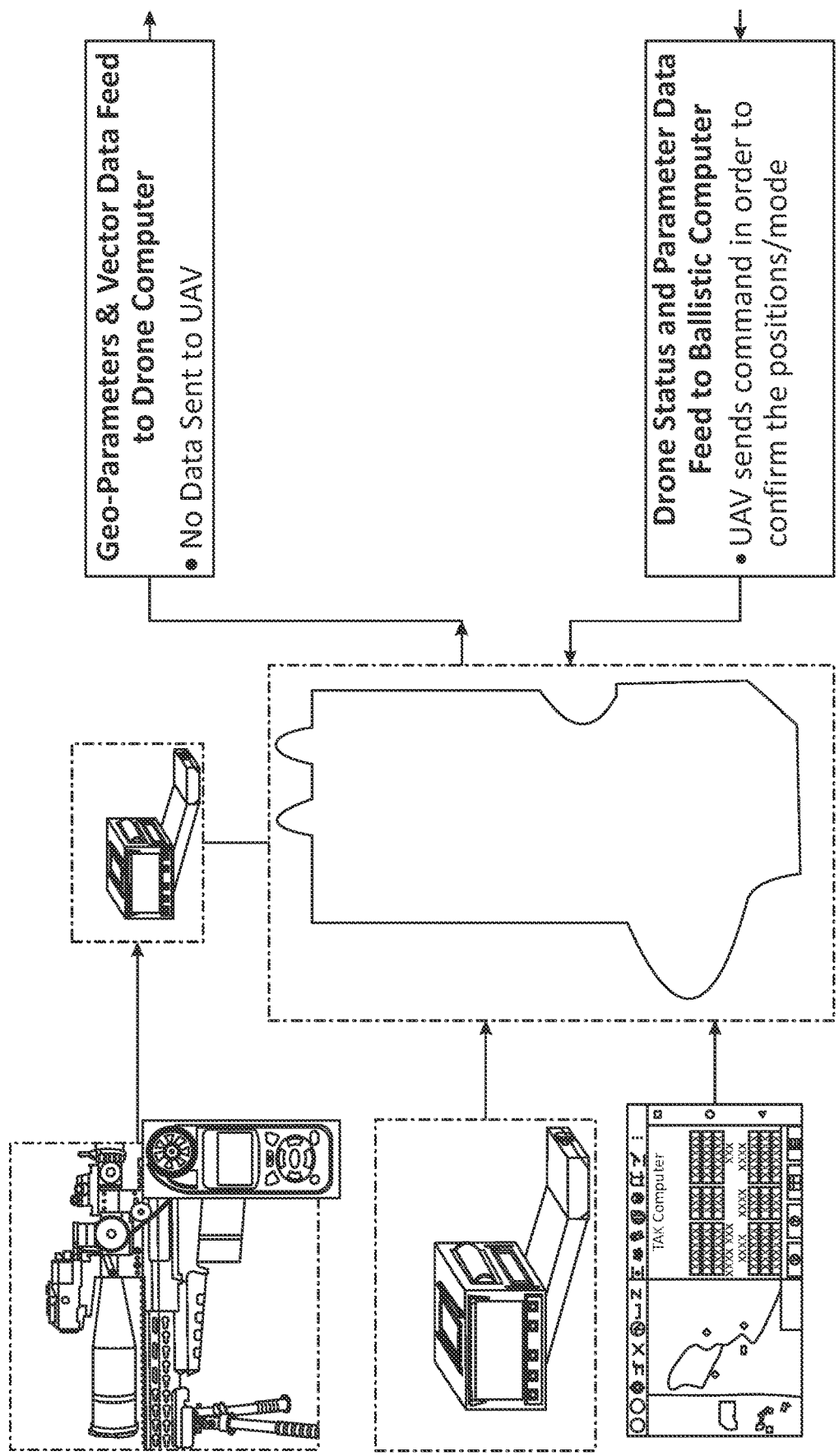
Figure 44:
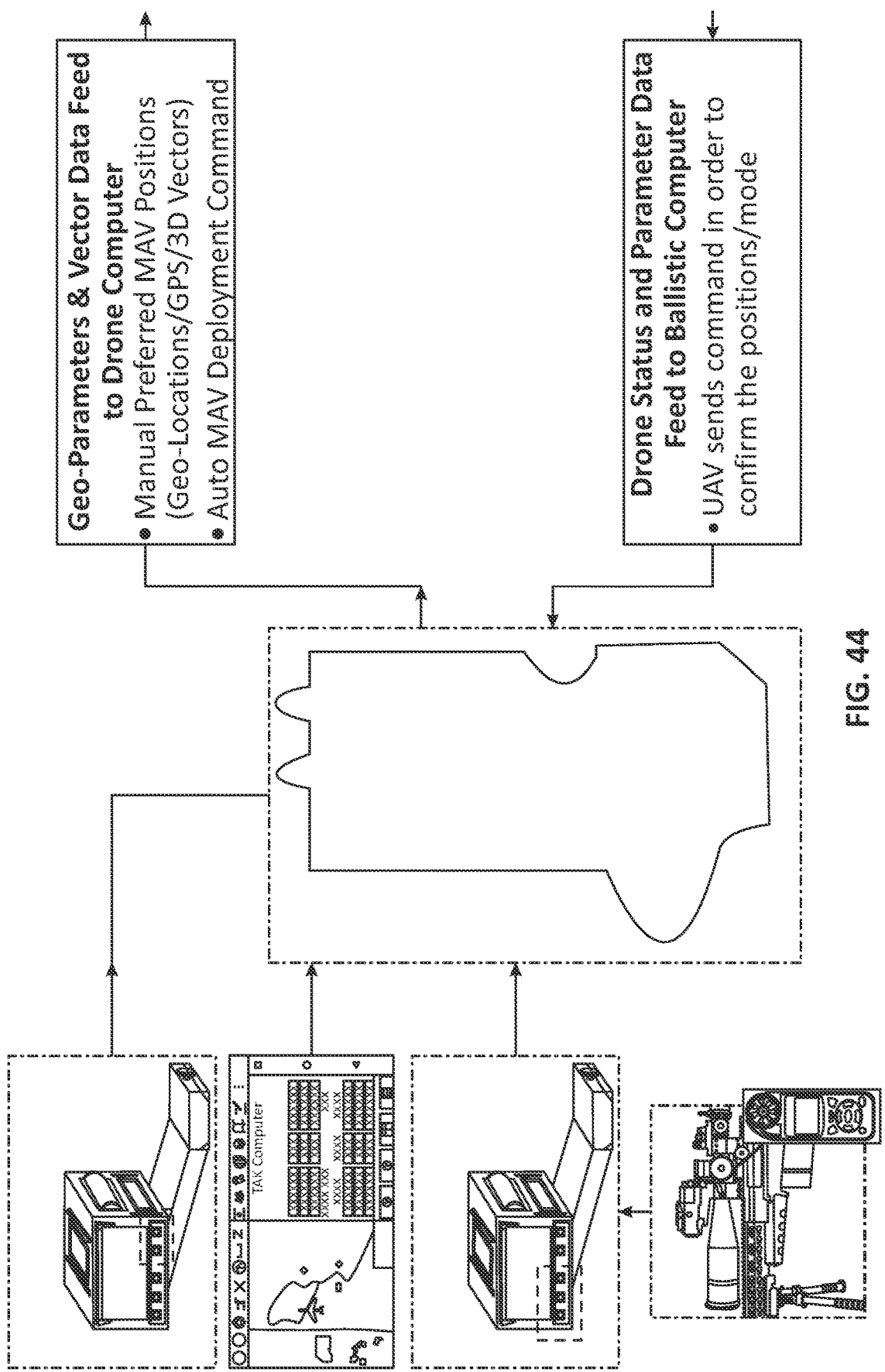
Figure 45:
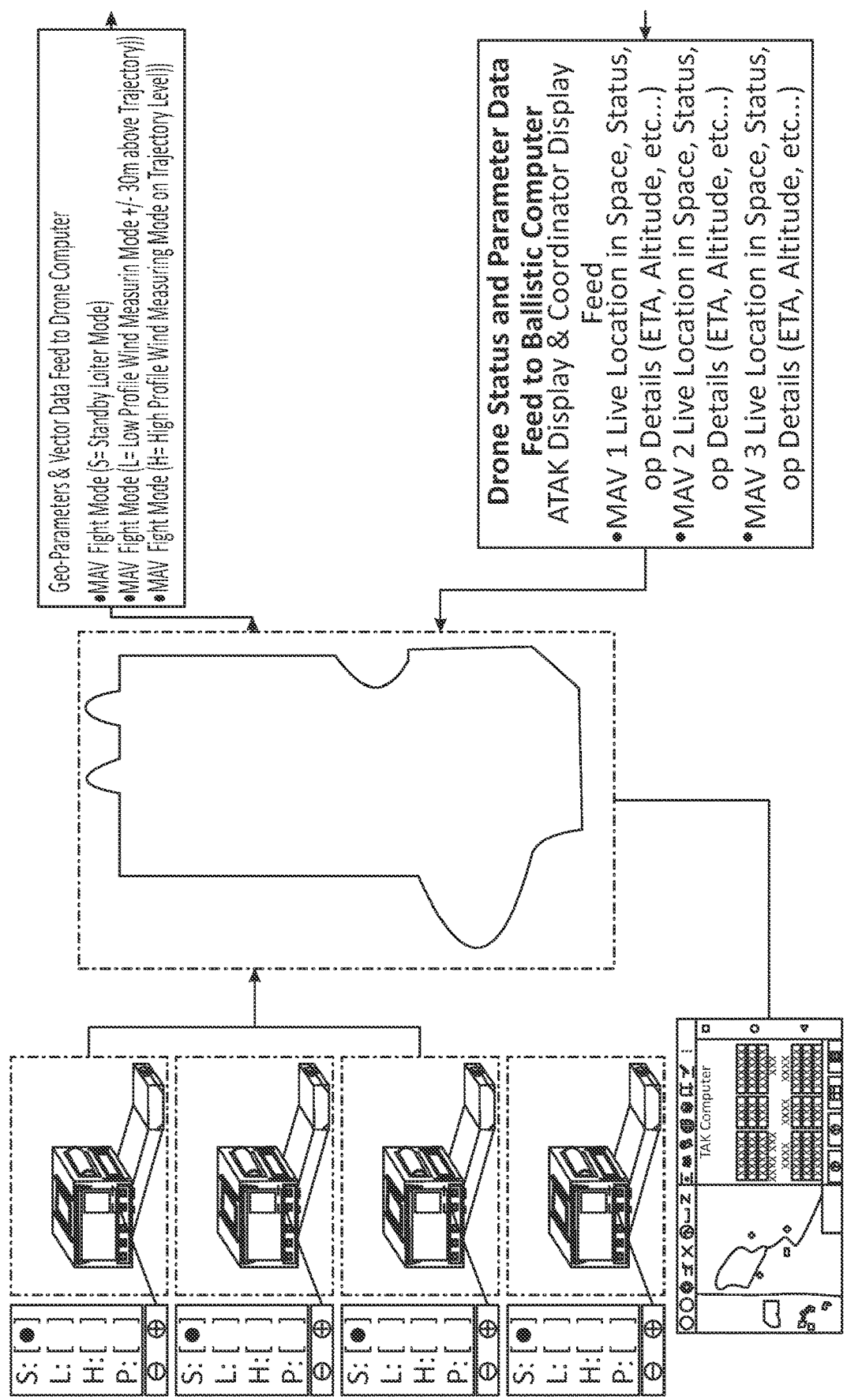
Figure 46:
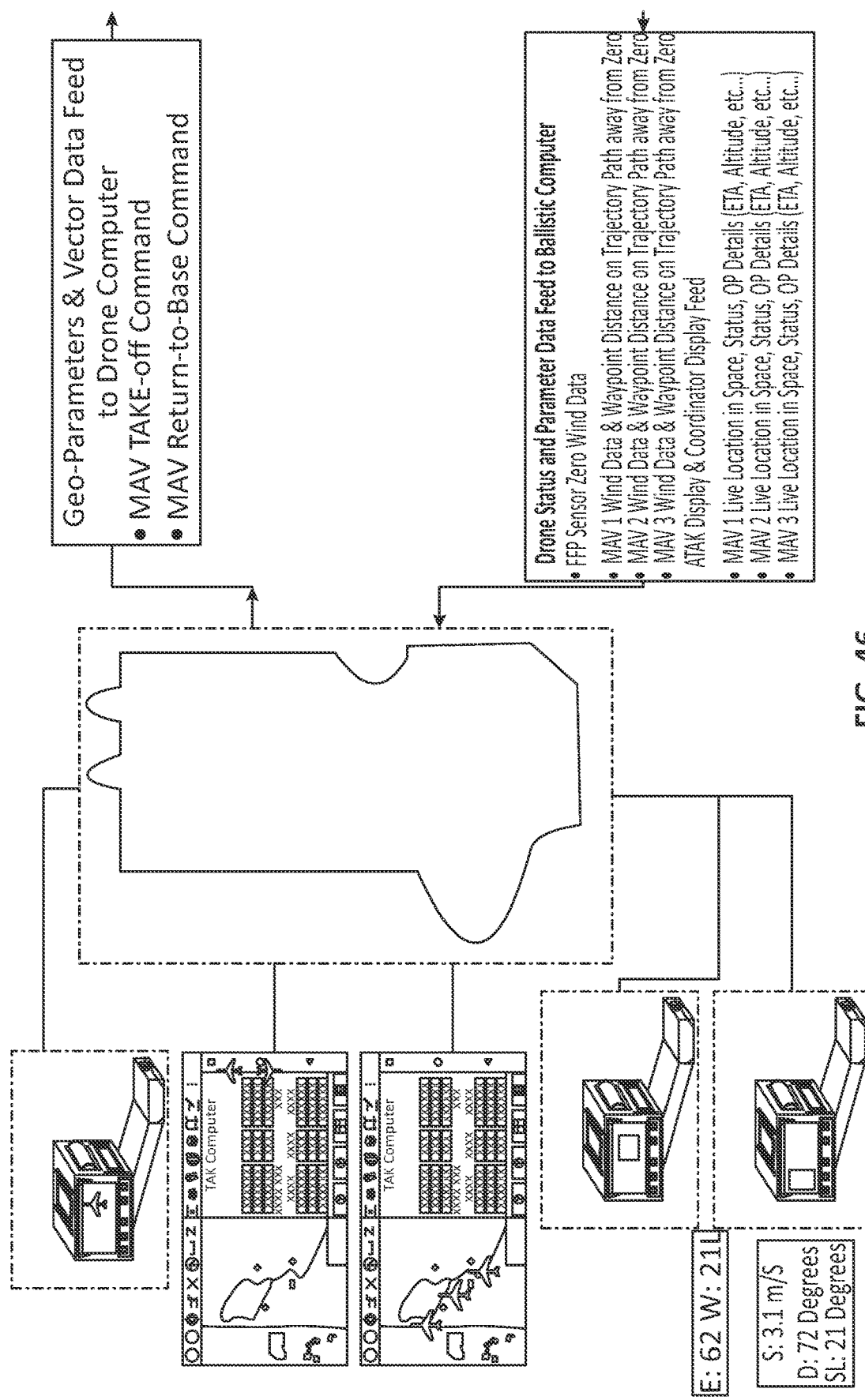

FIGS. 41-46 illustrate six respective operations supporting the flowcharts illustrated in FIGS. 39A-40C, in accordance with an embodiment of the disclosure. Specifically, FIG. 41 illustrates a first operation of gun profile, ammo profile, and/or custom drag model (CDM) configuration. FIG. 42 illustrates a second operation of acquiring target parameters. FIG. 43 illustrates a third operation of acquiring environmental parameters. FIG. 44 illustrates a fourth operation of defining UAV positions between FFP 0 and target. FIG. 45 illustrates a fifth operation of defining a UAV flight mode. FIG. 46 illustrates a sixth operation of deploying drones and receiving live drone status and wind data.

Figure 47:
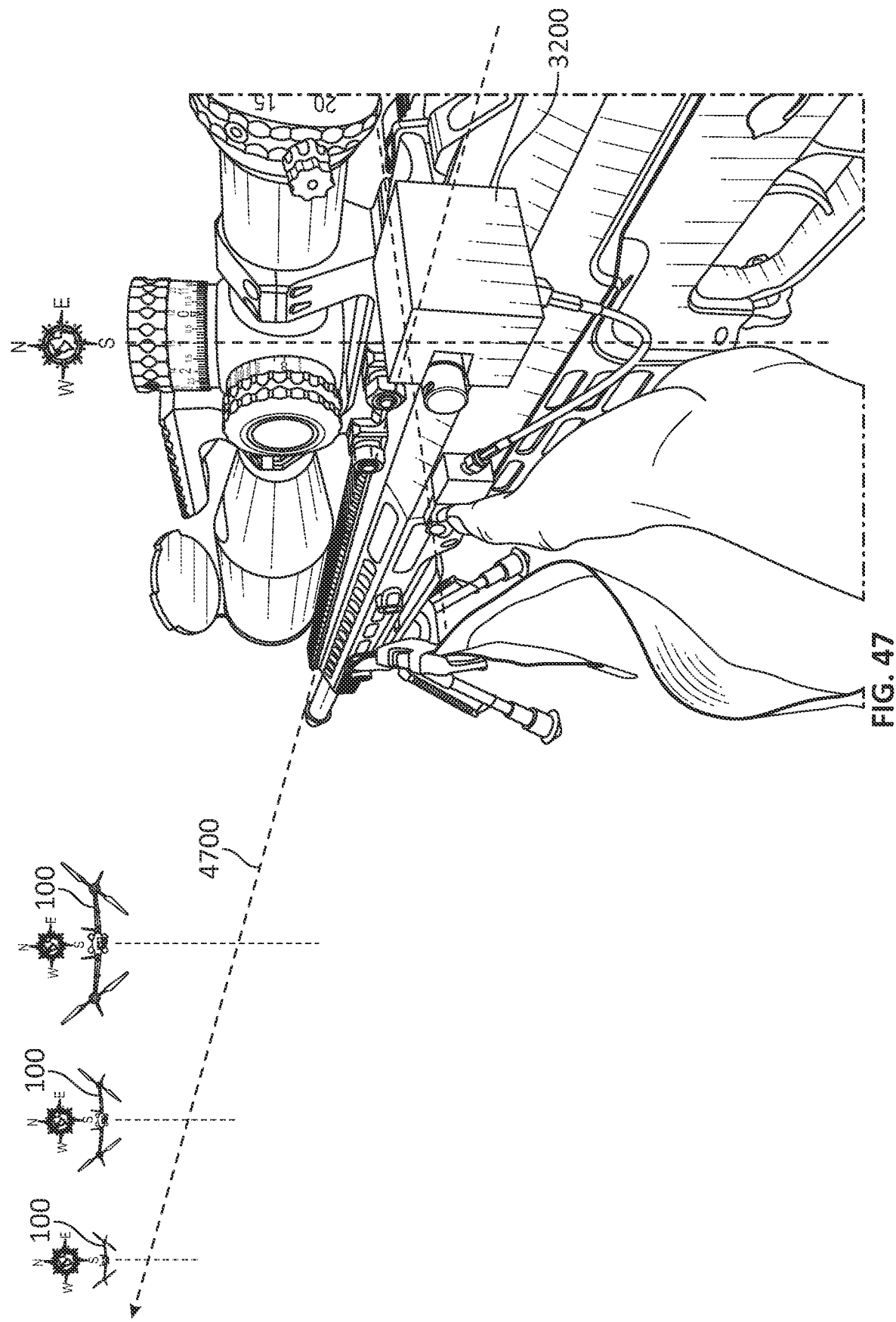
FIGS. 47-50 illustrate various examples of coordinator movement detection and triggering UAV control and UAV position adjustment, in accordance with an embodiment of the disclosure.
Figure 48:
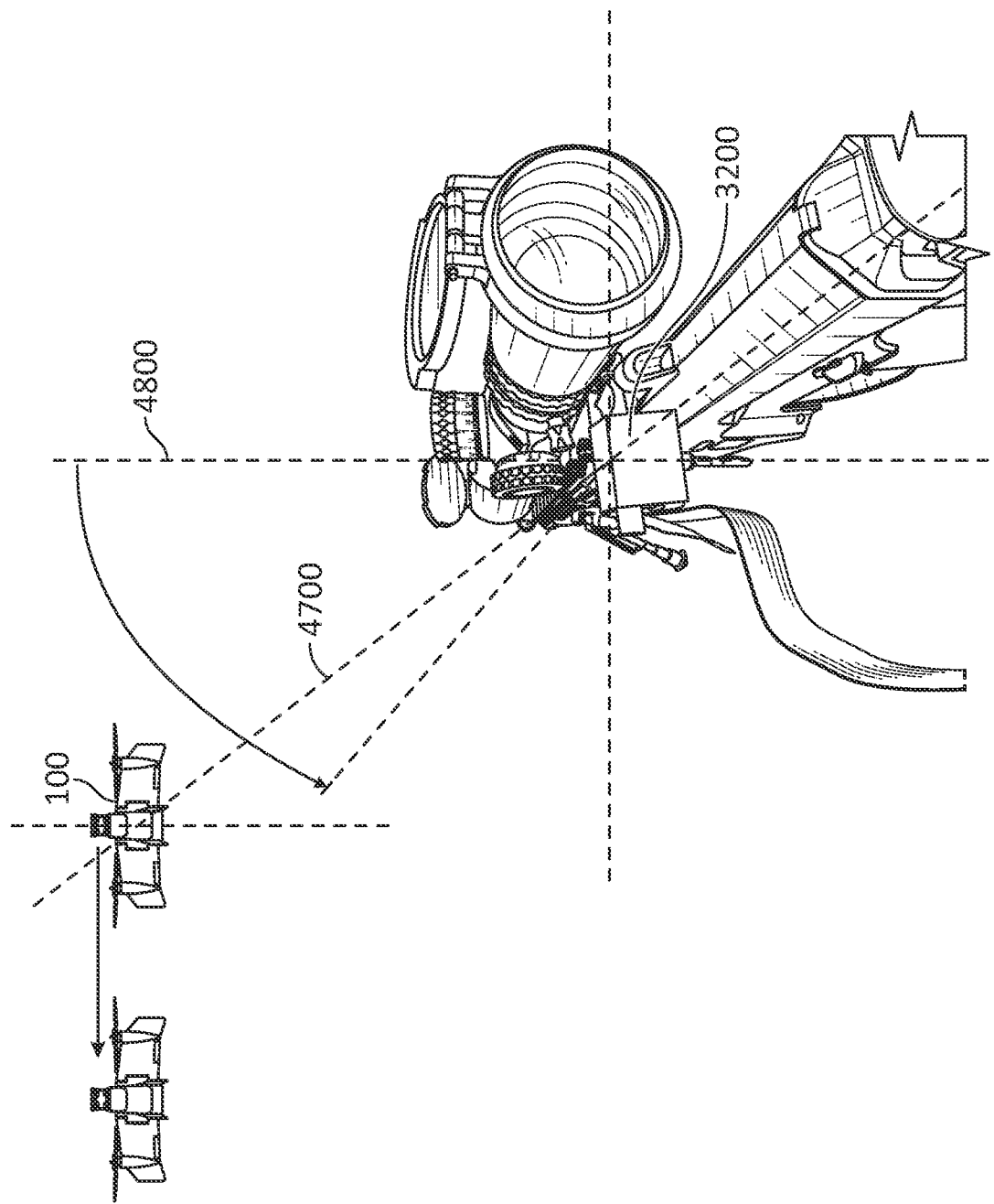
Figure 49:
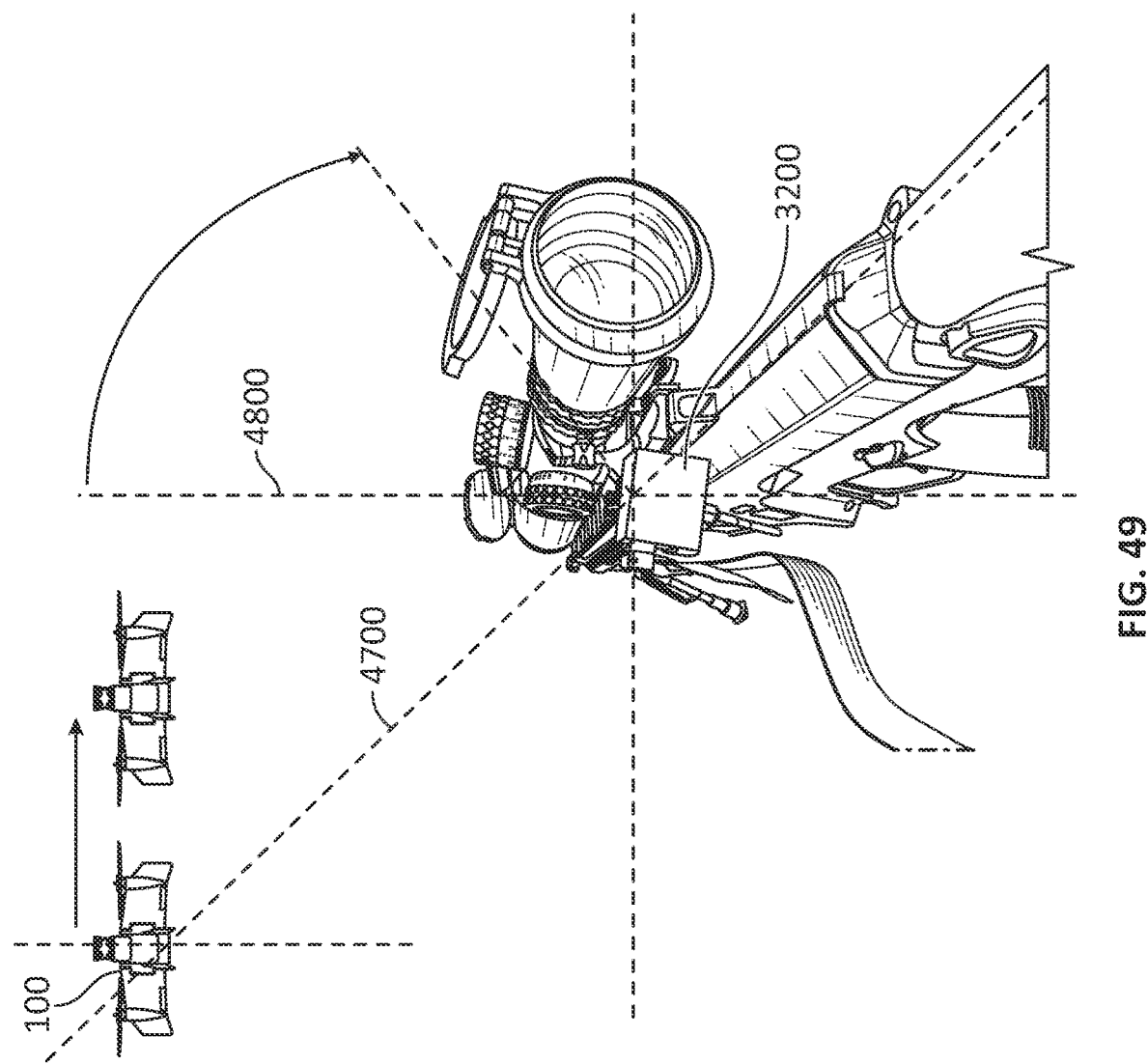
Figure 50:
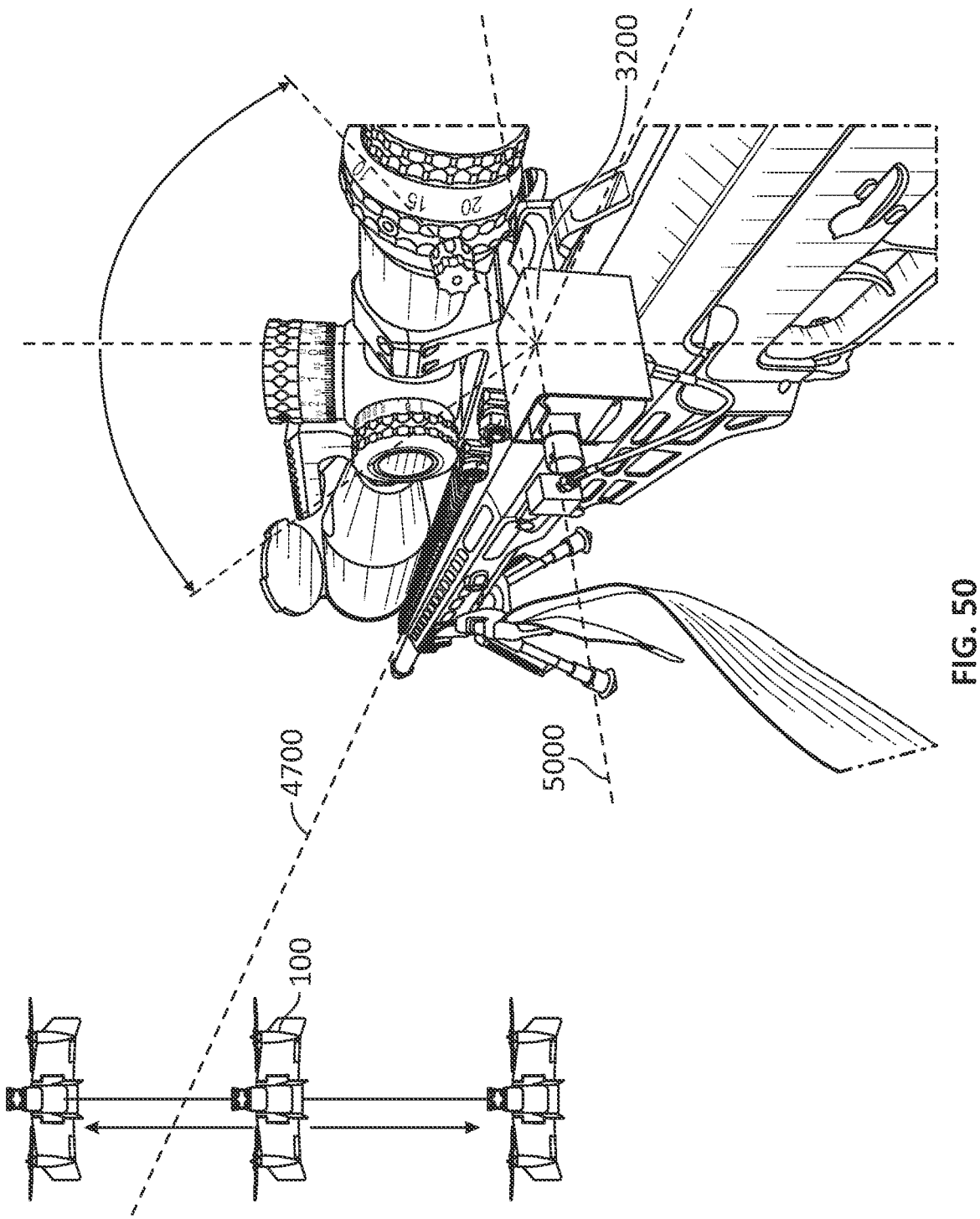

FIGS. 47-51 illustrate various examples of coordinator movement detection and triggering UAV control and UAV position adjustment, in accordance with an embodiment of the disclosure. For example, FIG. 47 illustrates controlling a position of UAV 100 in space through a direction of fire (e.g. azimuth, distance to target, slant angle) 4700 captured via the coordinator 3200. FIGS. 48-49 and 51 illustrate controlling lateral movement of UAV 100 in space via canting of the weapons system left or right (i.e., from vertical or defined and calibrated space-zero-position 4700, 4800, and 5000). FIG. 50 illustrates controlling vertical movement of UAV 100 in space via canting and/or adjusting the slant angle of the weapons system (i.e., from horizontal about a lateral axis 5000 or defined and calibrated space-zero-position 4700, 4800, and 5000).

Referring to FIG. 47, a user may designate one or more locations to place corresponding UAVs using coordinator 3200. For example, using direction of fire 4700, a user may simply point to an area to set a hovering, loitering, or landing position for UAV 100. In such embodiments, user input at controller 3200 may set the position and cause a corresponding calibration, determination, or calculation of a flight path of UAV 100 to the set position (e.g., via a flight module). In this manner, a user may set the position(s) of UAV(s) 100 along the projectile's flight as desired, such as for wind data collection to aid ballistic calculations or area-specific target data gathering. In addition, such functionality may allow the user to place one or more UAVs in space for other functions, including reconnaissance, CBRNE data collection, tactical, or visual support, among others.

Referring to FIGS. 48-51, a user may control a movement of UAV 100 via movement of weapons system. For example, a motion in 3D space of coordinator 3200 (via weapons system or observation device) may cause a real-time or near real-time mimicking or control of UAV 100 in 3D space. In this manner, a user (e.g., shooter of weapons system) may fly or otherwise position UAV 100 via weapon or observation device movement.

As shown in FIGS. 48, 49, and 51, a weapon motion about direction of fire 4700 (e.g., canting of weapons system left or right from vertical 4800) may cause coordinator 3200 to command UAV 100 to fly laterally to the left (FIGS. 48 and 51) or to the right (FIG. 49) relative to the weapon.

As shown in FIG. 50, a weapon motion about lateral axis 5000 (e.g., tilting the weapon up or down) may cause coordinator 3200 to command UAV 100 to fly vertically up or down. In other embodiments, weapon motion about lateral axis 5000 may cause coordinator 3200 to command UAV 100 to fly towards or away from the weapon.

In embodiments, a weapon motion about vertical 4800 (e.g., rotating the weapon left or right) may cause coordinator 3200 to command UAV 100 to rotate clockwise or counterclockwise relative to the weapon. For example, a clockwise rotation of weapons system about vertical 4800 may cause a corresponding clockwise rotation of UAV 100 while hovering. Similarly, a counterclockwise rotation of weapons system about vertical 4800 may cause a corresponding counterclockwise rotation of UAV 100 while hovering.

Figure 54:
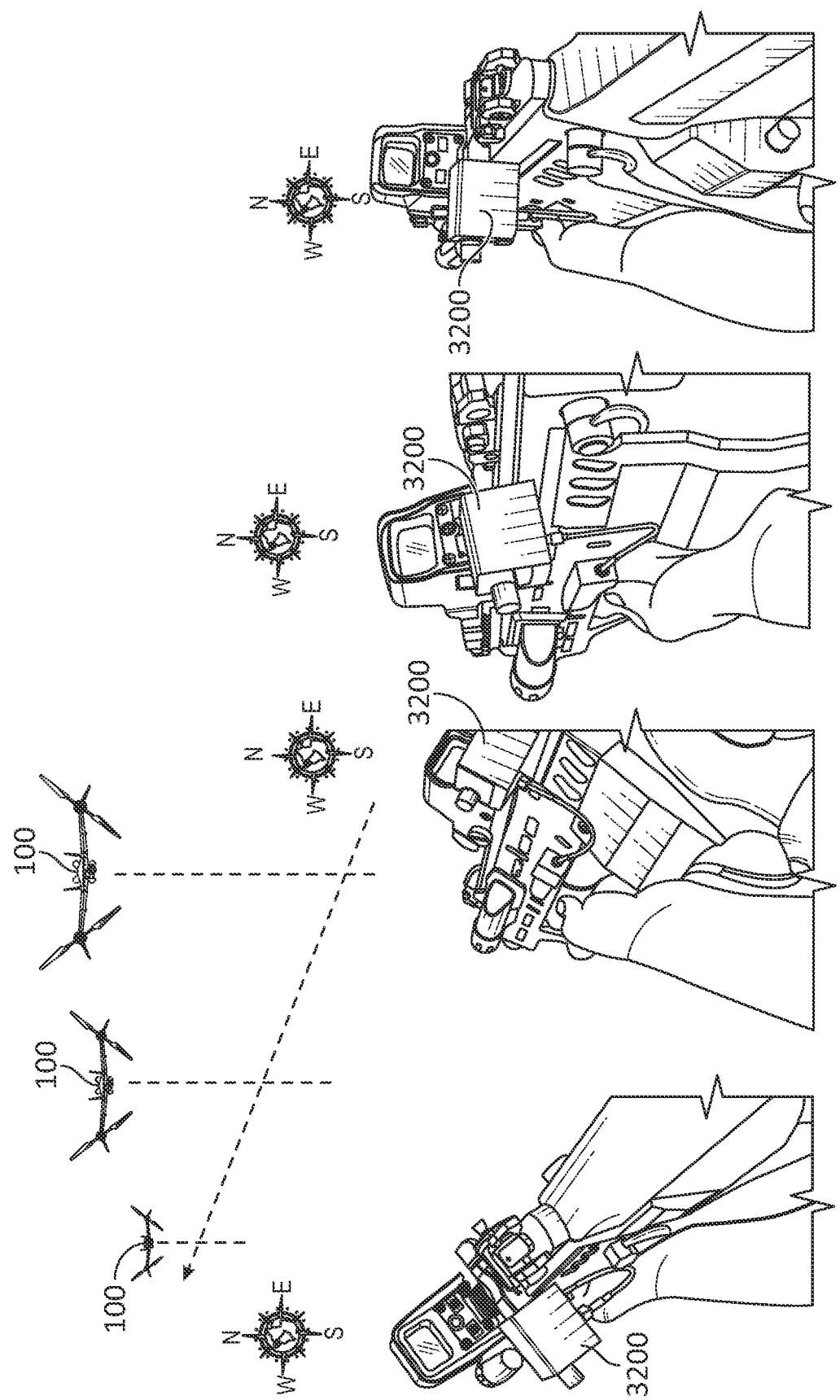

FIGS. 52-54 illustrate additional examples of coordinator-enabled UAV positioning, such as in an indoor/CQB mode, in accordance with an embodiment of the disclosure. For example, one or more sensors may detect coordinator movement in 3D space to autopilot UAV 100 relative to direction of fire, for instance. In some embodiments, UAV 100 may be autopiloted based on movement of the coordinator 3200 (e.g., follows the coordinator's movements, etc.). In some embodiments, UAV 100 may be piloted manually via one or more controls (e.g., a joystick function) on the coordinator 3200. For instance, INS 6020 sensor such as motion, compass, visual and gyroscopic sensors detect coordinator movement in 3D space relative to the ground or a designated vector (e.g., calibrated space-zero-position) such as direction of flight of a bullet, energy beam, laser beam or frequency wave. UAV 100 may follow the coordinator movements and directions accordingly, either when manually activated by pushing a button on the device (or remote control) or in automatic mode.

Figure 55:
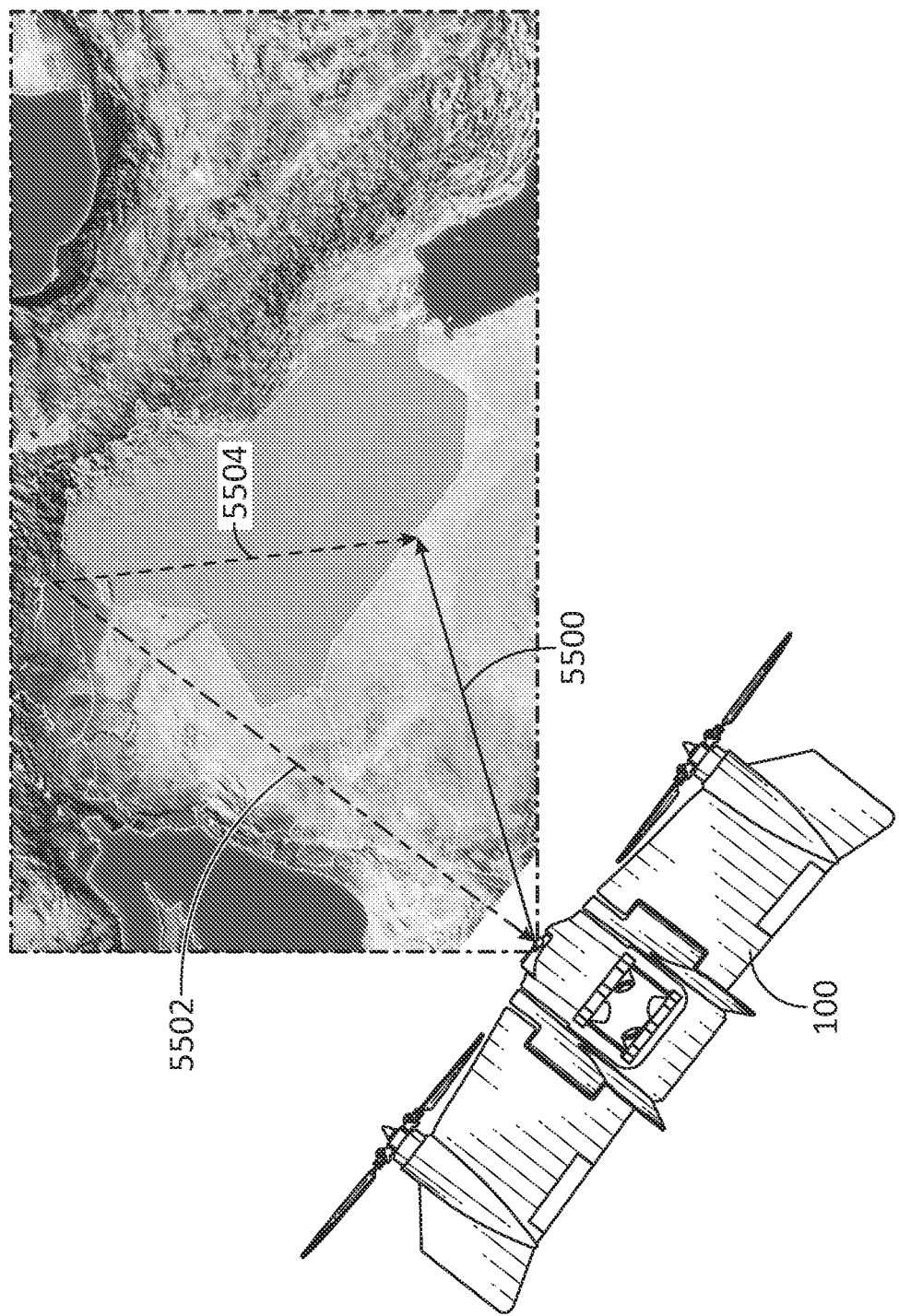
FIG. 55 illustrates true wind estimation via a wind triangle method, in accordance with an embodiment of the disclosure.

FIG. 55 illustrates wind estimation via a wind triangle method, in accordance with an embodiment of the disclosure. As shown, UAV 100 may measure wind speed and wind direction using a wind triangle technique and apply the wind parameters to precision target engagement operations. Although UAV 100 is shown, other airborne stations may be utilized, including smaller or higher class UAV/UAS, airplanes, VTOLs, tail-sitters, silent gliders, multi-rotors, helicopters, or hybrid configurations.

Referring to FIG. 55, a wind measurement system may include the coordinator 3200 and two or more wind measurement stations. The wind measurement stations may be a combination of fixed ground and airborne stations. The wind measurement stations may provide estimations of the wind profile along the ballistic trajectory path or measure wind profiles indirectly or predict local wind profiles via machine learning algorithms and topographic area data. The stations may provide the estimated velocity vector (speed and 3D direction) of the wind with respect to the ground, and their position along the ballistic trajectory. A method of wind estimation may include measuring the velocity vector of the station with respect to the ground (ground course vector 5500), and the velocity vector of the air relative to the station (apparent wind vector 5502). The estimation of the wind with respect to the ground (true wind vector 5504) is achieved by the combination of ground course vector 5500 and apparent wind vector 5502 (i.e., the wind triangle). FIG. 55 shows the velocity vectors that make up the wind triangle. The true wind vector 5504 is calculated by adding the apparent wind and ground course vectors 5502, 5500.

FIG. 56 illustrates various wind sensors, in accordance with an embodiment of the disclosure. For fixed ground stations the velocity vector may be assumed to be identically zero and does not require a ground course measurement. For each airborne station, the aircraft could use a variety of methods to measure their velocity with respect to the ground. Such methods include, but are not limited to, velocity measurements provided by a GPS device, and visual inertial odometry (VIO) techniques. A variety of methods could be used for each station to measure the apparent wind. For example, these methods include, but are not limited to, pitot tubes, omni-directional pitot tubes, differential pressure sensor arrays, ultrasonic time of flight sensors, aerodynamic deflection sensors, rotational anemometers, hot wire anemometers, particle image velocimetry, and vehicle airspeed to attitude modeling. An accurate heading reference of each station may be needed to get a common reference frame between stations. The heading can be measured using a variety of methods including, but not limited to, a magnetic compass, a GPS compass consisting of two horizontally spaced GPS or RTK GPS modules of known orientation, and visual inertial odometry (VIO) techniques.

Figure 57:
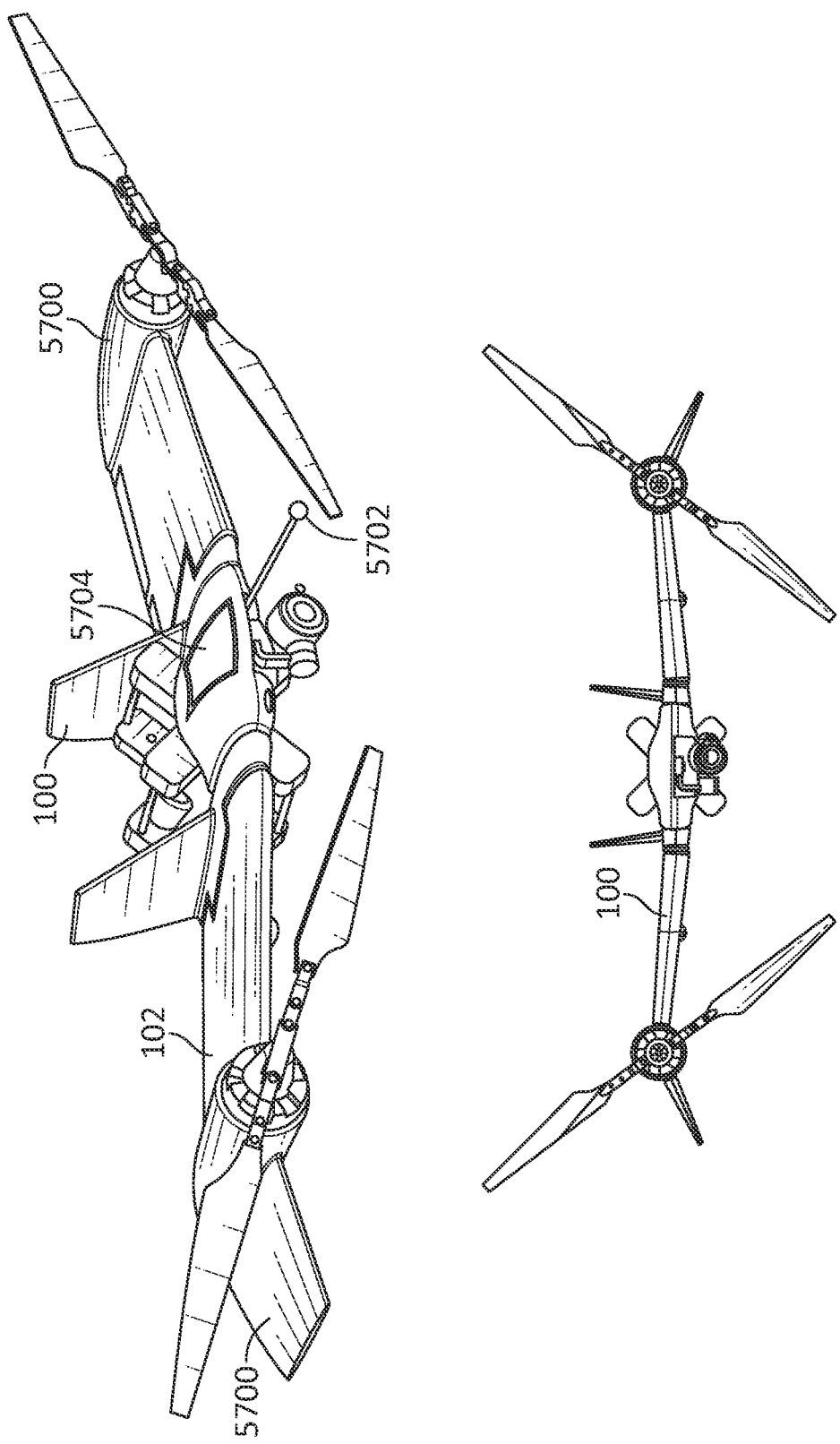
FIG. 57 illustrates sensor fusion methods and sensor placement on the UAV, in accordance with an embodiment of the disclosure.

FIG. 57 illustrates sensor placement on UAV 100, in accordance with an embodiment of the disclosure. As shown, UAV 100 may include a multitude of ground course and apparent wind measurement devices. For example, UAV 100 may include dual RTK GPS 5700 for ground course, position, and heading measurements. The RTK GPS may be placed on the wings 102 of UAV 100. The rotating payload 300 may include a 3-axis ultrasonic sensor for apparent wind measurement. In embodiments, UAV 100 may include a VIO system, including a camera and lidar, for ground course, position, and heading measurements. In some embodiments, UAV 100 may include an omni-directional pilot tube 5702. As shown, UAV 100 may include an inertial measurement unit (IMU) and autopilot feature 5704 to provide attitude and heading estimates for an attitude to apparent wind model reference and direction of flight (e.g., using accelerometer, gyroscope, magnetometer, etc.).

Figure 58A:
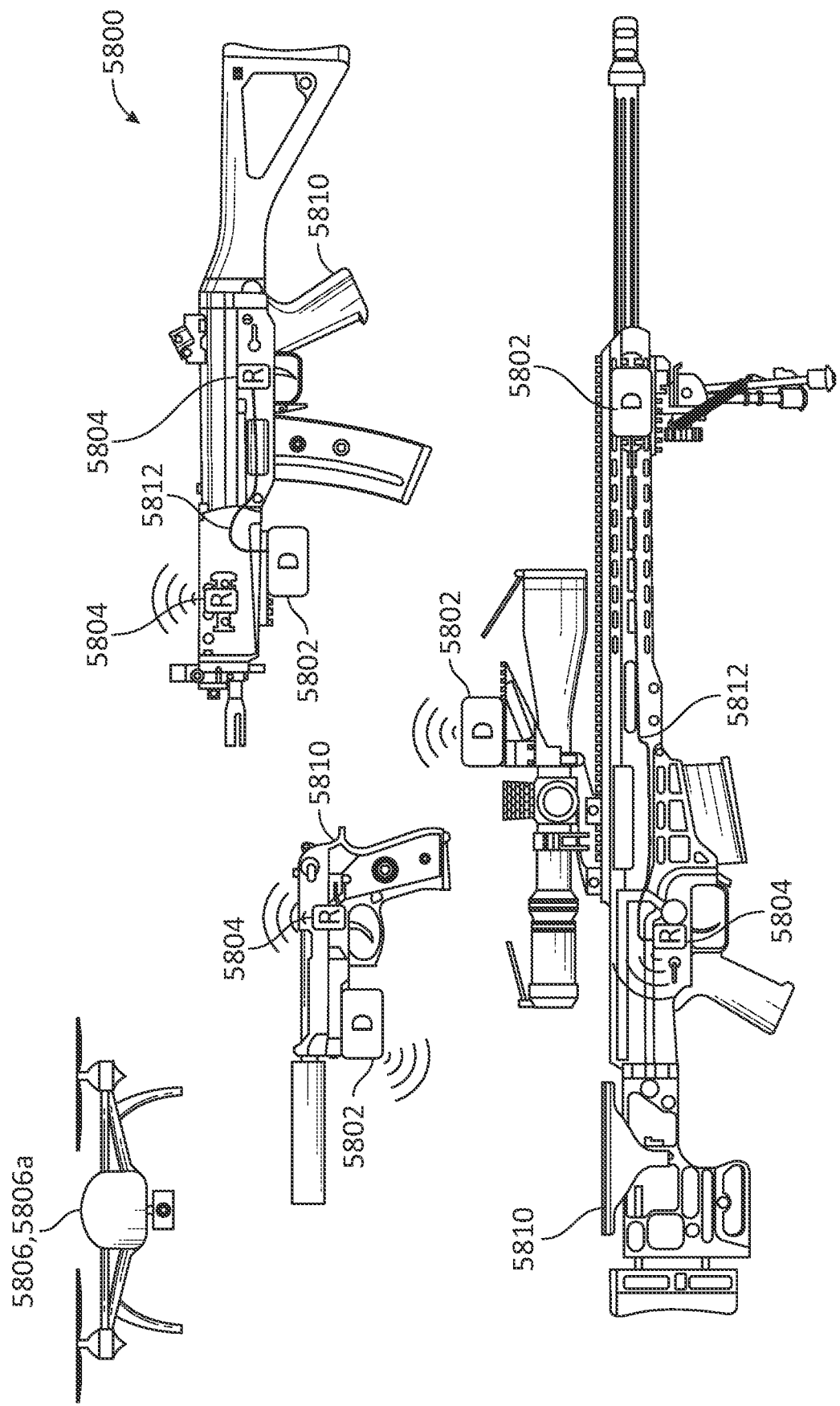
FIGS. 58A-58B illustrate various unmanned systems and various controller and remote placement options, in accordance with an embodiment of the disclosure.
Figure 58B:
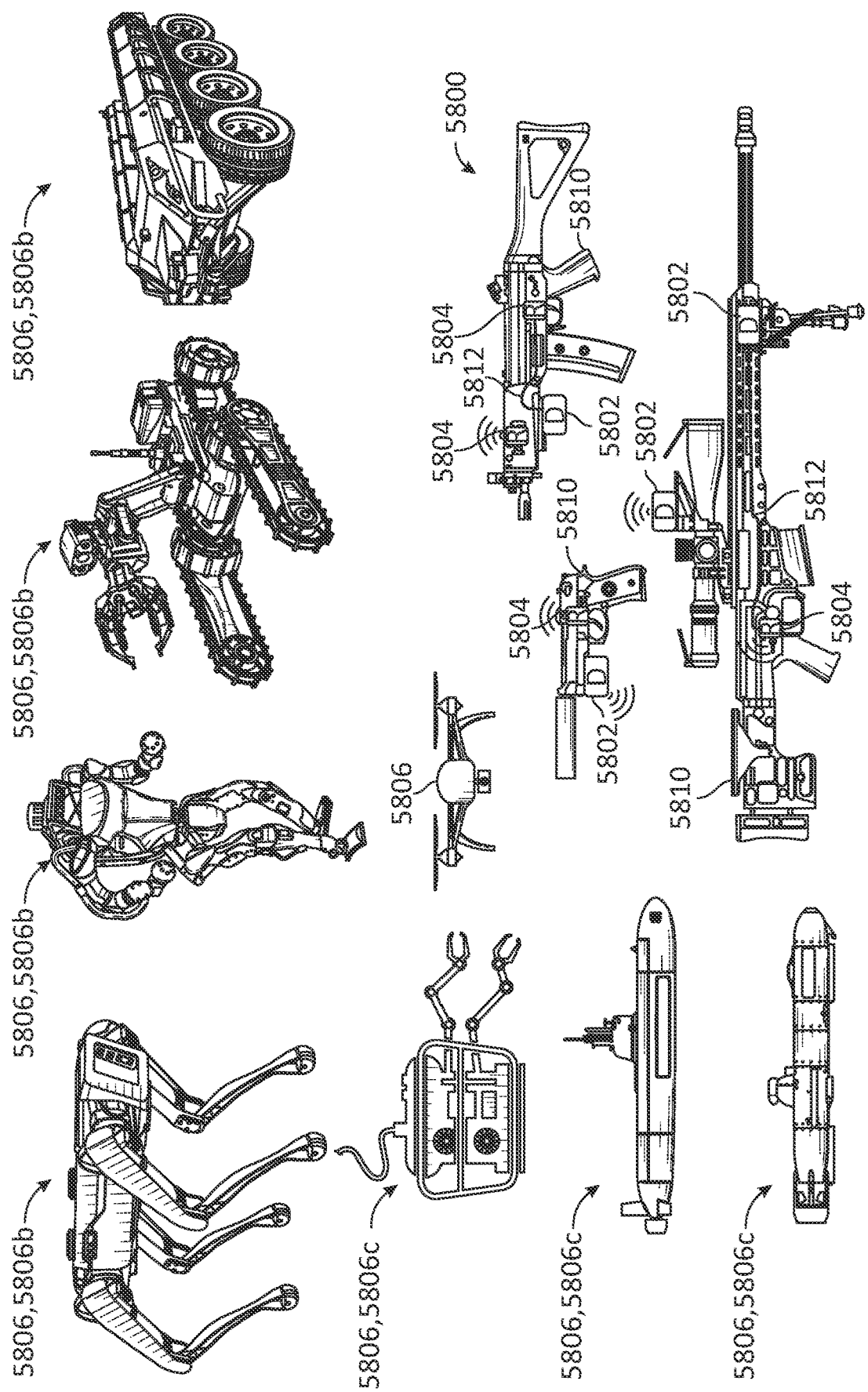

FIGS. 58A and 58B illustrate various unmanned systems and various controller and remote placement options, in accordance with an embodiment of the disclosure. Referring to FIG. 58, a system 5800 may include an unmanned system maneuver controller (USMC) 5802 and a remote 5804 operable to selectively control an operation of the USMC 5802. For example, remote 5804 may be operable to switch between various operation modes of USMC 5802, as detailed below. Except as otherwise noted below, USMC 5802 may be similar to coordinator 3200, described above. For example, USMC 5802 may interface or communicate with an unmanned system 5806 to control flight, maneuver, or dive (and/or other operations) of the unmanned system 5806, as described below.

Unmanned system 5806 may be any unmanned vehicle or system. For example, depending on the application, unmanned system 5806 may be implemented as a UAV 5806A, an unmanned surface vehicle (USV) 5806B, or an unmanned underwater vehicle (UUV) 5806C. Referring to FIG. 58A, UAV 5806A may be implemented as any airborne device, drone, or unmanned aerial system. For example, UAV 5806A may be implemented as UAV 100, described above. In embodiments, UAV 5806A may be similar to any of the airborne devices disclosed in U.S. application Ser. No. 16/822,925, filed Mar. 18, 2020, now U.S. Pat. No. 10,866,065, and U.S. application Ser. No. 17/099,592, filed Nov. 16, 2020, the disclosures of which are hereby incorporated by reference in their entireties for all purposes.

Referring to FIG. 58B, USV 5806B may be implemented as any ground, robotics, or unmanned surface system. For example, USV 5806B may be implemented as autonomous robotics systems, unmanned explosive ordnance disposal robot, inspection robot, cargo robot, or reconnaissance robot. UUV 5806C may be implemented as a water or underwater unmanned system. For example, UUV 5806C may be implemented as robotics systems, unmanned swimming platform, unmanned submarine, unmanned water reconnaissance system or other autonomous robotics underwater platform.

As shown in FIG. 58A, USMC 5802 may be mounted to a weapon 5810, such as a handgun, a pistol, a revolver, a rifle, a long gun, a sub-machine gun, a shotgun, etc. Such examples are illustrative only, and USMC 5802 may be mounted to any weapon system or observation device (e.g., scope, telescope, binoculars, spotting scope, camera system, etc.). USMC 5802 may be mounted to a rail (e.g., a Picatinny rail), slot, attachment point, or accessory of weapon 5810. For example, USMC 5802 may be mounted to a handguard, scope ring, or accessory rail of weapon 5810, although other configurations are contemplated. USMC 5802 may be mounted in the line of sight of the weapons operator, a virtual observer such as computer vision operated by a neural network, a remote camera, or otherwise in an accessible position.

Remote 5804 may be mounted to weapon 5810 near a handhold position. For example, remote 5804 may be mounted on or near a grip or handguard of weapon 5810 to allow intuitive interaction with UAV 100 while maintaining gun safety rules and weapon readiness. Depending on the application, remote 5804 may be in wireless communication with USMC 5802, or may be in wired communication with USMC 5802 (e.g., via a cable 5812). In some embodiments, system 5800 may include multiple remotes 5804 in connection with USMC 5802, such as remotes 5804 positioned on the handguard and near the pistol grip of weapon 5810, although other configurations are contemplated.

Figure 59:
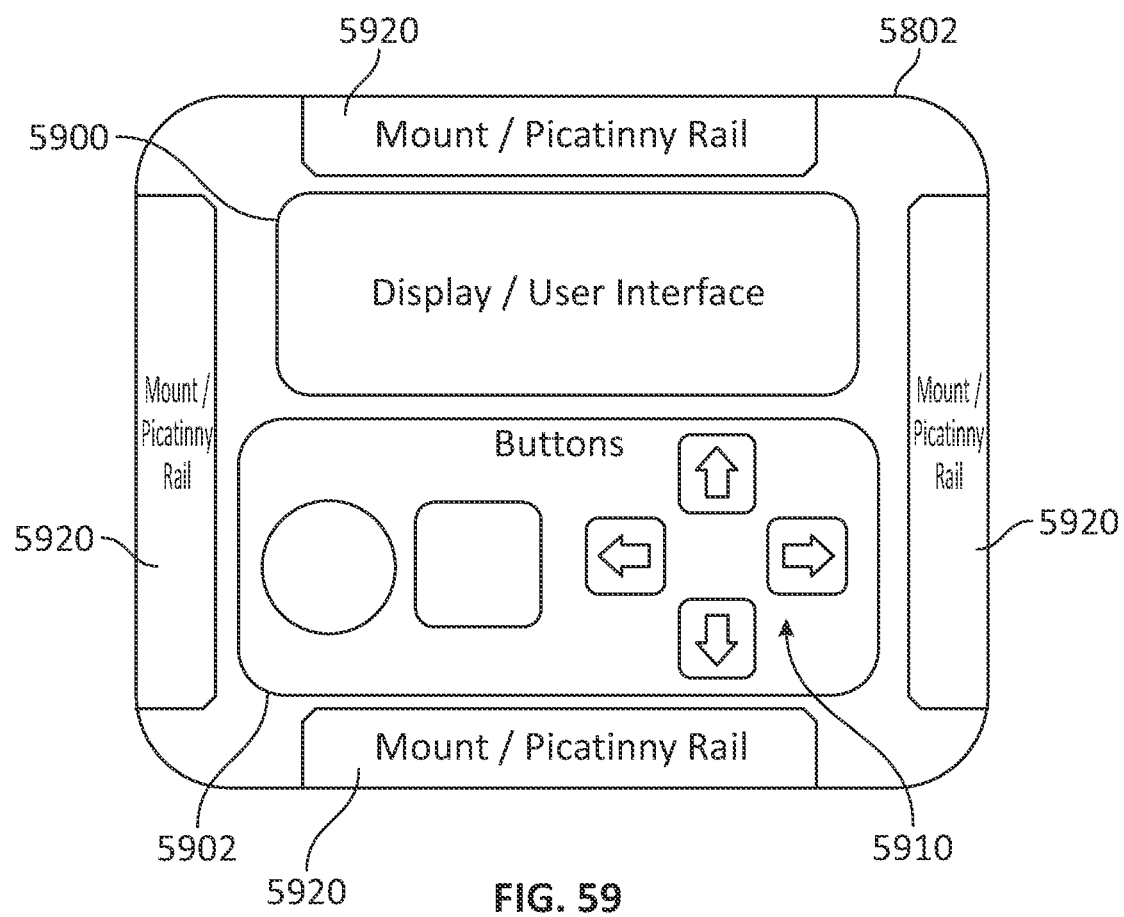
FIG. 59 illustrates a schematic view of an unmanned system maneuver controller, in accordance with an embodiment of the disclosure.

FIG. 59 illustrates a schematic view of USMC 5802, in accordance with an embodiment of the disclosure. USMC 5802 may include a display 5900 and a user interface 5902. Display 5900 may render various information to an operator, such as, for example, a ballistic solution, ballistic trajectory calculations, windage and holdover values, weapon conditions (e.g., cant), environmental conditions, mission information, ISR video live stream, etc. User interface 5902 may include various buttons 5910 to control operations of USMC 5802, such as a power button, a select button, navigation buttons, etc. In embodiments, display 5900 may be a holographic display or a touch display, such that user interface 5902 is provided in display 5900 itself.

With continued reference to FIG. 59, USMC 5802 includes one or more attachment points or mechanisms 5920. For example, USMC 5802 may include an attachment point 5920 on each side of its housing to allow placement of USMC 5802 as desired, such as on a top, bottom, left, or right side of weapon 5810. Attachment point(s) 5920 may be configured to attach USMC 5802 to a mount or Picatinny rail of weapon 5810 or observation device.

Figure 60:
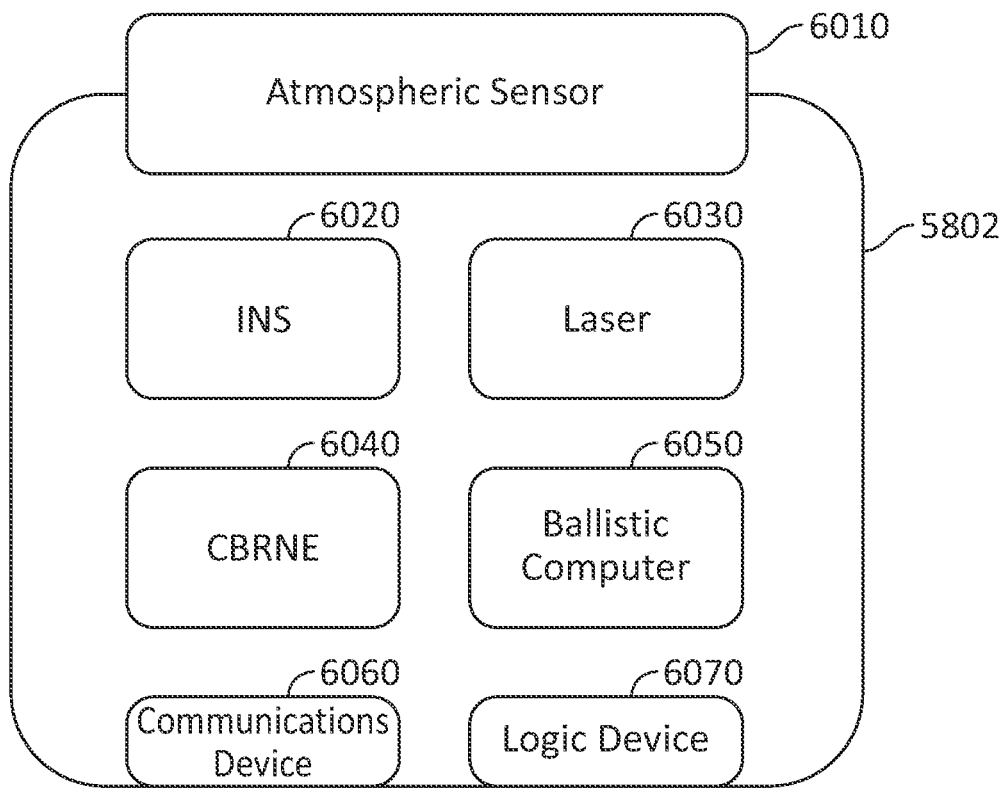
FIG. 60 illustrates a system block diagram of the unmanned system maneuver controller, in accordance with an embodiment of the disclosure.

FIG. 60 illustrates a system block diagram of USMC 5802, in accordance with an embodiment of the disclosure. Referring to FIG. 60, USMC 5802 may include, or be operably connected to, an atmospheric sensor system 6010, an inertial navigation system (INS) 6020, a laser system 6030, a chemical, biological, radiological, nuclear, and explosive (CBRNE) system 6040, a ballistic computer 6050, a communications device 6060, and a logic device 6070.

Atmospheric sensor system 6010 may include one or more atmospheric sensors (e.g., temperature, barometric pressure, humidity, ultrasonic, hot-wire, wind vane anemometer, differential pressure sensor, laser frequency (LIDAR) sensor, etc.) to collect real-time or near real-time atmospheric data. Atmospheric data collection may facilitate one or more operations of unmanned system 5806 and/or USMC 5802. For example, atmospheric data may be used to pilot unmanned system 5806, such as used to calculate optimum take-off and landing direction against the wind, correct flight drift due to wind, etc. The atmospheric data may also be used in determining an accurate calculation of a ballistic shot (e.g., by ballistic computer 6050).

INS 6020 may be used for state estimation of USMC 5802 in 3D space. Depending on the application, INS 6020 may include one or more accelerometers, gyroscopes, magnetometers, GPS, and vision-based sensors to determine a position/orientation of USMC 5802 in 3D space. Such information may be used to pilot unmanned system 5806. For example, USMC 5802 may pilot UAV 100, UAV 5806A, USV 5806B, or UUV 5806C based on movement of USMC 5802 in 3D space, such as explained above.

Laser system 6030 may include an infrared (or other frequency) laser pointer (e.g., a device-internal or data imported from a third-party laser device). As detailed below, laser system 6030 may be used by the weapons operator to control operation of unmanned system 5806, such as allowing an operator to define a UAV, USV, or UUV maneuver, command, or action task, as detailed below. CBRNE system 6040 may include one or more sensors to monitor the presence of CBRNE threats, and provide an indication regarding a detected threat (e.g., via display 5900).

Ballistic computer 6050 may determine a ballistic solution or a ballistics trajectory of a projectile fired from weapon 5810. Ballistic computer 6050 may be in data communication with atmospheric sensor system 6010 to receive environmental data measurements detected by atmospheric sensor system 6010. Ballistic computer 6050 is configured to perform real-time or near real-time ballistic calculations of a projectile along its flight path based at least on the environmental data received from atmospheric sensor system 6010 (e.g., wind data).

Communications device 6060 may be implemented to provide wired communication over a cable and/or wireless communication over an antenna. For example, communications device 6060 may include one or more wired or wireless communication components, such as an Ethernet connection, a wireless local area network (WLAN) component based on the IEEE 802.11 standards, a wireless broadband component, mobile cellular component, a wireless satellite component, or various other types of wireless communication components including radio frequency (RF), microwave frequency (MWF), and/or infrared frequency (IRF) components configured for communication with a network. As such, communications device 6060 may include an antenna coupled thereto for wireless communication purposes. In other embodiments, the communications device 6060 may be configured to interface with a DSL (e.g., Digital Subscriber Line) modem, a PSTN (Public Switched Telephone Network) modem, an Ethernet device, and/or various other types of wired and/or wireless network communication devices configured for communication with a network.

Logic device 6070 may include, for example, a microprocessor, and artificial intelligence powered neural network or other machine learning architecture, a single-core processor, a multi-core processor, a microcontroller, a programmable logic device configured to perform processing operations, a digital signal processing (DSP) device, one or more memories for storing executable instructions (e.g., software, firmware, or other instructions), and/or any other appropriate combinations of devices and/or memory to perform any of the various operations described herein. Logic device 6070 is configured to interface and communicate with the various components of USMC 5802 to perform various method and processing steps described herein. For example, logic device 6070 may receive (e.g., via communications device 6060) flight, maneuver, or dive data from unmanned system 5806, and generate flight, maneuver, or dive control instructions based at least on the flight, maneuver, or dive data and data received from INS 6020, the flight, maneuver, or dive control instructions configured to pilot unmanned system 5806 based on movement of USMC 5802 in 3D space.

In various embodiments, processing instructions may be integrated in software and/or hardware as part of logic device 6070, or code (e.g., software and/or configuration data) which may be stored in memory and/or a machine readable medium. In various embodiments, the instructions stored in memory and/or machine readable medium permit logic device 6070 to perform the various operations discussed herein and/or control various components of USMC 5802 for such operations.

Memory may include one or more memory devices (e.g., one or more memories) to store data and information. The one or more memory devices may include various types of memory including volatile and non-volatile memory devices, such as RAM (Random Access Memory), ROM (Read-Only Memory), EEPROM (Electrically-Erasable Read-Only Memory), flash memory, fixed memory, removable memory, and/or other types of memory.

Machine readable medium (e.g., a memory, a hard drive, a compact disk, a digital video disk, or a flash memory) may be a non-transitory machine readable medium storing instructions for execution by logic device 6070. In various embodiments, machine readable medium may be included as part of USMC 5802 and/or separate from USMC 5802, with stored instructions provided to USMC 5802 by coupling the machine readable medium to USMC 5802 and/or by USMC 5802 downloading (e.g., via a wired or wireless link) the instructions from the machine readable medium (e.g., containing the non-transitory information).

Figure 61:
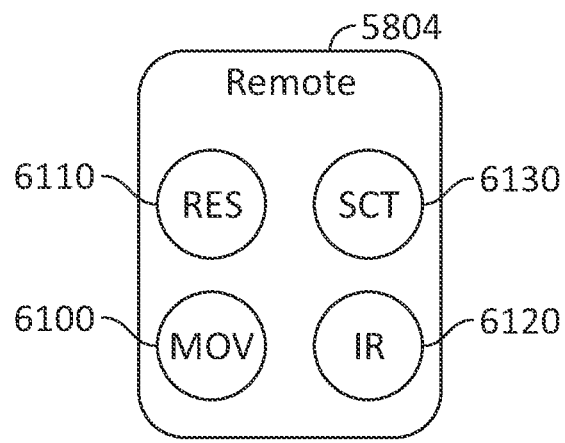
FIG. 61 illustrates a remote configured to control operations of an unmanned system maneuver controller, in accordance with an embodiment of the disclosure.

FIG. 61 illustrates remote 5804 configured to control operations of USMC 5802, in accordance with an embodiment of the disclosure. Referring to FIG. 61, remote 5804 may include multiple inputs/buttons for defining respective operating modes of USMC 5802. For example, remote 5804 may include a first button 6100 (e.g., "MOVE" or "MOV") associated with piloting UAV 100 based on movement of USMC 5802 in 3D space. For example, while pressing first button 6100 (e.g., index finger pressed on first button 6100), a motion in 3D space of USMC 5802 causes a real-time or near real-time motion mimicking of unmanned system 5806 in 3D space. When first button 6100 is released (e.g., index finger on weapon trigger), unmanned system 5806 may stop all 3D motion and enter a stable, autonomous, or hover standby mode at its current position.

In embodiments, remote 5804 may include a second button 6110 (e.g., "RESET" or "RES") associated with aligning an associated unmanned system (e.g., UAV 100, UAV 5806A, USV 5806B, or UUV 5806C) with weapon 5810 and or programmed and calibrated space-zero-position 4700, 4800, and 5000. For example, operator engagement of second button 6110 may cause the unmanned system orientation to realign (e.g., automatically) with the current weapon 3D orientation.

FIG. 62 illustrates a vision-based communication functionality or control, in accordance with an embodiment of the disclosure. Referring to FIG. 61, remote 5804 may include a third button 6120 (e.g., "IR") to initiate a functionality of laser or other optical or frequency beam system 6030. Referring to FIG. 62, laser system 6030 of USMC 5802 may be used to draw a symbol, letter, or geometric shape 6204 on a surface or near unmanned system 5806, where the symbol, letter, or shape 6204 is scanned by unmanned system 5806 and translated into a UAV, USV, or UUV maneuver, command, or action task.

FIG. 62 illustrates three example symbols—an infinity symbol 6210, an X symbol 6220, and a multiple circle symbol 6230—with each symbol indicating a different UAV maneuver, command, or action task. For instance, UAV detection of symbol 6210 may cause UAV 5806A to fly to a spot near the symbol and start scanning the area for heat sources (e.g., an enemy detection task). UAV detection of symbol 6220 may cause UAV 5806A to fly to and stop at a spot near the cross of the symbol (e.g., a park UAV at spot "X" task). UAV detection of symbol 6230 may cause UAV 5806A to map the path along the circles drawn by laser system 6030 and fly along the laser-marked waypoints (e.g., a UAV path task). During each autonomous flight maneuver, UAV sensors may interact with the laser-based commands to ensure safe and efficient UAV flight behavior. USV 5806B and UUV 5806C may be controlled in a similar manner. In embodiments, selective and predefined laser beam frequency or wavelength can be chosen to link a specific UAV 100, UAV 5806A, USV 5806B, UUV 5806C with a unique USMC 5802.

Figure 63:
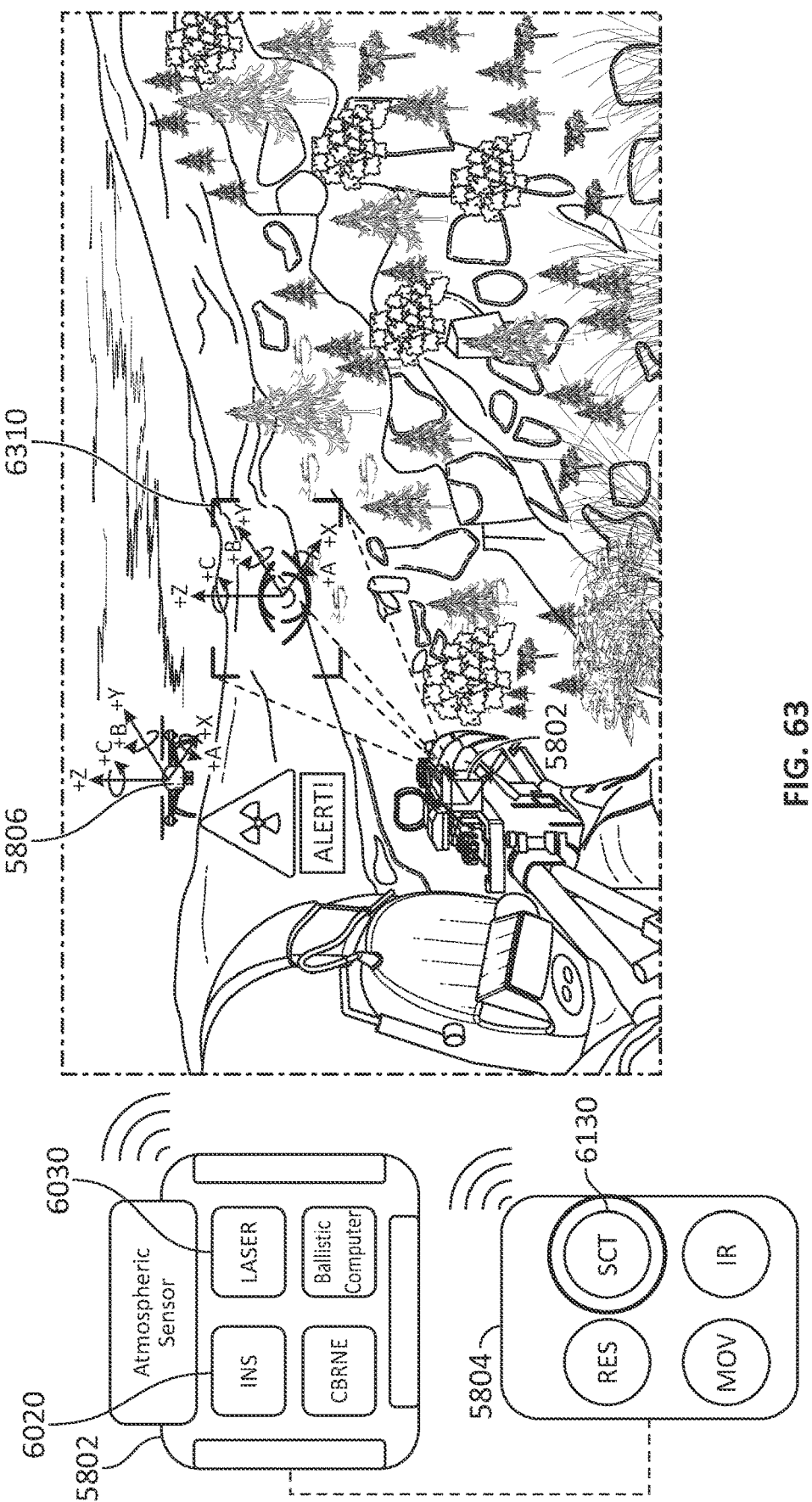
FIG. 63 illustrates a scouting functionality or control, in accordance with an embodiment of the disclosure.

FIG. 63 illustrates a scouting functionality or control, in accordance with an embodiment of the disclosure. Referring to FIGS. 61 and 63, remote 5804 may include a fourth button 6130 (e.g., "SCT") associated with reconnaissance and/or scouting operations of UAV 5806A. For instance, referring to FIG. 63, when a CBRNE alert is triggered by CBRNE system 6040, engagement of fourth button 6130 may allow the operator to guide UAV 5806A to an area of interest (AOI) 6310 for further reconnaissance based on weapon movement (e.g., by drawing an imaginary geometric shape onto the AOI 6310 using laser system 6030 of USMC 5802). For example, INS 6020 and laser system 6030 may calculate the vectors from the device location to the AOI 6310, allowing the necessary flight path data to be acquired that lead to the AOI 6310 for detailed area reconnaissance and local data collection. USV 5806B and UUV 5806C may be controlled in a similar manner.

Figure 64:
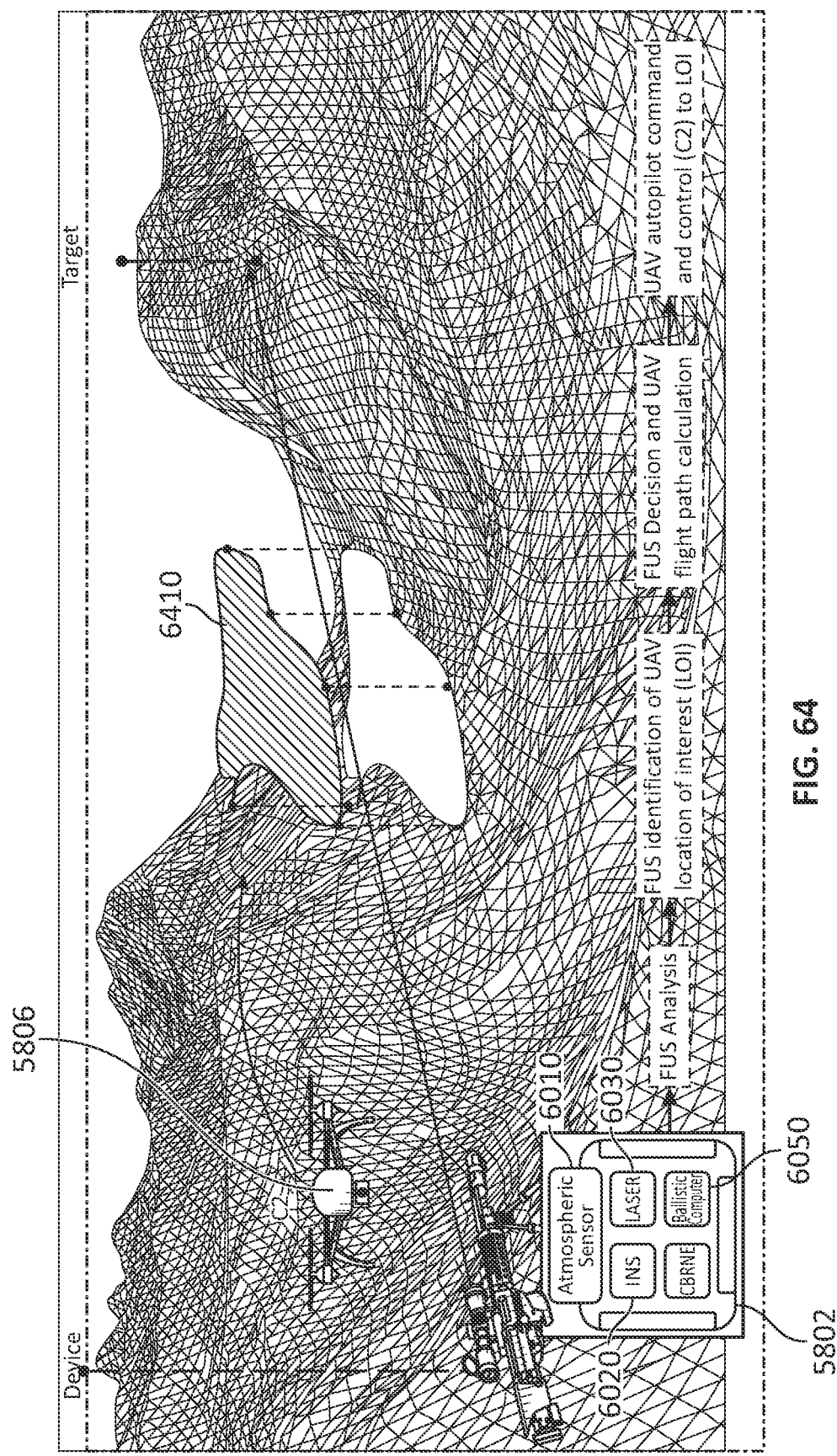
FIG. 64 illustrates a visual, map, and sensor fusion to facilitate UAV flight path calculations and commands, in accordance with an embodiment of the disclosure.

FIG. 64 illustrates a visual, map, and sensor fusion to facilitate UAV flight path calculations and commands, in accordance with an embodiment of the disclosure. Referring to FIG. 64, a fusion ("FUS") of visual/map-based topographic data with sensor data provided by atmospheric sensor system 6010, INS 6020, laser system 6030, and ballistic computer 6050 may facilitate UAV flight path calculations and UAV pattern commands. For example, the fusion of data may allow logic device 6070 to identify a location of interest (LOI) 6410 between a shooter position and a target, the LOI 6410 indicating a preferred geographic area for data gathering (e.g., wind speed, wind direction, threat detection, etc.). For instance, UAV mission or UAV task specific locations may be identified in 3D space. In such embodiments, logic device 6070 may calculate a flight path for UAV 5806A to fly to the LOI 6410, such as USMC 5802 commanding UAV 5806A automatically to the identified locations or flight areas. USV 5806B and UUV 5806C may be controlled in a similar manner.

Figure 65:
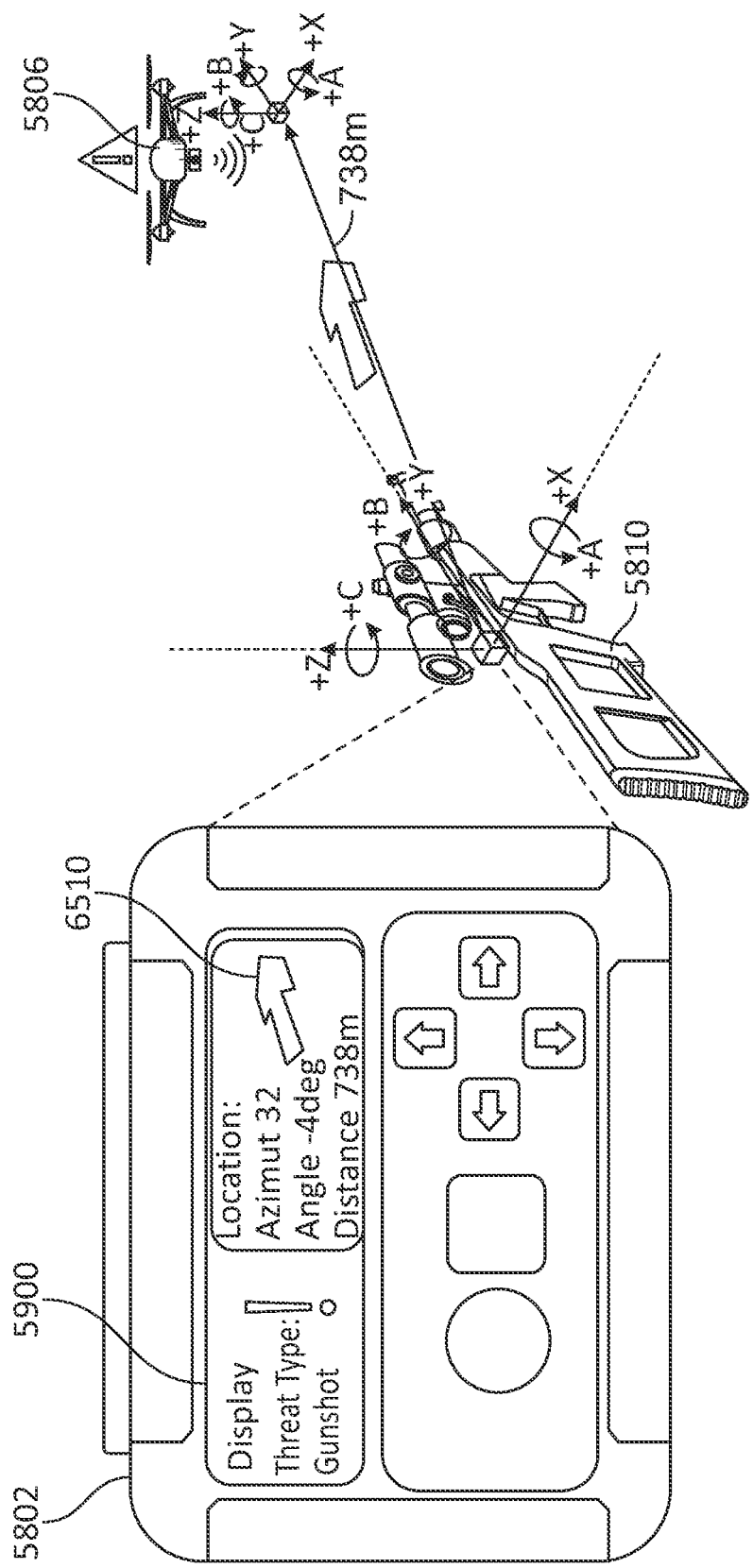
FIG. 65 illustrates an automatic threat locator in 3D space using an unmanned system, in accordance with an embodiment of the disclosure.

FIG. 65 illustrates an automatic threat locator in 3D space using an unmanned system, in accordance with an embodiment of the disclosure. For example, UAV 5806A may spot a threat during a reconnaissance flight. That threat, for instance an enemy gunshot, is then located by UAV 5806A and its location in 3D space is transmitted to USMC 5802. USMC 5802 then calculates the distance and direction vector from the operator position to the threat location and displays the threat location information via an interactive arrow 6510 on display 5900. Following the interactive arrow guidance on display 5900 allows the operator to move weapon 5810 intuitively and quickly towards the located threat. In embodiments, additional threat information may be provided on display 5900, such as a threat type, vector data, and the distance to the threat, among other information. Such examples are illustrative only, and USV 5806B and UUV 5806C may be utilized to detect one or more threats in a similar manner.

Figure 66:
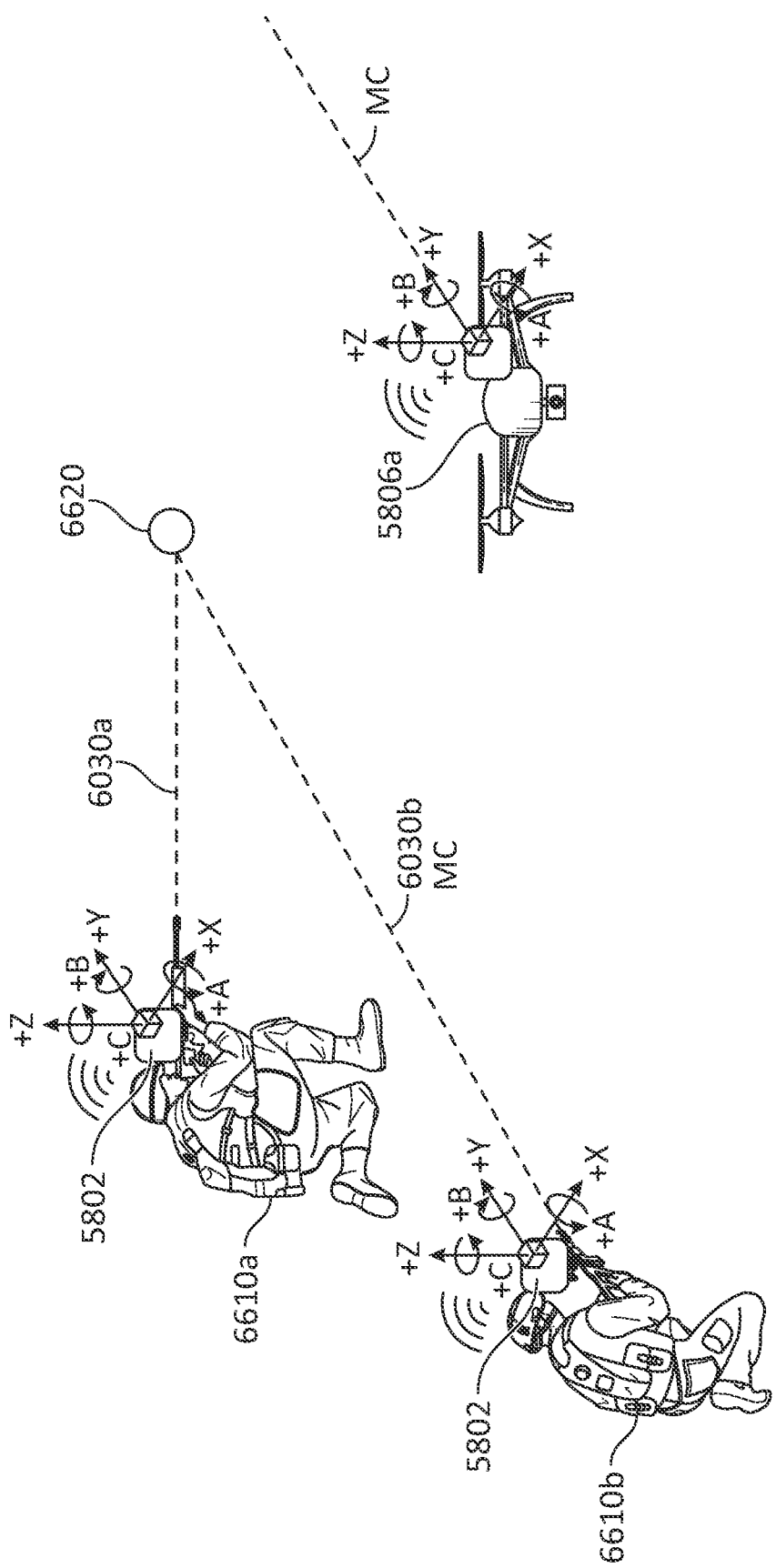
FIG. 66 illustrates synchronized and calibrated space-zero position with multiple users, in accordance with an embodiment of the disclosure.

FIG. 66 illustrates synchronized and calibrated space-zero position with multiple users, in accordance with an embodiment of the disclosure. Referring to FIG. 66, a first operator 6610A may pass UAV control to a second operator 6610B. For example, when first operator 6610A needs to pass UAV control to second operator 6610B, both operators point their weapons (or observation devices) at the same or similar spot 6620 in 3D space (e.g., a single tree at the horizon) and engage a handover command on USMC 5802 (e.g., user interface 5902). Spot 6620 may be any virtual point of directional calibration for USMC synchronization. In embodiments, INS 6020 and laser system 6030 may measure and synchronize weapon vectors 6030A, 6030B between the USMCs 5802 of first operator 6610A and second operator 6610B. Once the weapon vectors 6030A, 6030B are synchronized (e.g., based on calibrated space-zero position 4700, 4800, and 5000), USMC 5802 of first operator 6610A becomes inactive and USMC 5802 of second operator 6610B will become active and takes over real-time motion control (MC) of UAV 5806A. USV 5806B and UUV 5806C may be controlled in a similar manner.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more computer readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

All relative and directional references (including up, down, upper, lower, top, bottom, side, front, rear, and so forth) are given by way of example to aid the reader's understanding of the examples described herein. They should not be read to be requirements or limitations, particularly as to the position, orientation, or use unless specifically set forth in the claims. Connection references (e.g., attached, coupled, connected, joined, and the like) are to be construed broadly and may include intermediate members between a connection of elements and relative movement between elements. As such, connection references do not necessarily infer that two elements are directly connected and in fixed relation to each other, unless specifically set forth in the claims.

The present disclosure teaches by way of example and not by limitation. Therefore, the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. An unmanned system maneuver controller (USMC) comprising:
   an inertial navigation system (INS) for state estimation of the USMC in three-dimensional (3D) space;
   a communications device configured to wirelessly communicate with an unmanned system; and
   a processor configured to:
   receive, via the communications device, operation data comprising at least one of flight, maneuver, or dive data from the unmanned system;
   detect movement of the USMC based on data from the INS; and
   generate navigation instructions comprising at least one of flight, maneuver, or dive control instructions based at least on the operation data and the detected movement, the navigation instructions configured to be wirelessly transmitted to the unmanned system to pilot the unmanned system based on movement of the USMC in 3D space.

2. The USMC of claim 1, wherein the INS comprises one or more accelerometers, gyroscopes, magnetometers, GPS, and vision-based sensors to determine a position of the USMC in 3D space.

3. The USMC of claim 1, wherein the USMC comprises a first mode in which the navigation instructions are configured to pilot the unmanned system into an alignment with a current weapon orientation or multiple weapon orientations pointing at a common virtual point in space for sensor calibration and 3D alignment.

4. The USMC of claim 1, wherein:
the unmanned system is further configured to detect a symbol or shape drawn on a surface or near the unmanned system by an infrared laser or frequency beam signal and to perform operations based on the detected symbol or shape.

5. The USMC of claim 1, wherein:
the processor is further configured to identify an area of interest (AOI) based on a movement of a weapon to which the USMC is mounted; and
the navigation instructions are configured to pilot the unmanned system to the AOI.

6. The USMC of claim 1, further comprising a remote operable to selectively control an operation of the USMC.

7. A system comprising:
the USMC of claim 1; and
the unmanned system comprising an unmanned aerial vehicle (UAV), the UAV comprising at least one of:
a visual sensor,
a wind sensor,
an atmospheric sensor,
a microphone,
an artificial intelligence architecture,
a chemical, biological, radiological, nuclear, and explosive (CBRNE) sensor, or
an intelligence, surveillance, and reconnaissance (ISR) sensor.

8. The system of claim 7, wherein the processor is further configured to:
identify a location of interest (LOI) based on topographic data and sensor data; and
calculate a flight path for the UAV to the LOI.

9. A system comprising:
a weapon or observation device; and
the USMC of claim 1, the USMC mounted to the weapon or observation device, such that movement of the weapon or observation device in 3D space controls a movement of the unmanned system.

10. The system of claim 9, wherein the processor is further configured to:
identify a threat; and
calculate a vector from the weapon or observation device to the identified threat.

11. A method comprising:
receiving, by a processor of an unmanned system maneuver controller (USMC), operation data comprising at least one of flight, maneuver, or dive data from an unmanned system via a communications device of the USMC;
receiving, by the processor, an indication of a user input at the USMC selecting an operating mode of the USMC;
detecting, while the USMC is operating in the selected operating mode, movement of the USMC in three-dimensional (3D) space based on data received from an inertial navigation system (INS) of the USMC; and
generating, by the processor, navigation instructions comprising at least one of flight, maneuver, or dive control instructions based at least on the operation data and the detected movement, the navigation instructions configured to pilot the unmanned system based on the detected movement of the USMC.

12. The method of claim 11, wherein the INS comprises one or more accelerometers, gyroscopes, magnetometers, GPS, and vision-based sensors to determine a position of the USMC in 3D space.

13. The method of claim 11, wherein the generating the navigation instructions comprises generating a first set of navigation instructions configured to pilot the unmanned system into an alignment with a current weapon orientation or multiple weapon orientations pointing at a common virtual point in space for sensor calibration and 3D alignment.

14. A method, comprising:
receiving, by a processor of an unmanned system maneuver controller (USMC), operation data comprising at least one of flight, maneuver, or dive data from an unmanned system via a communications device of the USMC;
drawing, by a user, a symbol on a surface or near the unmanned system with an infrared laser or frequency beam signal associated with the USMC;
detecting, by the unmanned system, the symbol; and
performing operations, by the unmanned system, based on the detected symbol.

15. The method of claim 11, further comprising:
identifying, by the processor, an area of interest (AOI) based on a movement of a weapon or observation device to which the USMC is mounted,
wherein the navigation instructions are configured to pilot the unmanned system to the AOI.

16. The method of claim 11, further comprising receiving, by the processor, an input from a remote operable to selectively control an operation of the USMC.

17. The method of claim 11, further comprising receiving, by the processor, sensor data from at least one of:
a visual sensor;
a wind sensor;
an atmospheric sensor;
a microphone;
an artificial intelligence architecture;
a chemical, biological, radiological, nuclear, and explosive (CBRNE) sensor; or
an intelligence, surveillance, and reconnaissance (ISR) sensor.

18. The method of claim 17, further comprising:
identifying, by the processor, a location of interest (LOI) based on topographic data and the sensor data; and
calculating, by the processor, a flight path for the unmanned system to the LOI, wherein the unmanned system comprises an unmanned aerial vehicle (UAV).

19. The method of claim 11, wherein the USMC is mounted to a weapon or observation device, such that movement of the weapon or observation device in 3D space controls a movement of the unmanned system.

20. The method of claim 19, further comprising:
identifying, by the processor, a threat; and
calculating, by the processor, a vector from the weapon or observation device to the identified threat.

* * * * *